United States Patent
Ramaswamy et al.

(10) Patent No.: US 11,252,062 B2
(45) Date of Patent: *Feb. 15, 2022

(54) MONITORING STREAMING MEDIA CONTENT

(71) Applicant: The Nielsen Company (US), LLC, New York, NY (US)

(72) Inventors: Arun Ramaswamy, Tampa, FL (US); Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,251

(22) Filed: Sep. 28, 2020

(65) Prior Publication Data

US 2021/0014140 A1 Jan. 14, 2021

Related U.S. Application Data

(63) Continuation of application No. 14/922,918, filed on Oct. 26, 2015, now Pat. No. 10,791,042, which is a
(Continued)

(51) Int. Cl.
*H04L 12/26* (2006.01)
*H04N 21/235* (2011.01)
(Continued)

(52) U.S. Cl.
CPC .......... *H04L 43/06* (2013.01); *H04L 65/4069* (2013.01); *H04L 65/607* (2013.01);
(Continued)

(58) Field of Classification Search
CPC ..... H04L 65/4069–80; H04N 1/32101–32352; H04N 19/46–467;
(Continued)

(56) References Cited

U.S. PATENT DOCUMENTS

| 4,230,990 A | 10/1980 | Lert, Jr. et al. |
| 4,647,974 A | 3/1987 | Butler et al. |

(Continued)

FOREIGN PATENT DOCUMENTS

| AU | 8976601 | 2/2002 |
| AU | 9298201 | 4/2002 |

(Continued)

OTHER PUBLICATIONS

Nikolaidou, Pipina T., Stavros N. Shaeles, and Alexandros S. Karakos. "Musicpedia: retrieving and merging-interlinking music metadata." Int. J. Comput 3.8 (2011). (Year: 2011).*

(Continued)

*Primary Examiner* — David R Lazaro
*Assistant Examiner* — Julian Chang
(74) *Attorney, Agent, or Firm* — Hanley, Flight & Zimmerman, LLC

(57) ABSTRACT

Methods, apparatus and articles of manufacture to monitor streaming media are disclosed. Example media monitoring methods disclosed herein include extracting metering data having a first format from media. In some disclosed examples, the media is to be provided to a media device via a transport stream, and the extracted metering data identifies at least one of the media or a source of the media. Disclosed example methods also include transcoding the extracted metering data to form transcoded metering data having a second format different from the first format. Disclosed example methods further include, prior to transmitting the transport stream to provide the media to the media device, transmitting the transcoded metering data to the media device for receipt by a meter executed by the media device.

17 Claims, 21 Drawing Sheets

Related U.S. Application Data continuation of application No. 13/341,646, filed on Dec. 30, 2011, now Pat. No. 9,210,208.

(60) Provisional application No. 61/568,631, filed on Dec. 8, 2011, provisional application No. 61/499,520, filed on Jun. 21, 2011.

(51) Int. Cl.

| | | |
|---|---|---|
| *H04N 21/8358* | (2011.01) | |
| *H04N 1/32* | (2006.01) | |
| *H04N 19/46* | (2014.01) | |
| *H04N 21/658* | (2011.01) | |
| *H04N 21/81* | (2011.01) | |
| *H04L 29/06* | (2006.01) | |

(52) U.S. Cl.
CPC ......... *H04L 65/80* (2013.01); *H04N 21/2353* (2013.01); *H04N 21/6582* (2013.01); *H04N 21/8126* (2013.01); *H04N 21/8358* (2013.01); *H04N 1/32101* (2013.01); *H04N 19/46* (2014.11)

(58) Field of Classification Search
CPC ...... H04N 21/235–2362; H04N 21/658–6583; H04N 21/80–8586
See application file for complete search history.

(56) References Cited

U.S. PATENT DOCUMENTS

| | | | |
|---|---|---|---|
| 4,677,466 A | 6/1987 | Lert, Jr. et al. | |
| 4,697,209 A | 9/1987 | Kiewit et al. | |
| 4,745,468 A | 5/1988 | Von Kohorn | |
| 4,876,592 A | 10/1989 | Von Kohorn | |
| 4,876,736 A | 10/1989 | Kiewit | |
| 4,926,255 A | 5/1990 | Von Kohorn | |
| 4,973,952 A | 11/1990 | Malec et al. | |
| 5,003,591 A | 3/1991 | Kauffman et al. | |
| 5,019,899 A | 5/1991 | Boles et al. | |
| 5,023,929 A | 6/1991 | Call | |
| 5,034,807 A | 7/1991 | Von Kohorn | |
| 5,057,915 A | 10/1991 | Von Kohorn | |
| 5,081,680 A | 1/1992 | Bennett | |
| 5,128,752 A | 7/1992 | Von Kohorn | |
| 5,227,874 A | 7/1993 | Von Kohorn | |
| 5,249,044 A | 9/1993 | Von Kohorn | |
| 5,283,734 A | 2/1994 | Von Kohorn | |
| 5,331,544 A | 7/1994 | Lu et al. | |
| 5,401,946 A | 3/1995 | Weinblatt | |
| 5,425,100 A | 6/1995 | Thomas et al. | |
| 5,481,294 A | 1/1996 | Thomas et al. | |
| 5,512,933 A | 4/1996 | Wheatley et al. | |
| 5,524,195 A | 6/1996 | Clanton, III et al. | |
| 5,543,856 A | 8/1996 | Rosser et al. | |
| 5,559,716 A | 9/1996 | Gaalswyk | |
| 5,574,962 A | 11/1996 | Fardeau et al. | |
| 5,579,124 A | 11/1996 | Aijala et al. | |
| 5,594,934 A | 1/1997 | Lu et al. | |
| 5,629,739 A | 5/1997 | Dougherty | |
| 5,659,366 A | 8/1997 | Kerman | |
| 5,666,293 A | 9/1997 | Metz et al. | |
| 5,719,634 A | 2/1998 | Keery et al. | |
| 5,734,413 A | 3/1998 | Lappington et al. | |
| 5,740,035 A | 4/1998 | Cohen et al. | |
| 5,815,671 A | 9/1998 | Morrison | |
| 5,841,978 A | 11/1998 | Rhoads | |
| 5,848,155 A | 12/1998 | Cox | |
| 5,850,249 A | 12/1998 | Massetti et al. | |
| 5,872,588 A | 2/1999 | Aras et al. | |
| 5,880,789 A | 3/1999 | Inaba | |
| 5,893,067 A | 4/1999 | Bender et al. | |
| 5,910,987 A | 6/1999 | Ginter et al. | |
| 5,918,223 A | 6/1999 | Blum et al. | |
| 5,930,369 A | 7/1999 | Cox et al. | |
| 5,933,789 A | 8/1999 | Byun et al. | |
| 5,956,716 A | 9/1999 | Kenner et al. | |
| 5,966,120 A | 10/1999 | Arazi et al. | |
| 5,974,299 A | 10/1999 | Massetti | |
| 5,974,396 A | 10/1999 | Anderson et al. | |
| 5,987,855 A | 11/1999 | Dey et al. | |
| 6,034,722 A | 3/2000 | Viney et al. | |
| 6,049,830 A | 4/2000 | Saib | |
| 6,055,573 A | 4/2000 | Gardenswartz et al. | |
| 6,061,793 A | 5/2000 | Tewfik et al. | |
| 6,088,659 A | 7/2000 | Kelley et al. | |
| 6,108,637 A | 8/2000 | Blumenau | |
| 6,115,654 A | 9/2000 | Eid et al. | |
| 6,154,209 A | 11/2000 | Naughton et al. | |
| 6,208,735 B1 | 3/2001 | Cox et al. | |
| 6,216,129 B1 | 4/2001 | Eldering | |
| 6,282,573 B1 | 8/2001 | Darago et al. | |
| 6,286,036 B1 | 9/2001 | Rhoads | |
| 6,286,140 B1 | 9/2001 | Ivanyi | |
| 6,298,348 B1 | 10/2001 | Eldering | |
| 6,308,327 B1 | 10/2001 | Liu et al. | |
| 6,310,956 B1 | 10/2001 | Morito | |
| 6,327,619 B1 | 12/2001 | Blumenau | |
| 6,331,876 B1 | 12/2001 | Koster et al. | |
| 6,335,736 B1 | 1/2002 | Wagner et al. | |
| 6,363,159 B1 | 3/2002 | Rhoads | |
| 6,363,488 B1 | 3/2002 | Ginter et al. | |
| 6,377,993 B1 | 4/2002 | Brandt et al. | |
| 6,389,055 B1 | 5/2002 | August et al. | |
| 6,400,827 B1 | 6/2002 | Rhoads | |
| 6,411,725 B1 | 6/2002 | Rhoads | |
| 6,421,445 B1 | 7/2002 | Jensen et al. | |
| 6,442,285 B2 | 8/2002 | Rhoads et al. | |
| 6,463,445 B1 | 10/2002 | Suzuki et al. | |
| 6,487,564 B1 | 11/2002 | Asai et al. | |
| 6,505,160 B1 | 1/2003 | Levy et al. | |
| 6,512,836 B1 | 1/2003 | Xie et al. | |
| 6,512,837 B1* | 1/2003 | Ahmed ................. | G06T 1/0028 382/100 |
| 6,513,014 B1 | 1/2003 | Walker et al. | |
| 6,519,509 B1 | 2/2003 | Nierlich et al. | |
| 6,522,771 B2 | 2/2003 | Rhoads | |
| 6,539,095 B1 | 3/2003 | Rhoads | |
| 6,546,556 B1 | 4/2003 | Kataoka et al. | |
| 6,553,178 B2 | 4/2003 | Abecassis | |
| 6,611,607 B1* | 8/2003 | Davis ..................... | G06K 19/14 382/100 |
| 6,642,966 B1 | 11/2003 | Limaye | |
| 6,647,269 B2 | 11/2003 | Hendrey et al. | |
| 6,651,253 B2 | 11/2003 | Dudkiewicz et al. | |
| 6,654,480 B2 | 11/2003 | Rhoads | |
| 6,665,873 B1 | 12/2003 | Van Gestel et al. | |
| 6,671,732 B1 | 12/2003 | Weiner | |
| 6,675,383 B1 | 1/2004 | Wheeler et al. | |
| 6,683,966 B1 | 1/2004 | Tian et al. | |
| 6,710,815 B1 | 3/2004 | Billmaier et al. | |
| 6,714,683 B1 | 3/2004 | Tian et al. | |
| 6,714,684 B2 | 3/2004 | Yamaguchi et al. | |
| 6,750,985 B2 | 6/2004 | Rhoads | |
| 6,766,523 B2 | 7/2004 | Herley | |
| 6,795,972 B2 | 9/2004 | Rovira | |
| 6,804,379 B2 | 10/2004 | Rhoads | |
| 6,829,368 B2 | 12/2004 | Meyer et al. | |
| 6,853,634 B1 | 2/2005 | Davies et al. | |
| 6,871,323 B2 | 3/2005 | Wagner et al. | |
| 6,873,688 B1 | 3/2005 | Aarnio | |
| 6,941,275 B1 | 9/2005 | Swierczek | |
| 6,956,575 B2 | 10/2005 | Nakazawa et al. | |
| 6,963,972 B1* | 11/2005 | Chang ................. | H04L 63/0442 348/E7.056 |
| 6,968,315 B1 | 11/2005 | Nakisa | |
| 6,968,564 B1 | 11/2005 | Srinivasan | |
| 6,970,886 B1 | 11/2005 | Conwell et al. | |
| 6,996,213 B1 | 2/2006 | De Jong | |
| 7,003,731 B1 | 2/2006 | Rhoads et al. | |
| 7,007,166 B1 | 2/2006 | Moskowitz et al. | |
| 7,032,178 B1 | 4/2006 | McKnight et al. | |
| 7,050,603 B2 | 5/2006 | Rhoads et al. | |

(56) References Cited

U.S. PATENT DOCUMENTS

| | | |
|---|---|---|
| 7,051,086 B2 | 5/2006 | Rhoads et al. |
| 7,058,697 B2 | 6/2006 | Rhoads |
| 7,082,434 B2 | 7/2006 | Gosselin |
| 7,095,871 B2 | 8/2006 | Jones et al. |
| 7,143,949 B1 | 12/2006 | Hannigan |
| 7,158,943 B2 | 1/2007 | van der Riet |
| 7,171,018 B2 | 1/2007 | Rhoads et al. |
| 7,174,293 B2 | 2/2007 | Kenyon et al. |
| 7,181,042 B2 | 2/2007 | Tian |
| 7,185,201 B2 | 2/2007 | Rhoads et al. |
| 7,194,752 B1 | 3/2007 | Kenyon et al. |
| 7,197,156 B1 | 3/2007 | Levy |
| 7,215,280 B1 | 5/2007 | Percy et al. |
| 7,221,405 B2 | 5/2007 | Basson et al. |
| 7,227,972 B2 | 6/2007 | Brundage et al. |
| 7,254,249 B2 | 8/2007 | Rhoads et al. |
| 7,273,978 B2 | 9/2007 | Uhle |
| 7,317,716 B1 | 1/2008 | Boni et al. |
| 7,328,153 B2 | 2/2008 | Wells et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,421,723 B2 | 9/2008 | Harkness et al. |
| 7,443,292 B2 | 10/2008 | Jensen et al. |
| 7,451,317 B2 | 11/2008 | Oh et al. |
| 7,463,143 B2 | 12/2008 | Forr et al. |
| 7,519,658 B1 | 4/2009 | Anglin et al. |
| 7,548,565 B2 * | 6/2009 | Sull ................ G06T 3/4092 370/503 |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,689,823 B2 | 3/2010 | Shen et al. |
| 7,712,114 B2 | 5/2010 | Ramaswamy |
| 7,761,465 B1 | 7/2010 | Nonaka et al. |
| 7,802,306 B1 * | 9/2010 | Adams ............ G11B 20/00144 726/26 |
| 7,827,312 B2 | 11/2010 | Ramaswamy et al. |
| 7,895,442 B1 * | 2/2011 | Adams ............... H04N 21/2541 713/176 |
| 7,917,645 B2 * | 3/2011 | Ikezoye ............... G06F 16/634 709/231 |
| 7,962,934 B1 | 6/2011 | Eldering et al. |
| 8,065,703 B2 | 11/2011 | Wilson et al. |
| 8,103,879 B2 | 1/2012 | Levy et al. |
| 8,176,322 B2 | 5/2012 | Lee et al. |
| 8,179,475 B2 | 5/2012 | Sandrew |
| 8,234,350 B1 * | 7/2012 | Gu ................... H04N 21/8458 709/217 |
| 8,332,326 B2 * | 12/2012 | Schrempp ............ G06F 21/10 705/51 |
| 8,451,868 B2 | 5/2013 | Johnson et al. |
| 8,578,272 B2 | 11/2013 | Pantos et al. |
| 8,645,373 B2 | 2/2014 | Knight et al. |
| 8,706,685 B1 | 4/2014 | Smith et al. |
| 8,732,185 B1 * | 5/2014 | Lynn ................ G06Q 30/0241 707/765 |
| 8,839,338 B2 | 9/2014 | Eyer |
| 8,856,869 B1 | 10/2014 | Brinskelle |
| 8,990,844 B2 | 3/2015 | Oh et al. |
| 9,113,109 B2 * | 8/2015 | Bennett ............. H04N 21/4316 |
| 9,197,421 B2 | 11/2015 | Besehanic |
| 9,209,978 B2 | 12/2015 | Besehanic |
| 9,210,208 B2 | 12/2015 | Ramaswamy et al. |
| 9,515,904 B2 | 12/2016 | Ramaswamy et al. |
| 9,578,289 B2 * | 2/2017 | Roberts ............ H04N 7/17318 |
| 9,648,282 B2 * | 5/2017 | Petrovic ............ H04N 21/8358 |
| 9,729,830 B2 * | 8/2017 | May, Jr. ............ H04N 21/654 |
| 9,807,137 B2 * | 10/2017 | Forsman ............ H04L 65/607 |
| 10,757,158 B2 | 8/2020 | Truax |
| 10,791,042 B2 | 9/2020 | Ramaswamy et al. |
| 2001/0018693 A1 * | 8/2001 | Jain ................... G06F 16/58 715/201 |
| 2001/0023436 A1 * | 9/2001 | Srinivasan ........... H04N 21/812 709/219 |
| 2001/0031066 A1 | 10/2001 | Meyer et al. |
| 2001/0044851 A1 * | 11/2001 | Rothman ............ H04N 7/17336 709/231 |
| 2001/0044899 A1 * | 11/2001 | Levy .................... G07F 7/1008 713/176 |
| 2002/0001395 A1 | 1/2002 | Davis et al. |
| 2002/0012443 A1 | 1/2002 | Rhoads et al. |
| 2002/0016969 A1 | 2/2002 | Kimble |
| 2002/0032734 A1 | 3/2002 | Rhoads |
| 2002/0033842 A1 | 3/2002 | Zetts |
| 2002/0042833 A1 | 4/2002 | Hendler et al. |
| 2002/0052885 A1 | 5/2002 | Levy |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0069037 A1 | 6/2002 | Hendrickson et al. |
| 2002/0083324 A1 | 6/2002 | Hirari |
| 2002/0091991 A1 | 7/2002 | Castro |
| 2002/0108125 A1 | 8/2002 | Joao |
| 2002/0111934 A1 | 8/2002 | Narayan |
| 2002/0112002 A1 | 8/2002 | Abato |
| 2002/0120925 A1 * | 8/2002 | Logan .................. A61K 36/48 725/9 |
| 2002/0124246 A1 | 9/2002 | Kaminsky et al. |
| 2002/0126872 A1 * | 9/2002 | Brunk .................. H04N 19/467 382/100 |
| 2002/0133705 A1 | 9/2002 | Tagashira et al. |
| 2002/0138852 A1 | 9/2002 | Reynolds et al. |
| 2002/0144262 A1 | 10/2002 | Plotnick et al. |
| 2002/0144273 A1 | 10/2002 | Reto |
| 2002/0150247 A1 | 10/2002 | Linnartz et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0197063 A1 | 12/2002 | Cho |
| 2003/0021441 A1 | 1/2003 | Levy et al. |
| 2003/0025832 A1 | 2/2003 | Swart et al. |
| 2003/0039465 A1 | 2/2003 | Bjorgan et al. |
| 2003/0055949 A1 | 3/2003 | Coulombe et al. |
| 2003/0056010 A1 * | 3/2003 | Kaars ................ H04N 21/4586 709/246 |
| 2003/0079131 A1 | 4/2003 | Reefman |
| 2003/0088674 A1 | 5/2003 | Ullman et al. |
| 2003/0093790 A1 * | 5/2003 | Logan .................. G11B 27/34 725/38 |
| 2003/0093810 A1 | 5/2003 | Taniguchi |
| 2003/0103645 A1 * | 6/2003 | Levy ................ G11B 20/00884 382/100 |
| 2003/0105870 A1 | 6/2003 | Baum |
| 2003/0108200 A1 | 6/2003 | Sako |
| 2003/0115598 A1 | 6/2003 | Pantoja |
| 2003/0149890 A1 | 8/2003 | Shen et al. |
| 2003/0177488 A1 | 9/2003 | Smith et al. |
| 2003/0185232 A1 | 10/2003 | Moore et al. |
| 2003/0210821 A1 * | 11/2003 | Yogeshwar ............ H04N 19/40 382/232 |
| 2003/0212710 A1 | 11/2003 | Guy |
| 2003/0229900 A1 * | 12/2003 | Reisman .......... H04N 21/42204 725/87 |
| 2004/0003394 A1 | 1/2004 | Ramaswamy |
| 2004/0009763 A1 * | 1/2004 | Stone ................... H04H 20/14 455/410 |
| 2004/0019690 A1 | 1/2004 | Cardno et al. |
| 2004/0025181 A1 | 2/2004 | Addington et al. |
| 2004/0037271 A1 | 2/2004 | Liscano et al. |
| 2004/0038692 A1 | 2/2004 | Muzaffar |
| 2004/0044893 A1 * | 3/2004 | Alattar ............... H04N 1/32283 713/176 |
| 2004/0059933 A1 * | 3/2004 | Levy .................... H04N 5/913 726/31 |
| 2004/0064319 A1 | 4/2004 | Neuhauser et al. |
| 2004/0073916 A1 * | 4/2004 | Petrovic ............ H04N 21/8358 725/18 |
| 2004/0073951 A1 | 4/2004 | Bae et al. |

(56) References Cited

U.S. PATENT DOCUMENTS

| | | | |
|---|---|---|---|
| 2004/0088347 A1 | 5/2004 | Yeager et al. | |
| 2004/0088556 A1 | 5/2004 | Weirauch | |
| 2004/0125125 A1 | 7/2004 | Levy | |
| 2004/0128514 A1 | 7/2004 | Rhoads | |
| 2004/0137929 A1 | 7/2004 | Jones et al. | |
| 2004/0146161 A1 | 7/2004 | De Jong | |
| 2004/0153649 A1 | 8/2004 | Rhoads et al. | |
| 2004/0156489 A1 | 8/2004 | Vishik et al. | |
| 2004/0199387 A1 | 10/2004 | Wang et al. | |
| 2004/0254887 A1 | 12/2004 | Jacoby | |
| 2005/0028189 A1 | 2/2005 | Heine et al. | |
| 2005/0033758 A1 | 2/2005 | Baxter | |
| 2005/0058319 A1* | 3/2005 | Rhoads | G06Q 20/123 382/100 |
| 2005/0086682 A1 | 4/2005 | Burges et al. | |
| 2005/0120113 A1 | 6/2005 | Bunch et al. | |
| 2005/0138179 A1 | 6/2005 | Encarnacion et al. | |
| 2005/0144004 A1 | 6/2005 | Bennett et al. | |
| 2005/0152287 A1 | 7/2005 | Yokomitsu et al. | |
| 2005/0177738 A1 | 8/2005 | Van Der Veen et al. | |
| 2005/0188297 A1 | 8/2005 | Knight et al. | |
| 2005/0192933 A1 | 9/2005 | Rhoads et al. | |
| 2005/0193425 A1 | 9/2005 | Sull et al. | |
| 2005/0204379 A1 | 9/2005 | Yamamori | |
| 2005/0216346 A1 | 9/2005 | Kusumoto et al. | |
| 2005/0234774 A1 | 10/2005 | Dupree | |
| 2006/0026431 A1* | 2/2006 | Campello De Souza | G11B 20/00086 713/176 |
| 2006/0031297 A1 | 2/2006 | Zuidema | |
| 2006/0056625 A1 | 3/2006 | Nakabayashi et al. | |
| 2006/0059277 A1 | 3/2006 | Zito et al. | |
| 2006/0062426 A1* | 3/2006 | Levy | G11B 20/00086 382/100 |
| 2006/0095401 A1 | 5/2006 | Krikorian et al. | |
| 2006/0107195 A1* | 5/2006 | Ramaswamy | H04N 21/435 715/203 |
| 2006/0107302 A1 | 5/2006 | Zdepski | |
| 2006/0136564 A1 | 6/2006 | Ambrose | |
| 2006/0161635 A1 | 7/2006 | Lamkin et al. | |
| 2006/0167747 A1 | 7/2006 | Goodman et al. | |
| 2006/0168613 A1 | 7/2006 | Wood et al. | |
| 2006/0195614 A1 | 8/2006 | Sena et al. | |
| 2006/0195886 A1 | 8/2006 | Ashley | |
| 2006/0212705 A1 | 9/2006 | Thommana et al. | |
| 2006/0221173 A1 | 10/2006 | Duncan | |
| 2006/0224798 A1 | 10/2006 | Klein et al. | |
| 2006/0242325 A1* | 10/2006 | Ramaswamy | H04N 21/4349 709/246 |
| 2007/0005766 A1* | 1/2007 | Singhal | H04L 67/20 709/225 |
| 2007/0006250 A1 | 1/2007 | Croy et al. | |
| 2007/0016918 A1 | 1/2007 | Alcorn et al. | |
| 2007/0055987 A1 | 3/2007 | Lu et al. | |
| 2007/0074020 A1* | 3/2007 | Nishimura | G06F 16/48 713/168 |
| 2007/0083611 A1* | 4/2007 | Farago | G06Q 30/02 709/217 |
| 2007/0110089 A1 | 5/2007 | Essafi et al. | |
| 2007/0112837 A1 | 5/2007 | Houh et al. | |
| 2007/0118375 A1 | 5/2007 | Kenyon et al. | |
| 2007/0118873 A1* | 5/2007 | Houh | H04N 21/44016 725/136 |
| 2007/0124771 A1 | 5/2007 | Shvadron | |
| 2007/0127717 A1 | 6/2007 | Herre et al. | |
| 2007/0129952 A1 | 6/2007 | Kenyon et al. | |
| 2007/0133223 A1 | 6/2007 | Fredley et al. | |
| 2007/0136753 A1 | 6/2007 | Bovenschulte et al. | |
| 2007/0136777 A1 | 6/2007 | Hasek et al. | |
| 2007/0136782 A1* | 6/2007 | Ramaswamy | H04N 21/8358 725/138 |
| 2007/0149114 A1 | 6/2007 | Danilenko | |
| 2007/0156726 A1* | 7/2007 | Levy | G06F 21/10 |
| 2007/0156739 A1 | 7/2007 | Black et al. | |
| 2007/0157262 A1 | 7/2007 | Ramaswamy et al. | |
| 2007/0162927 A1 | 7/2007 | Ramaswamy et al. | |
| 2007/0186228 A1 | 8/2007 | Ramaswamy et al. | |
| 2007/0186288 A1 | 8/2007 | Peterson et al. | |
| 2007/0198738 A1 | 8/2007 | Angiolillo et al. | |
| 2007/0201835 A1 | 8/2007 | Rhoads | |
| 2007/0226760 A1 | 9/2007 | Neuhauser et al. | |
| 2007/0274523 A1 | 11/2007 | Rhoads | |
| 2007/0276925 A1 | 11/2007 | La Joie et al. | |
| 2007/0276926 A1 | 11/2007 | La Joie et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0005348 A1* | 1/2008 | Kosiba | H04L 67/14 709/231 |
| 2008/0021874 A1* | 1/2008 | Dahl | G06F 16/24534 |
| 2008/0027734 A1 | 1/2008 | Zhao et al. | |
| 2008/0028223 A1 | 1/2008 | Rhoads | |
| 2008/0040354 A1 | 2/2008 | Ray et al. | |
| 2008/0046499 A1* | 2/2008 | Cabrera | G06Q 10/10 709/201 |
| 2008/0059160 A1 | 3/2008 | Saunders et al. | |
| 2008/0065507 A1 | 3/2008 | Morrison et al. | |
| 2008/0077956 A1 | 3/2008 | Morrison et al. | |
| 2008/0082510 A1 | 4/2008 | Wang et al. | |
| 2008/0082922 A1 | 4/2008 | Biniak et al. | |
| 2008/0083003 A1 | 4/2008 | Biniak et al. | |
| 2008/0104624 A1 | 5/2008 | Narasimhan et al. | |
| 2008/0120661 A1 | 5/2008 | Ludvig et al. | |
| 2008/0126420 A1 | 5/2008 | Wright et al. | |
| 2008/0133223 A1 | 6/2008 | Son et al. | |
| 2008/0133504 A1 | 6/2008 | Messer et al. | |
| 2008/0134232 A1 | 6/2008 | Rhoads | |
| 2008/0139182 A1 | 6/2008 | Levy et al. | |
| 2008/0140573 A1 | 6/2008 | Levy et al. | |
| 2008/0155602 A1* | 6/2008 | Collet | H04N 21/443 725/46 |
| 2008/0168503 A1 | 7/2008 | Sparrell | |
| 2008/0184132 A1 | 7/2008 | Zato | |
| 2008/0199150 A1* | 8/2008 | Candelore | H04N 7/163 386/241 |
| 2008/0200999 A1 | 8/2008 | Hakansson | |
| 2008/0209491 A1 | 8/2008 | Hasek | |
| 2008/0219496 A1 | 9/2008 | Tewfik et al. | |
| 2008/0219637 A1 | 9/2008 | Sandrew | |
| 2008/0235077 A1 | 9/2008 | Harkness et al. | |
| 2008/0235209 A1 | 9/2008 | Rathod et al. | |
| 2008/0240490 A1 | 10/2008 | Finkelstein et al. | |
| 2008/0249961 A1* | 10/2008 | Harkness | H04N 21/44222 705/400 |
| 2008/0263579 A1 | 10/2008 | Mears et al. | |
| 2008/0294487 A1 | 11/2008 | Nasser | |
| 2008/0310629 A1 | 12/2008 | Van Der Veen et al. | |
| 2009/0007169 A1 | 1/2009 | Headley et al. | |
| 2009/0015599 A1 | 1/2009 | Bennett et al. | |
| 2009/0070408 A1 | 3/2009 | White | |
| 2009/0083417 A1 | 3/2009 | Hughes et al. | |
| 2009/0083783 A1 | 3/2009 | Park et al. | |
| 2009/0086812 A1* | 4/2009 | Ducharme | H04N 21/23473 375/240.01 |
| 2009/0103887 A1 | 4/2009 | Choi et al. | |
| 2009/0116812 A1* | 5/2009 | O'Brien | G11B 27/11 386/278 |
| 2009/0119723 A1 | 5/2009 | Tinsman | |
| 2009/0129588 A1 | 5/2009 | Takakusu et al. | |
| 2009/0129740 A1* | 5/2009 | O'brien | H04N 21/235 386/278 |
| 2009/0133093 A1* | 5/2009 | Hodge | H04N 21/4325 725/137 |
| 2009/0150553 A1 | 6/2009 | Collart et al. | |
| 2009/0157731 A1* | 6/2009 | Zigler | G06F 16/686 |
| 2009/0158318 A1* | 6/2009 | Levy | G06F 21/36 725/32 |
| 2009/0164378 A1* | 6/2009 | West | G06Q 30/02 705/55 |
| 2009/0164564 A1 | 6/2009 | Willis | |

(56) References Cited

U.S. PATENT DOCUMENTS

| | | |
|---|---|---|
| 2009/0210892 A1 | 8/2009 | Ramaswamy |
| 2009/0228492 A1 | 9/2009 | Valdez et al. |
| 2009/0248886 A1* | 10/2009 | Tan .................... H04L 12/1836 709/231 |
| 2009/0259325 A1 | 10/2009 | Topchy et al. |
| 2009/0265214 A1 | 10/2009 | Jobs et al. |
| 2009/0265278 A1 | 10/2009 | Wang et al. |
| 2009/0276313 A1* | 11/2009 | Wilhelm ............ G06Q 30/0641 705/14.53 |
| 2009/0305680 A1 | 12/2009 | Swift et al. |
| 2009/0307061 A1 | 12/2009 | Monighetti et al. |
| 2009/0307084 A1 | 12/2009 | Monighetti et al. |
| 2010/0008586 A1* | 1/2010 | Meyer ................ H04N 21/4825 382/190 |
| 2010/0009722 A1* | 1/2010 | Levy .................... B42D 25/00 455/566 |
| 2010/0023405 A1 | 1/2010 | Liu |
| 2010/0027961 A1* | 2/2010 | Gentile .................. H04N 5/272 386/278 |
| 2010/0083299 A1 | 4/2010 | Nelson et al. |
| 2010/0088583 A1 | 4/2010 | Schachter |
| 2010/0094897 A1 | 4/2010 | Sumrall et al. |
| 2010/0107217 A1* | 4/2010 | Liu ........................ H04N 21/84 726/1 |
| 2010/0114983 A1* | 5/2010 | Robert .................... H04L 67/10 707/803 |
| 2010/0121936 A1* | 5/2010 | Liu .................... H04L 65/4084 709/217 |
| 2010/0135638 A1 | 6/2010 | Mio |
| 2010/0158101 A1 | 6/2010 | Wu et al. |
| 2010/0169904 A1 | 7/2010 | Nielsen et al. |
| 2010/0172540 A1 | 7/2010 | Davis et al. |
| 2010/0174774 A1 | 7/2010 | Kern et al. |
| 2010/0205628 A1 | 8/2010 | Davis et al. |
| 2010/0226526 A1 | 9/2010 | Modro et al. |
| 2010/0241963 A1* | 9/2010 | Kulis .................... G06F 16/685 715/727 |
| 2010/0246955 A1 | 9/2010 | Wright et al. |
| 2010/0251304 A1 | 9/2010 | Donoghue et al. |
| 2010/0262711 A1* | 10/2010 | Bouazizi ................ H04L 65/00 709/231 |
| 2010/0293466 A1* | 11/2010 | O'Brien ............ H04N 21/6587 715/723 |
| 2010/0306257 A1 | 12/2010 | Levy |
| 2010/0318600 A1 | 12/2010 | Furbeck |
| 2011/0016231 A1 | 1/2011 | Ramaswamy et al. |
| 2011/0029666 A1 | 2/2011 | Lopatecki et al. |
| 2011/0030031 A1 | 2/2011 | Lussier et al. |
| 2011/0055314 A1 | 3/2011 | Rosenstein et al. |
| 2011/0058675 A1* | 3/2011 | Brueck ................ H04N 21/8355 380/277 |
| 2011/0066437 A1 | 3/2011 | Luff |
| 2011/0078721 A1 | 3/2011 | Wang et al. |
| 2011/0081965 A1 | 4/2011 | Klein et al. |
| 2011/0088053 A1 | 4/2011 | Lee |
| 2011/0107369 A1* | 5/2011 | O'Brien .................. G06F 16/78 725/38 |
| 2011/0115977 A1* | 5/2011 | Simpson .............. H04N 21/435 348/564 |
| 2011/0116764 A1* | 5/2011 | Ramamurthy ....... G11B 27/034 386/245 |
| 2011/0123062 A1* | 5/2011 | Hilu .................... G06Q 30/02 382/100 |
| 2011/0138020 A1 | 6/2011 | Pantos et al. |
| 2011/0145246 A1 | 6/2011 | Prager et al. |
| 2011/0145581 A1 | 6/2011 | Malhotra et al. |
| 2011/0154185 A1 | 6/2011 | Kern et al. |
| 2011/0157475 A1 | 6/2011 | Wright et al. |
| 2011/0173200 A1 | 7/2011 | Yang et al. |
| 2011/0196921 A1 | 8/2011 | Sylthe |
| 2011/0197237 A1* | 8/2011 | Turner ................ H04N 21/64769 725/78 |
| 2011/0225608 A1 | 9/2011 | Lopatecki et al. |
| 2011/0231660 A1 | 9/2011 | Kanungo |
| 2011/0246621 A1* | 10/2011 | May, Jr. .............. H04L 65/4084 709/219 |
| 2011/0246623 A1* | 10/2011 | Pantos .................. H04L 65/608 709/219 |
| 2011/0246885 A1* | 10/2011 | Pantos .................... H04L 67/36 715/716 |
| 2011/0252118 A1* | 10/2011 | Pantos .................. G06F 3/0484 709/219 |
| 2011/0264530 A1* | 10/2011 | Santangelo ......... H04L 65/4076 705/14.64 |
| 2011/0264727 A1* | 10/2011 | Keum .................... H04L 65/80 709/203 |
| 2011/0289121 A1* | 11/2011 | Pirkner .............. H04N 21/8133 707/805 |
| 2011/0320287 A1* | 12/2011 | Holt .................... H04N 21/235 705/14.73 |
| 2011/0321003 A1 | 12/2011 | Doig et al. |
| 2012/0011225 A1 | 1/2012 | Keum et al. |
| 2012/0023516 A1 | 1/2012 | Wolinsky et al. |
| 2012/0036350 A1* | 2/2012 | Kuno .................. H04N 21/8456 713/150 |
| 2012/0036538 A1* | 2/2012 | Kudelski ............ H04N 21/4622 725/53 |
| 2012/0045054 A1* | 2/2012 | Main .................. H04N 21/8358 380/252 |
| 2012/0047542 A1* | 2/2012 | Lewis .................. H04N 21/812 725/97 |
| 2012/0072731 A1* | 3/2012 | Winograd ................ G09C 5/00 713/176 |
| 2012/0096546 A1 | 4/2012 | Dilley et al. |
| 2012/0124605 A1* | 5/2012 | Praden .................... H04H 60/33 725/14 |
| 2012/0137015 A1* | 5/2012 | Sun ........................ G11B 27/10 709/231 |
| 2012/0143994 A1* | 6/2012 | Calcev ................ H04N 21/4331 709/219 |
| 2012/0144302 A1 | 6/2012 | Campanotti et al. |
| 2012/0166667 A1 | 6/2012 | Hall |
| 2012/0183229 A1* | 7/2012 | McDevitt ......... H04N 21/47815 382/218 |
| 2012/0209949 A1 | 8/2012 | Deliyannis et al. |
| 2012/0222075 A1 | 8/2012 | Liu et al. |
| 2012/0239809 A1 | 9/2012 | Mazumdar et al. |
| 2012/0243851 A1 | 9/2012 | Koreeda et al. |
| 2012/0251015 A1 | 10/2012 | Lim et al. |
| 2012/0254456 A1* | 10/2012 | Visharam ........... H04N 21/2343 709/231 |
| 2012/0265735 A1 | 10/2012 | McMillan et al. |
| 2012/0284804 A1* | 11/2012 | Lindquist ........... H04L 63/0428 726/29 |
| 2012/0308071 A1* | 12/2012 | Ramsdell ........... H04N 1/32144 382/100 |
| 2012/0311126 A1 | 12/2012 | Jadallah et al. |
| 2012/0315011 A1* | 12/2012 | Messmer ................ H04N 21/84 386/230 |
| 2013/0007298 A1 | 1/2013 | Ramaswamy et al. |
| 2013/0007794 A1* | 1/2013 | Besehanic .......... H04N 21/6582 725/20 |
| 2013/0013761 A1* | 1/2013 | Grube ................ H04L 65/4084 709/223 |
| 2013/0054972 A1* | 2/2013 | Thorwirth .......... H04N 21/8358 713/176 |
| 2013/0061275 A1 | 3/2013 | Seo et al. |
| 2013/0066891 A1 | 3/2013 | Boldyrev et al. |
| 2013/0067052 A1* | 3/2013 | Reynolds ........... H04N 21/2668 709/223 |
| 2013/0073960 A1 | 3/2013 | Eppolito et al. |
| 2013/0091249 A1* | 4/2013 | McHugh ............ H04N 21/6332 709/219 |
| 2013/0094590 A1* | 4/2013 | Laksono ............ G06F 16/7867 375/240.25 |
| 2013/0097285 A1 | 4/2013 | van Zwol et al. |
| 2013/0120651 A1* | 5/2013 | Perry .................. H04N 21/8358 348/441 |
| 2013/0124679 A1 | 5/2013 | Harrang et al. |

(56) References Cited

U.S. PATENT DOCUMENTS

| | | | |
|---|---|---|---|
| 2013/0124747 A1* | 5/2013 | Harrang | G06F 16/9574 709/231 |
| 2013/0132727 A1* | 5/2013 | Petrovic | G06F 16/71 713/176 |
| 2013/0159388 A1* | 6/2013 | Forsman | H04N 21/6581 709/203 |
| 2013/0166868 A1* | 6/2013 | Jarnikov | H04N 21/23895 711/162 |
| 2013/0202150 A1 | 8/2013 | Sinha et al. | |
| 2013/0205319 A1 | 8/2013 | Sinha et al. | |
| 2013/0226942 A1 | 8/2013 | Denoual et al. | |
| 2013/0231931 A1* | 9/2013 | Kulis | G10L 15/22 704/235 |
| 2013/0235072 A1* | 9/2013 | Longhurst | H04N 19/184 345/605 |
| 2013/0247078 A1 | 9/2013 | Nikankin et al. | |
| 2013/0268623 A1 | 10/2013 | Besehanic et al. | |
| 2013/0268630 A1 | 10/2013 | Besehanic et al. | |
| 2013/0276148 A1 | 10/2013 | Killian et al. | |
| 2013/0290508 A1 | 10/2013 | Besehanic et al. | |
| 2013/0291001 A1* | 10/2013 | Besehanic | H04N 21/8358 725/20 |
| 2013/0297410 A1* | 11/2013 | Oh | G06Q 30/0275 705/14.45 |
| 2013/0297737 A1* | 11/2013 | Wajs | H04L 67/02 709/217 |
| 2013/0311776 A1 | 11/2013 | Besehanic | |
| 2013/0311780 A1 | 11/2013 | Besehanic | |
| 2014/0020005 A1* | 1/2014 | Amselem | H04N 21/44008 725/19 |
| 2014/0033036 A1 | 1/2014 | Gaur et al. | |
| 2014/0082220 A1 | 3/2014 | Ramaswamy et al. | |
| 2014/0095662 A1 | 4/2014 | Klos et al. | |
| 2014/0105392 A1* | 4/2014 | Robert | H04N 21/44055 380/210 |
| 2014/0229629 A1 | 8/2014 | Besehanic | |
| 2014/0229970 A1 | 8/2014 | Besehanic | |
| 2014/0244828 A1 | 8/2014 | Besehanic | |
| 2014/0298365 A1 | 10/2014 | Matsubara et al. | |
| 2014/0301386 A1 | 10/2014 | Harrenstien et al. | |
| 2015/0135206 A1* | 5/2015 | Reisman | H04H 20/93 725/18 |
| 2015/0135214 A1* | 5/2015 | Reisman | H04N 21/4113 725/37 |
| 2015/0222939 A1* | 8/2015 | Gallant | H04L 43/062 725/9 |
| 2016/0043916 A1* | 2/2016 | Ramaswamy | H04N 21/2353 709/224 |
| 2016/0127466 A1 | 5/2016 | Albrecht et al. | |
| 2017/0041204 A1* | 2/2017 | Besehanic | H04L 43/06 |
| 2017/0142180 A1* | 5/2017 | McGowan | H04N 21/242 |
| 2018/0013807 A1* | 1/2018 | Forsman | H04L 65/60 |
| 2020/0104278 A1 | 4/2020 | Kindig et al. | |
| 2021/0014140 A1 | 1/2021 | Ramaswamy et al. | |

FOREIGN PATENT DOCUMENTS

| | | |
|---|---|---|
| AU | 2003230993 | 11/2003 |
| AU | 2006203639 | 8/2006 |
| AU | 2012272872 | 8/2015 |
| BR | 112901 | 6/2003 |
| BR | 309598 | 2/2005 |
| CA | 2483104 | 4/2003 |
| CN | 1457600 | 11/2003 |
| CN | 1592906 | 3/2005 |
| CN | 1647160 | 7/2005 |
| CN | 101115124 | 1/2008 |
| CN | 101198045 | 6/2008 |
| CN | 102045312 | 5/2011 |
| CN | 102065339 | 5/2011 |
| EP | 769749 | 4/1997 |
| EP | 1176826 | 1/2002 |
| EP | 1349370 | 10/2003 |
| EP | 1406403 | 4/2004 |
| EP | 1307833 | 6/2006 |
| EP | 1760612 | 3/2007 |
| EP | 1745464 | 10/2007 |
| EP | 1853026 | 11/2007 |
| EP | 1704695 | 2/2008 |
| EP | 1504445 | 8/2008 |
| EP | 2166730 | 3/2010 |
| JP | 2002247610 | 8/2002 |
| JP | 2003524199 | 8/2003 |
| JP | 2004320752 | 11/2004 |
| WO | 95/027349 | 10/1995 |
| WO | 97/002672 | 1/1997 |
| WO | 00/04662 | 1/2000 |
| WO | 00/19699 | 4/2000 |
| WO | 01/019088 | 3/2001 |
| WO | 01/024027 | 4/2001 |
| WO | 01/031497 | 5/2001 |
| WO | 01/040963 | 6/2001 |
| WO | 01/046782 | 6/2001 |
| WO | 2001046782 | 6/2001 |
| WO | 01/053922 | 7/2001 |
| WO | 01/075743 | 10/2001 |
| WO | 01/091109 | 11/2001 |
| WO | 02/005517 | 1/2002 |
| WO | 02/011123 | 2/2002 |
| WO | 02/015081 | 2/2002 |
| WO | 02/017591 | 2/2002 |
| WO | 02/019625 | 3/2002 |
| WO | 02/027600 | 4/2002 |
| WO | 02/037381 | 5/2002 |
| WO | 02/045034 | 6/2002 |
| WO | 02/061652 | 8/2002 |
| WO | 02/065305 | 8/2002 |
| WO | 02/065318 | 8/2002 |
| WO | 02/069121 | 9/2002 |
| WO | 03/009277 | 1/2003 |
| WO | 03/091990 | 11/2003 |
| WO | 03/094499 | 11/2003 |
| WO | 03/096337 | 11/2003 |
| WO | 2004010352 | 1/2004 |
| WO | 2004040416 | 5/2004 |
| WO | 2004040475 | 5/2004 |
| WO | 2004061699 | 7/2004 |
| WO | 2005025217 | 3/2005 |
| WO | 2005064885 | 7/2005 |
| WO | 2005101243 | 10/2005 |
| WO | 2005111998 | 11/2005 |
| WO | 2006012241 | 2/2006 |
| WO | 2006025797 | 3/2006 |
| WO | 2007056531 | 5/2007 |
| WO | 2007056532 | 5/2007 |
| WO | 2008042953 | 4/2008 |
| WO | 2008044664 | 4/2008 |
| WO | 2008045950 | 4/2008 |
| WO | 2008110002 | 9/2008 |
| WO | 2008110790 | 9/2008 |
| WO | 2009011206 | 1/2009 |
| WO | 2009061651 | 5/2009 |
| WO | 2009064561 | 5/2009 |
| WO | 2010095320 | 8/2010 |
| WO | 2010127268 | 11/2010 |
| WO | 2012177866 | 12/2012 |
| WO | 2012177870 | 12/2012 |
| WO | 2012177872 | 12/2012 |
| WO | 2012177874 | 12/2012 |

OTHER PUBLICATIONS

Garcia, Roberto, and Oscar Celma. "Semantic Integration and Retrieval of Multimedia Metadata." SemAnnot@ ISWC. 2005. (Year: 2005).*

Hellmuth, Oliver, et al. "Using MPEG-7 audio fingerprinting in real-world applications." Audio Engineering Society Convention 115. Audio Engineering Society, 2003. (Year: 2003).*

Garcia, Roberto, et al. "Multimedia content description using semantic web languages." Semantic Multimedia and Ontologies. Springer, London, 2008. 17-54. (Year: 2008).*

(56) References Cited

OTHER PUBLICATIONS

Cano, Pedro, et al. "Audio fingerprinting: concepts and applications." Computational intelligence for modelling and prediction. Springer, Berlin, Heidelberg, 2005. 233-245. (Year: 2005).*

Hahn, Clemens, et al. "Metadata Aggregation for Personalized Music Playlists." Symposium of the Austrian HCI and Usability Engineering Group. Springer, Berlin, Heidelberg, 2010. (Year: 2010).*

Canadian Intellectual Property Office, "Office Action," mailed in connection with application No. CA 2,773,567, dated Mar. 6, 2014, 2 pages.

State Intellectual Property Office of China, "First Office Action," mailed in connection with application No. CN 201210105474.3, dated Feb. 8, 2014, 15 pages.

United States Patent and Trademark Office, "Non-Final Office Action," mailed in connection with U.S. Appl. No. 13/341,646, dated Jun. 5, 2014, 17 pages.

United States Patent and Trademark Office, "Final Office Action," mailed in connection with U.S. Appl. No. 13/181,147, dated Mar. 10, 2014, 48 pages.

United States Patent and Trademark Office, "Final Office Action," mailed in connection with U.S. Appl. No. 13/443,596, dated Apr. 9, 2014, 20 pages.

United States Patent and Trademark Office, "Final Office Action," mailed in connection with U.S. Appl. No. 13/793,991, dated Apr. 11, 2014, 15 pages.

International Bureau, "International Preliminary Report on Patentability" mailed in connection with International Application No. PCT/US2012/043544, dated Jan. 9, 2014, 9 pages.

Ip Australia, "Examination Report," mailed in connection with Australian Patent Application No. 2012272868, dated Jun. 27, 2014, 3 pages.

IP Australia, "Examination Report," mailed in connection with Australian Patent Application No. 2012272874, dated Jun. 27, 2014, 3 pages.

IP Australia, "Examination Report," mailed in connection with Australian Patent Application No. 2012272872, dated Jun. 24, 2014, 4 pages.

United States Patent and Trademark Office, "Notice of Allowance," mailed in connection with U.S. Appl. No. 13/341,661 dated Jul. 8, 2014, 8 pages.

United States Patent and Trademark Office, "Final Office Action," mailed in connection with U.S. Appl. No. 13/793,983, dated Jun. 6, 2014, 13 pages.

IP Australia, "Examination Report," mailed in connection with Australian Patent Application No. 2012272876, dated Sep. 18, 2014, 4 pages.

IP Australia, "Examination Report," mailed in connection with Australian Patent Application No. 2013203778, dated Aug. 21, 2014, 5 pages.

IP Australia, "Examination Report," mailed in connection with Australian Patent Application No. 2013204488, dated Aug. 12, 2014, 5 pages.

United States Patent and Trademark Office, "Non-Final Office Action," mailed in connection with U.S. Appl. No. 13/443,596, dated Sep. 25, 2014, 22 pages.

United States Patent and Trademark Office, "Notice of Allowance," mailed in connection with U.S. Appl. No. 13/341,646, dated Nov. 3, 2014, 10 pages.

U.S. Appl. No. 13/341,646, filed Dec. 30, 2011, 78 pages.

U.S. Appl. No. 13/341,661, filed Dec. 30, 2011, 79 pages.

U.S. Appl. No. 13/181,147, filed Jul. 12, 2011, 41 pages.

United States Patent and Trademark Office, "Office Action," mailed in connection with U.S. Appl. No. 13/793,983 dated Nov. 8, 2013, 13 pages.

Patent Cooperation Treaty, "International Search Report and Written Opinion," mailed in connection with International application No. PCT/US2012/043535, dated Feb. 21, 2013, 15 pages.

United States Patent and Trademark Office, "Notice of Allowance," mailed in connection with U.S. Appl. No. 13/341,661 dated Sep. 23, 2013, 10 pages.

United States Patent and Trademark Office, "Office Action," mailed in connection with U.S. Appl. No. 13/181,147 dated Aug. 15, 2013, 46 pages.

United States Patent and Trademark Office, "Office Action," mailed in connection with U.S. Appl. No. 13/443,596 dated Nov. 21, 2013, 25 pages.

United States Patent and Trademark Office, "Office Action," mailed in connection with U.S. Appl. No. 13/793,991 dated Dec. 6, 2013, 21 pages.

United States Patent and Trademark Office, "Non-Final Office Action," mailed in connection with U.S. Appl. No. 13/455,961, dated Dec. 5, 2014, 13 pages.

United States Patent and Trademark Office, "Non-Final Office Action," mailed in connection with U.S. Appl. No. 13/793,991, dated Nov. 10, 2014, 19 pages.

U.S. Appl. No. 13/455,961, filed Apr. 25, 2012, 61 pages.

"Video: timed text tracks," Windows Internet Explorer, Microsoft, 2012, http://msdn.microsoft.com/en-us/library/ie/hh673566(v=vs.85).aspx, 6 pages.

Apple Inc. "HTTP Live Streaming Overview," Apr. 1, 2011, 36 pages.

Apple Inc. "Timed Metadata for HTTP Live Streaming," Apr. 28, 2011, 12 pages.

R. Pantos, Ed., & W. May, Apple Inc. "HTTP Live Streaming: draft-pantos-http-live-streaming-07," Sep. 2011, 33 pages.

Eric Winkelman, "Timed Text Tracks and TV Services," Aug. 15, 2011, 5 pages.

U.S. Appl. No. 13/443,596, filed Apr. 10, 2012, 50 pages.

U.S. Appl. No. 13/793,983, filed Mar. 11, 2013, 68 pages.

"What is Jacked?," http://www.jacked.com/ retrieved on Dec. 3, 2009, 1 page).

Anderson, "Google to compete with Nielsen for TV-ratings info?," Ars Technica, Jun. 19, 2006, 3 pages).

Boehret, "Yahoo Widgets Lend Brains to Boob Tube," The Wall Street Journal, Mar. 25, 2009, 4 pages).

Claburn, "Google Researchers Propose TV Monitoring," Information Week, Jun. 7, 2006, 4 pages).

Evain, "TV-Anytime Metadata—A Preliminary Specification on Schedule!," EBU Technical Review, Sep. 2000 [http://www.ebu.ch/en/technical/trev/trev_284-contents.html, retrieved on Jul. 20, 2006], 15 pages.

Fink et al., "Social- and Interactive-Television Applications Based on Real-Time Ambient-Audio Identification," EuroITV, 2006, 10 pages).

Heuer et al., "Adaptive Multimedia Messaging based on MPEG-7—The M3-Box," Proc. Second Int'l Symposium on Mobile Multimedia Systems Applications, Nov. 9-10, 2000, 8 pages.

Heussner, "Sound-Triggered Smart Phone Ads Seek You Out," Adweek.com, http://www.adweek.com/news/advertising-branding/sound-triggered-smartphone-ads-seek-you-out-136901, Dec. 7, 2011, 3 page).

Hopper, "EBU Project Group P/META Metadata Exchange Standards," EBU Technical Review, Sep. 2000 [http://www.ebu.ch/en/technical/trev/trev_284-contents.html, retrieved on Jul. 20, 2006], 25 pages.

Kane, "Entrepreneur Plans On-Demand Videogame Service," The Wall Street Journal, Mar. 24, 2009, 2 pages.

Laven,"EBU Technical Review, Editorial)," No. 284, Sep. 2000 [http://www.ebu.ch/en/technical/trev/trev_284-contents.html, retrieved on Jul. 20, 2006], 3 pages.

Mulder, "The Integration of Metadata From Production to Consumer," EBU Technical Review, Sep. 2000 [http://www.ebu.ch/en/technical/trev/trev_284-contents.html, retrieved on Jul. 20, 2006], 5 pages.

Patent Cooperation Treaty, "International Search Report and Written Opinion," mailed in connection with International Application Serial No. PCT/US2010/033201, dated Oct. 1, 2010, 16 pages.

Patent Cooperation Treaty, "International Preliminary Examination Report," mailed in connection with International Application Serial No. PCT/US2003/031180, dated Aug. 17, 2004, 4 pages.

(56) References Cited

OTHER PUBLICATIONS

Patent Cooperation Treaty, "International Preliminary Report on Patentability," mailed in connection with International Application Serial No. PCT/US2005/026426, dated Feb. 1, 2007, 9 pages.
Patent Cooperation Treaty, "International Search Report and Written Opinion," mailed in connection with International Application Serial No. PCT/US2005/026426, dated Aug. 18, 2006, 10 pages.
Patent Cooperation Treaty, "International Search Report and Written Opinion," mailed in connection with International Application Serial No. PCT/US2009/061479, dated May 26, 2010, 15 pages.
Patent Cooperation Treaty, "International Search Report and Written Opinion," mailed in connection with International Application Serial No. PCT/US2009/061750, dated Mar. 3, 2010, 10 pages.
Patent Cooperation Treaty, "International Search Report and Written Opinion," mailed in connection with International Application Serial No. PCT/US2009/061827, dated Mar. 15, 2010, 12 pages.
Patent Cooperation Treaty, "International Search Report," mailed in connection with International Application Serial No. PCT/US2003/031180, dated Jun. 8, 2004, 5 pages.
Shazam, "Shazam and VidZone Digital Media announce UKls first fixed price mobile download service for music videos," http://www.shazam.com/music/web/newsdetail.html?nid=NEWS136, Feb. 11, 2008, 1 page).
Shazam, "Shazam launches new music application for Facebook fans," http://www.shazam.com/music/web/newsdetail.html?nid=NEWS135, Feb. 18, 2008, 1 page).
Shazam, "Shazam turns up the volume on mobile music," http://www.shazam.com/music/web/newsdetail.html?nid=NEWS137, Nov. 28, 2007, 1 page).
Shazam, Company summary outline and list of products, 2002, 1 page).
Stross, "Apple Wouldn't Rist Its Cool Over a Gimmick, Would It?," The New York Times, Nov. 14, 2009, 3 pages).
Stultz, "Handheld Captioning at Disney World Theme Parks," article retrieved on Mar. 8, 2013, http://goflorida.about.com/od/disneyworld/a/wdw_captioning.htm, 1 page).
Sullivan, "Google Cozies Up To SMBs For Digital Content," MediaPost News, Mar. 19, 2009, 3 pages.
USPTO, "Advisory Action," mailed in connection with U.S. Appl. No. 11/618,245, dated Sep. 30, 2009, 4 pages.
USPTO, "Final Office Action," mailed in connection with U.S. Appl. No. 10/530,233, dated Mar. 18, 2010, 23 pages.
USPTO, "Final Office Action," mailed in connection with U.S. Appl. No. 11/618,245, dated Jul. 21, 2009, 31 pages.
USPTO, "Non-Final Office Action," mailed in connection with U.S. Appl. No. 10/530,233, dated Sep. 16, 2009, 31 pages.
USPTO, "Non-Final Office Action," mailed in connection with U.S. Appl. No. 11/618,245, dated Feb. 5, 2009, 48 pages.
Wactlar et al., "Digital Video Archives: Managing Through Metadata" Building a National Strategy for Digital Preservation: Issues in Digital Media Archiving, http://www.informedia.cs.cmu.edu/documents/Wactlar-CLIR-final.pdf, Apr. 2002, 14 pages.
Wang, "An Industrial-Strength Audio Search Algorithm," Shazam Entertainment, Ltd., in Proceedings of the Fourth International Conference on Music Information Retrieval, Baltimore, Oct. 26-30, 2003, 7 pages).
CIPO, "Office Action," mailed in connection with Canadian Application Serial No. 2,574,998, dated Aug. 26, 2008, 4 pages.
CIPO, "Office Action," mailed in connection with Canadian Application Serial No. 2,574,998, dated Mar. 23, 2009, 5 pages.
CIPO, "Office Action," mailed in connection with Canadian Application Serial No. 2,574,998, dated Nov. 13, 2009, 10 pages.
Patent Cooperation Treaty, "International Search Report and Written Opinion," mailed in connection with International application No. PCT/US2012/043539, dated Jan. 17, 2013, 9 pages.
Patent Cooperation Treaty, "International Search Report and Written Opinion," mailed in connection with International application No. PCT/US2012/043544, dated Jan. 17, 2013, 15 pages.
Patent Cooperation Treaty, "International Search Report and Written Opinion," mailed in connection with International application No. PCT/US2012/043546, dated Dec. 10, 2012, 6 pages.
USPTO, "Final Office Action," mailed in connection with U.S. Appl. No. 11/618,245, dated Oct. 26, 2011, 38 pages.
USPTO, "Non-Final Office Action," mailed in connection with U.S. Appl. No. 11/618,245, dated Apr. 28, 2011, 48 pages.
USPTO, "Requirement for Restriction," mailed in connection with U.S. Appl. No. 10/530,233, dated Jun. 10, 2009, 20 pages.
USPTO, "Non-Final Office Action," mailed in connection with U.S. Appl. No. 13/341,661, dated Mar. 19, 2013, 10 pages.
USPTO, "Non-Final Office Action," mailed in connection with U.S. Appl. No. 13/181,147, dated Nov. 21, 2012, 30 pages.
USPTO, "Restriction," mailed in connection with U.S. Appl. No. 13/181,147, dated Aug. 10, 2012, 4 pages.
United States Patent and Trademark Office, "Office Action," mailed in connection with U.S. Appl. No. 13/472,170 dated Nov. 8, 2013, 17 pages.
United States Patent and Trademark Office, "Examiner's Answer to Appeal Brief," mailed in connection with U.S. Appl. No. 13/181,147, dated Dec. 22, 2014, 34 pages.
United States Patent and Trademark Office, "Non-Final Office Action," mailed in connection with U.S. Appl. No. 13/767,548, dated Feb. 3, 2015, 10 pages.
United States Patent and Trademark Office, "Non-Final Office Action," mailed in connection with U.S. Appl. No. 13/793,959 dated Jan. 30, 2015, 11 pages.
United States Patent and Trademark Office, "Notice of Allowance," mailed in connection with U.S. Appl. No. 13/793,983, dated Jan. 9, 2015, 12 pages).
United States Patent and Trademark Office, "Non-Final Office Action," mailed in connection with U.S. Appl. No. 13/793,974, dated Feb. 18, 2015, 12 pages).
Mexican Patent Office, "Office Action," mailed in connection with Mexican Patent Application No. MX/a/2014/000280, dated Jan. 21, 2015, 5 pages, English translation included).
United States Patent and Trademark Office, "Corrected Notice of Allowance," mailed in connection with U.S. Appl. No. 13/472,170, dated Feb. 12, 2015, 5 pages.
United States Patent and Trademark Office, "Final Office Action," mailed in connection with U.S. Appl. No. 13/472,170, dated Jun. 18, 2014, 18 pages.
United States Patent and Trademark Office, "Notice of Allowance," mailed in connection with U.S. Appl. No. 13/472,170, dated Dec. 5, 2014, 12 pages.
United States Patent and Trademark Office, "Final Office Action," mailed in connection with U.S. Appl. No. 13/443,596, dated Feb. 26, 2015, 25 pages.
United States Patent and Trademark Office, "Final Office Action," mailed in connection with U.S. Appl. No. 13/793,991, dated Feb. 27, 2015, 21 pages.
United States Patent and Trademark Office, "Non-Final Office Action," mailed in connection with U.S. Appl. No. 13/778,108, dated Feb. 27, 2015, 13 pages.
United States Patent and Trademark Office, "Non-Final Office Action," mailed in connection with U.S. Appl. No. 13/341,646, dated Mar. 3, 2015, 7 pages.
Japanese Patent Office, "Notice of Reasons for Rejection," mailed in connection with Japanese Patent Application No. P2014-517158, dated Mar. 3, 2015, 7 pages.
Mexican Patent Office, "Notice of Allowance," mailed in connection with Mexican Patent Application No. MX/a/2014/000281, dated Feb. 25, 2015, 1 pages.
United States Patent and Trademark Office, "Notice of Allowance," mailed in connection with U.S. Appl. No. 13/793,983, dated Mar. 16, 2015, 9 pages.
United States Patent and Trademark Office, "Notice of Allowance," mailed in connection with U.S. Appl. No. 13/472,170, dated Mar. 26, 2015, 10 pages.
United States Patent and Trademark Office, "Final Office Action," mailed in connection with U.S. Appl. No. 13/341,661, dated Mar. 26, 2015, 13 pages.

(56) References Cited

OTHER PUBLICATIONS

European Patent Office, "European Search Report," mailed in connection with European Patent Application No. 12803215.8, dated Apr. 20, 2015, 9 pages).
Canadian Patent Office, "Office Action," mailed in connection with Canadian Patent Application No. 2,840,092, dated Apr. 20, 2015, 4 pages.
United States Patent and Trademark Office, "Final Office Action," mailed in connection with U.S. Appl. No. 13/455,961, dated May 20, 2015, 14 pages.
State Intellectual Property Office, "Notice of Allowance" mailed in connection with Application No. 201210105474.3, dated May 25, 2015, 5 pages.
United States Patent and Trademark Office, "Final Office Action," mailed in connection with U.S. Appl. No. 13/793,974, dated May 28, 2015, 13 pages.
Canadian Intellectual Property Office, "Office Action," mailed in connection with Canadian Patent Application No. 2,840,094, dated May 19, 2015, 4 pages.
European Patent Office, "European Search Report," mailed in connection with European Patent Application No. 12802805.7, dated May 27, 2015, 8 pages.
European Patent Office, "European Search Report," mailed in connection with European Patent Application No. 12802746.3, dated May 27, 2015, 9 pages.
United States Patent and Trademark Office, "Notice of Allowance," mailed in connection with U.S. Appl. No. 13/341,646, dated Jun. 19, 2015, 9 pages.
Mexican Patent Office, "Notice of Allowance," mailed in connection with Mexican Patent Application No. MX/a/2014/000280, dated Jun. 12, 2015, 1 page).
United States Patent and Trademark Office, "Notice of Allowance," mailed in connection with U.S. Appl. No. 13/472,170, dated Jul. 7, 2015, 9 pages.
United States Patent and Trademark Office, "Notice of Allowance," mailed in connection with U.S. Appl. No. 13/793,983, dated Jul. 7, 2015, 10 pages.
European Patent Office, "European Search Report" mailed in connection with European Patent Application No. 12802202,7 dated May 28, 2015, 7 pages.
IP Australia, "Notice of Acceptance," mailed in connection with Australian Patent Application No. 2012272868, dated Jul. 22, 2015, 2 pages.
CIPO, "Office Action," mailed in connection with Canadian Application Serial No. 2,773,567, dated Mar. 27, 2015, 6 pages.
United States Patent and Trademark Office, "Final Office Action," mailed in connection with U.S. Appl. No. 13/767,548 dated Aug. 11, 2015, 13 pages.
United States Patent and Trademark Office, "Final Office Action," mailed in connection with U.S. Appl. No. 13/778,108 dated Aug. 13, 2015, 17 pages.
IP Australia, "Notice of Acceptance," mailed in connection with Australian Patent Application No. 2012272872 dated Aug. 6, 2015, 2 pages.
United States Patent and Trademark Office, "Final Office Action," mailed in connection with U.S. Appl. No. 13/793,959, dated Sep. 11, 2015, 12 pages.
IP Australia, "Notice of Acceptance," mailed in connection with Australian Patent Application No. 2012272874, dated Sep. 11, 2015, 2 pages.
United States Patent and Trademark Office, "Non-Final Office Action," mailed in connection with U.S. Appl. No. 13/455,961, dated Sep. 24, 2015, 16 pages.
United States Patent and Trademark Office, "Non-Final Office Action," mailed in connection with U.S. Appl. No. 13/793,974, dated Sep. 24, 2015, 14 pages.
United States Patent and Trademark Office, "Non-Final Office Action," mailed in connection with U.S. Appl. No. 13/443,596, dated Oct. 20, 2015, 23 pages.
United States Patent and Trademark Office, "Non-Final Office Action," mailed in connection with U.S. Appl. No. 13/793,991, dated Oct. 22, 2015, 20 pages.
State Intellectual Property Office of China, "Office Action," mailed in connection with Chinese Patent Application No. 201280032737.0, dated Nov. 10, 2015, 5 pages.
United States Patent and Trademark Office, "Notice of Allowance," mailed in connection with U.S. Appl. No. 12/890,216 dated Aug. 6, 2013, 14 pages.
United States Patent and Trademark Office, "Advisory Action," mailed in connection with U.S. Appl. No. 10/540,611, dated Jan. 22, 2010, 4 pages.
United States Patent and Trademark Office, "Final Office Action," mailed in connection with U.S. Appl. No. 10/540,611, dated Sep. 29, 2009, 36 pages.
United States Patent and Trademark Office, "Non-Final Office Action," mailed in connection with U.S. Appl. No. 10/540,611, dated Mar. 4, 2009, 33 pages.
United States Patent and Trademark Office, "Non-Final Office Action," mailed in connection with U.S. Appl. No. 10/540,611, dated Sep. 15, 2008, 22 pages.
United States Patent and Trademark Office, "Non-Final Office Action," mailed in connection with U.S. Appl. No. 12/890,216, dated Apr. 2, 2012, 33 pages.
United States Patent and Trademark Office, "Notice of Allowance," mailed in connection with U.S. Appl. No. 10/540,611, dated Jun. 22, 2010, 26 pages.
United States Patent and Trademark Office, "Non-Final Office Action," mailed in connection with U.S. Appl. No. 12/890,216, dated Nov. 29, 2012, 22 pages.
United States Patent and Trademark Office, "Non-Final Office Action," mailed in connection with U.S. Appl. No. 14/089,279, dated Mar. 28, 2014, 13 pages.
United States Patent and Trademark Office, "Final Office Action," mailed in connection with U.S. Appl. No. 14/089,279, dated Nov. 21, 2014, 22 pages.
United States Patent and Trademark Office, "Non-Final Office Action," mailed in connection with U.S. Appl. No. 14/089,279, dated Apr. 23, 2015, 23 pages.
Patent Cooperation Treaty, "International Preliminary Examination Report," mailed in connection with International Application Serial No. PCT/US2003/014970, completed Aug. 21, 2004, 6 pages.
Patent Cooperation Treaty, "International Search Report," mailed in connection with International Application Serial No. PCT/US2003/14970, dated Feb. 10, 2004, 1 page).
Van Beek et al., "Metadata-Driven Multimedia Access," IEEE Signal Processing Magazine, vol. 20, No. 2, Institute of Electric and Electronic Engineers, Inc., New York, New York, USA, Mar. 2003, 13 pages.
Vetro et al., "Video Transcoding Architectures and Techniques: An Overview," IEEE Signal Processing Magazine, vol. 20, No. 2, Institute of Electric and Electronic Engineers, Inc., New York, New York, USA, Mar. 2003, 12 pages.
United States Patent and Trademark Office, "Final Office Action," mailed in connection with U.S. Appl. No. 14/089,279, dated Nov. 17, 2015, 29 pages.
United States Patent and Trademark Office, "Final Office Action," mailed in connection with U.S. Appl. No. 13/181,147, dated Dec. 3, 2015, 10 pages.
IP Australia, "Notice of Grant," mailed in connection with Application No. 2012272872, dated Dec. 3, 2015, 1 page.
United States Patent and Trademark Office, "Notice of Allowance," mailed in connection with U.S. Appl. No. 13/767,548, dated Dec. 4, 2015, 9 pages.
United States Patent and Trademark Office, "Non-Final Office Action," mailed in connection with U.S. Appl. No. 13/778,108, dated Jan. 8, 2016, 13 pages.
United States Patent and Trademark Office, "Notice of Allowance," mailed in connection with U.S. Appl. No. 13/793,959, dated Jan. 26, 2016, 9 pages.
United States Patent and Trademark Office, "Non-Final Office Action," mailed in connection with U.S. Appl. No. 13/341,661, dated Feb. 1, 2016, 8 pages.

(56) References Cited

OTHER PUBLICATIONS

Japanese Patent Office, "Notice of Reasons for Rejection," mailed in connection with Japanese Patent Application No. P2014-517158, dated Jan. 26, 2016, 4 pages.
Intellectual Property Office of India, "Examination Report," mailed in connection with Indian Patent Application No. 10208/CHENP/2013, dated Apr. 11, 2018, 7 pages.
European Patent Office, "Extended European Search Report," mailed in connection with European Patent Application No. 18181308.0, dated Aug. 29, 2018, 8 pages.
European Patent Office, "Communication under Rule 71(3) EPC," mailed in connection with European Patent Application No. 18181308.0, dated Jul. 31, 2019, 7 pages.
European Patent Office, "Extended European Search Report," mailed in connection with European Patent Application No. 201535721.1, dated Mar. 13, 2020, 9 pages.
United States Patent and Trademark Office, "Notice of Allowance" mailed in connection with U.S. Appl. No. 13/181,147, dated Feb. 18, 2016, 8 pages).
Canadian Intellectual Property Office, "Office Action," mailed in connection with Canadian Patent Application No. 2,773,567, dated Mar. 9, 2016, 4 pages.
United States Patent and Trademark Office, "Final Office Action," mailed in connection with U.S. Appl. No. 13/455,961, dated Mar. 23, 2016, 17 pages.
United States Patent and Trademark Office, "Final Office Action," mailed in connection with U.S. Appl. No. 13/443,596, dated Apr. 6, 2016, 25 pages.
European Patent Office, "Communication Pursuant to Article 94(3) EPC," mailed in connection with application No. 12002599.4 dated Mar. 4, 2016, 4 pages.
United States Patent and Trademark Office, "Notice of Allowance," mailed in connection with U.S. Appl. No. 13/341,661, dated Aug. 19, 2016, 9 pages.
IP Australia, "Examination Report," mailed in connection with Australian Patent Application No. 2015252031, dated Oct. 21, 2016, 3 pages.
United States Patent and Trademark Office, "Notice of Allowance," mailed in connection with U.S. Appl. No. 14/089,279, dated Nov. 14, 2016, 13 pages.
The State Intellectual Property Office of China, "First Office Action," mailed in connection with Chinese Patent Application No. 201280032738.5, dated Dec. 16, 2016, 13 pages.
United States Patent and Trademark Office, "Non-Final Office Action," mailed in connection with U.S. Appl. No. 14/725,877, dated Jan. 26, 2017, 14 pages.
United States Patent and Trademark Office, "Non-Final Office Action," mailed in connection with U.S. Appl. No. 15/181,399, dated Aug. 9, 2016, 44 pages.
United States Patent and Trademark Office, "Corrected Notice of Allowance," mailed in connection with U.S. Appl. No. 15/181,399, dated Feb. 16, 2017, 6 pages.
United States Patent and Trademark Office, "Notice of Allowance," mailed in connection with U.S. Appl. No. 15/181,399, dated Jan. 27, 2017, 9 pages.
United States Patent and Trademark Office, "Non-Final Office Action," mailed in connection with U.S. Appl. No. 15/331,568, dated Feb. 24, 2017, 9 pages.
European Patent Office, "Examination Report," mailed in connection with European Patent Application No. 12802746.3, dated Feb. 23, 2017, 6 pages.
United States Patent and Trademark Office, "Notice of Allowance," mailed in connection with U.S. Appl. No. 14/725,877, dated May 5, 2017, 10 pages.
United States Patent and Trademark Office, "Examiner's Answer to Appeal Brief," issued in connection with U.S. Appl. No. 13/778,108, dated May 5, 2017, 24 pages.
United States Patent and Trademark Office, "Non-Final Office Action," mailed in connection with U.S. Appl. No. 15/466,547, dated May 5, 2017, 12 pages.
United States Patent and Trademark Office, "Notice of Allowance," mailed in connection with U.S. Appl. No. 15/331,568, dated Aug. 1, 2017, 9 pages.
State Intellectual Property Office of China, "Notice of Decision of Granting Patent Right for Invention," mailed in connection with Chinese Patent Application No. 201280032738.5, dated Aug. 11, 2017, 5 pages.
IP Australia, "Notice of Acceptance," mailed in connection with Australian Patent Application No. 2015252031, dated Oct. 13, 2017, 3 pages.
United States Patent and Trademark Office, "Notice of Allowance," mailed in connection with U.S. Appl. No. 15/466,547, dated Oct. 11, 2017, 10 pages.
United States Patent and Trademark Office, "Notice of Allowance," mailed in connection with U.S. Appl. No. 14/922,918, dated May 18, 2020, 8 pages.
United States Patent and Trademark Office, "Final Office Action," mailed in connection with U.S. Appl. No. 14/922,918, dated Jan. 29, 2020, 21 pages.
United States Patent and Trademark Office, "Non-final Office Action," mailed in connection with U.S. Appl. No. 14/922,918, dated Jul. 17, 2019, 20 pages.
United States Patent and Trademark Office, "Final Office Action," mailed in connection with U.S. Appl. No. 14/922,918, dated Apr. 5, 2018, 24 pages.
United States Patent and Trademark Office, "Non-final Office Action," mailed in connection with U.S. Appl. No. 14/922,918, dated Aug. 24, 2017, 20 pages.
United States Patent and Trademark Office, "Final Office Action," mailed in connection with U.S. Appl. No. 14/922,918, dated Apr. 6, 2017, 18 pages.
United States Patent and Trademark Office, "Non-final Office Action," mailed in connection with U.S. Appl. No. 14/922,918, dated Sep. 9, 16 pages.
European Patent Office, "Extended European Search Report," mailed in connection with European Patent Application No. 20153572.1, dated Mar. 13, 2020, 9 pages.
State Intellectual Property Office of China, "Office Action," mailed in connection with Chinese Patent Application No. 201710999408.8, dated Feb. 3, 2020, 11 pages.
State Intellectual Property Office of China, "Notice of Decision of Granting Patent Right for Invention," mailed in connection with Chinese Patent Application No. 201710999408.8, dated Jul. 6, 2020, 5 pages.
European Patent Office, "Communication Pursuant to Article 94(3) EPC," mailed in connection with European Patent Application No. 20153572.1, dated Feb. 15, 2021, 8 pages.
United States Patent and Trademark Office, "Non-final Office Action," mailed in connection with U.S. Appl. No. 16/783,865, dated Jun. 1, 2021, 35 pages.
United States Patent and Trademark Office, "Notice of Allowance and Fee(s) Due," mailed in connection with U.S. Appl. No. 16/783,865 dated Nov. 30, 2021, 9 pages.

\* cited by examiner

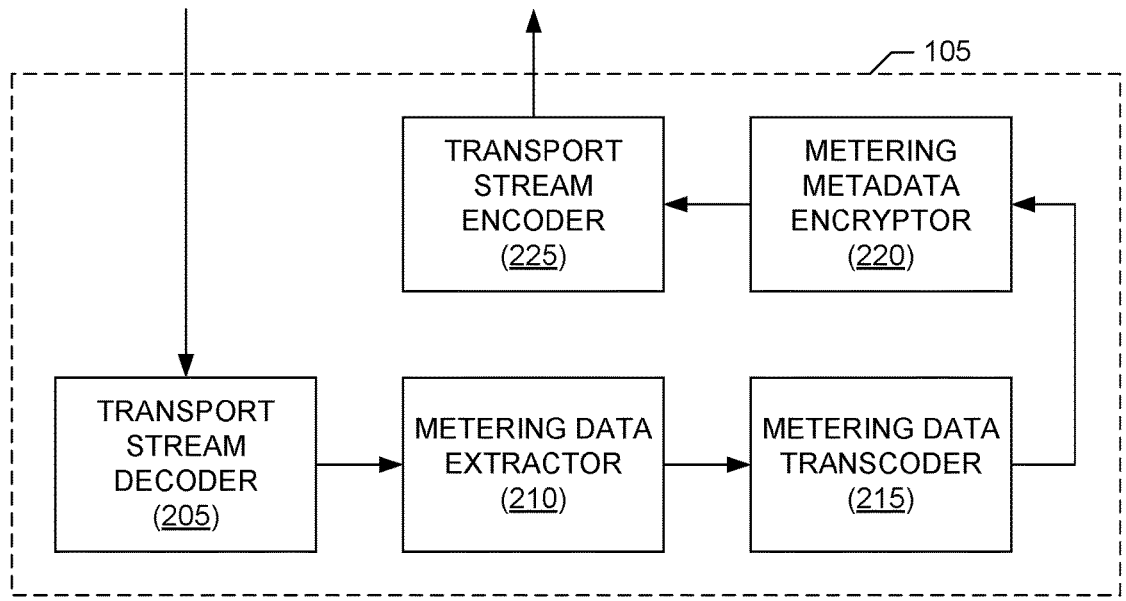
FIG. 2
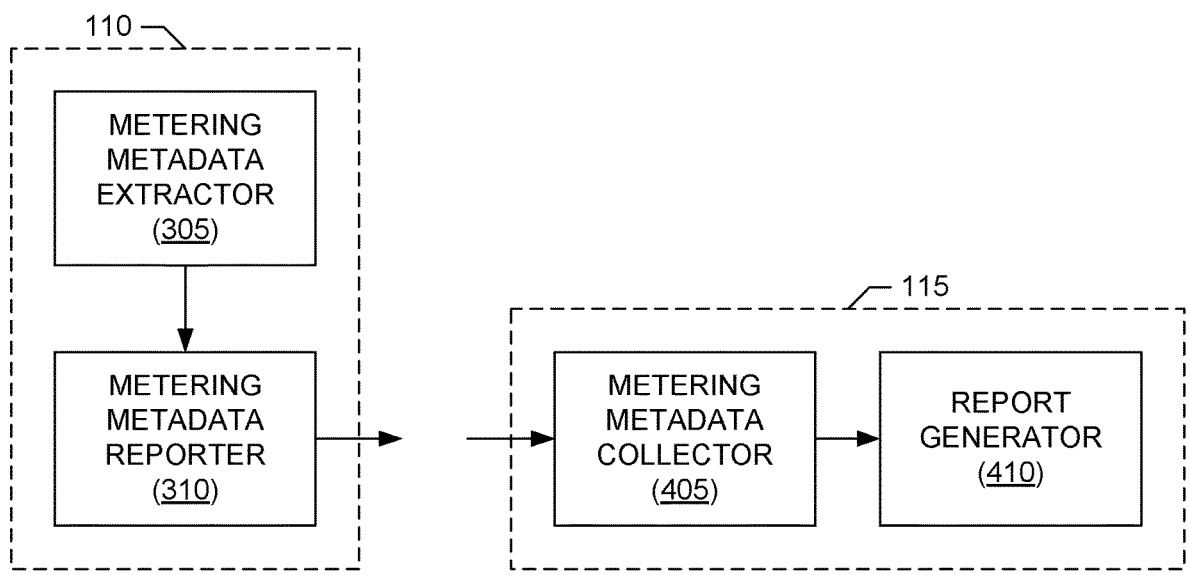
FIG. 3
FIG. 4

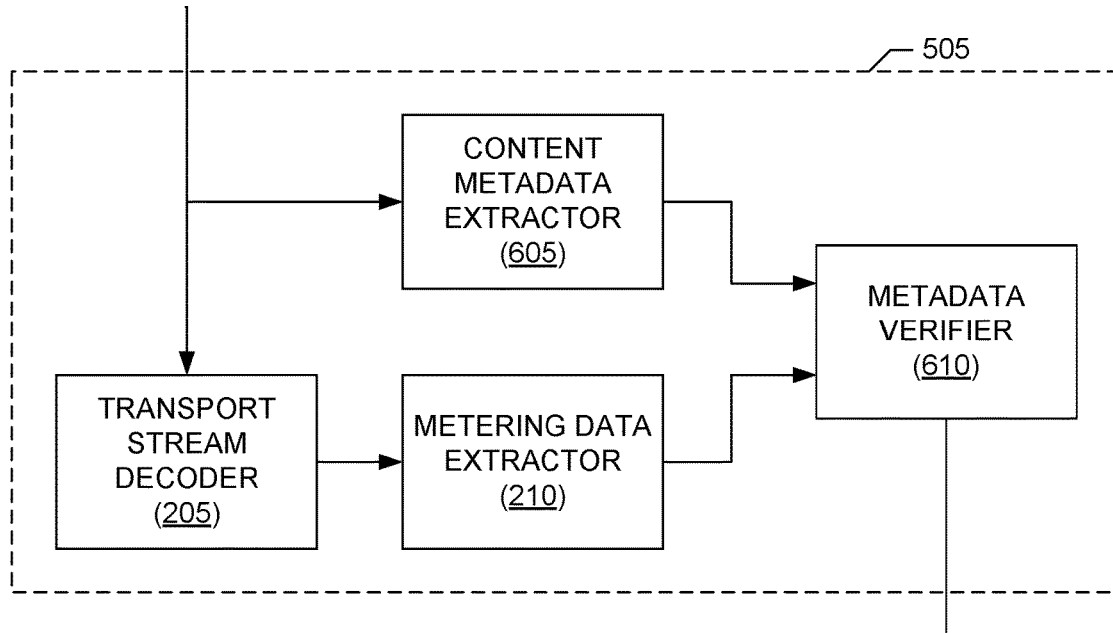
FIG. 6
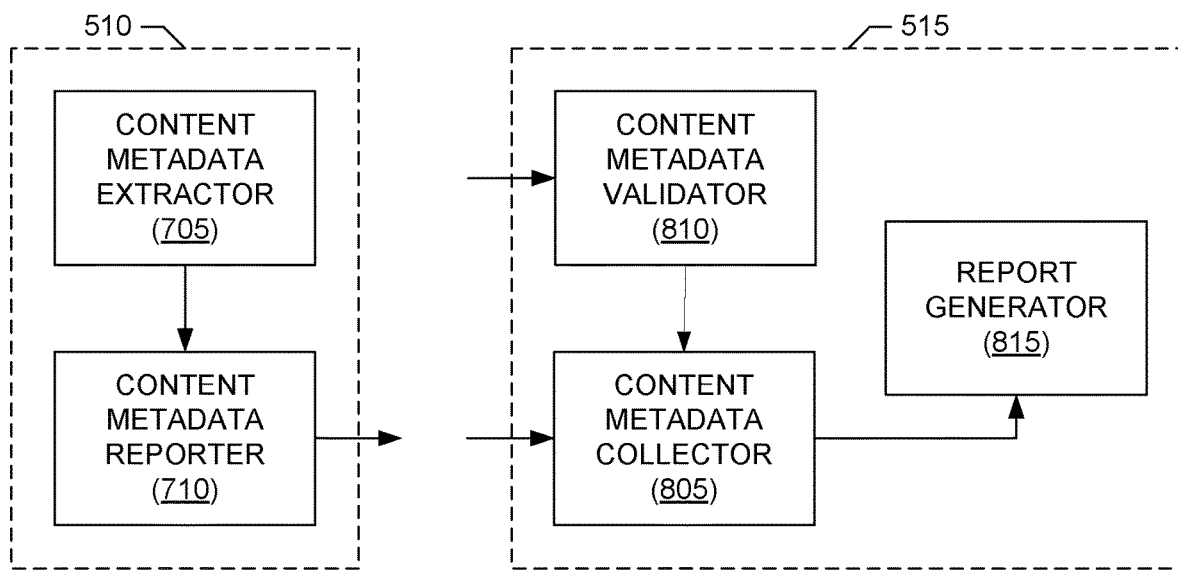
FIG. 7
FIG. 8

MONITORING STREAMING MEDIA CONTENT

RELATED APPLICATIONS

This patent arises from a continuation of U.S. patent application Ser. No. 14/922,918 (now U.S. Pat. No. 10,791,042), titled "Monitoring Streaming Media Content," which was filed on Oct. 26, 2015, and which is a continuation of U.S. patent application Ser. No. 13/341,646 (now U.S. Pat. No. 9,210,208), titled "Monitoring Streaming Media Content," which was filed on Dec. 30, 2011, and which claims the benefit of and priority from (a) U.S. Provisional Application Ser. No. 61/499,520, titled "Monitoring Streaming Media Content," which was filed on Jun. 21, 2011, and (b) U.S. Provisional Application Ser. No. 61/568,631, titled "Monitoring Streaming Media Content," which was filed on Dec. 8, 2011. U.S. patent application Ser. No. 14/922,918, U.S. patent application Ser. No. 13/341,646, and U.S. Provisional Application Ser. Nos. 61/499,520 and 61/568,631 are hereby incorporated by reference herein in their respective entireties.

FIELD OF THE DISCLOSURE

This disclosure relates generally to content monitoring and, more particularly, to monitoring streaming media content.

BACKGROUND

Streaming enables media content to be delivered to and presented by a wide variety of content presentation devices, such as desktop computers, laptop computers, tablet computers, personal digital assistants, smartphones, etc. Because a significant portion of media content is presented via streaming to such devices, monitoring of streaming media content, like the monitoring of broadcasted media content, can provide valuable information to advertisers, content providers, and the like.

BRIEF DESCRIPTION OF THE DRAWINGS

FIG. 2 is a block diagram of a first example server meter, which may be used to implement the example system of FIG. 1.

FIG. 3 is a block diagram of a first example device meter, which may be used to implement the example system of FIG. 1.

FIG. 4 is a block diagram of a first example media monitoring facility, which may be used to implement the example system of FIG. 1.

FIG. 6 is a block diagram of a second example server meter, which may be used to implement the example system of FIG. 5.

FIG. 7 is a block diagram of a second example device meter, which may be used to implement the example system of FIG. 5.

FIG. 8 is a block diagram of a second example media monitoring facility, which may be used to implement the example system of FIG. 5.

DETAILED DESCRIPTION

Figure 1:
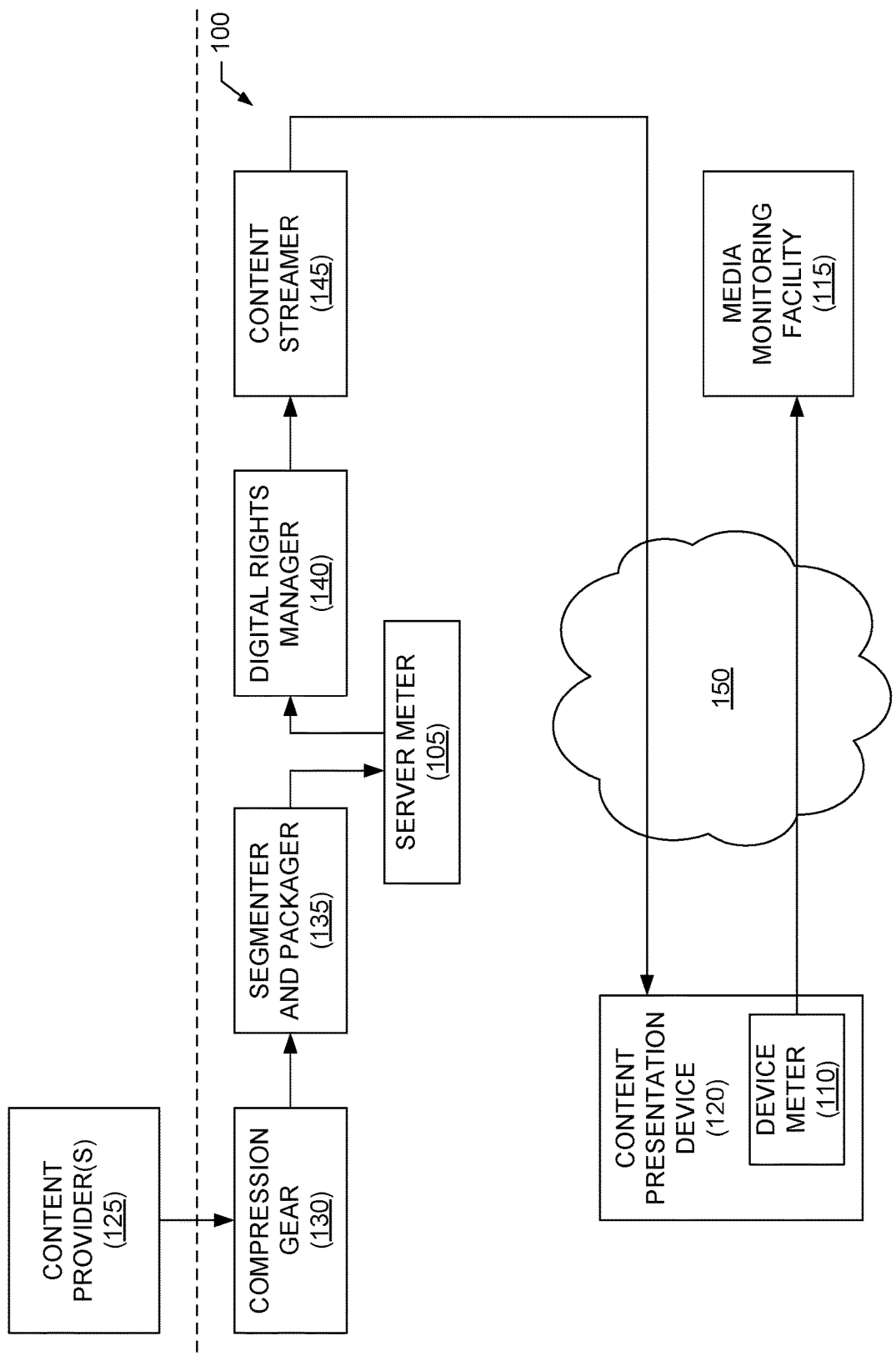
FIG. 1 is block diagram of a first example system for monitoring streaming media content.

Methods, apparatus and articles of manufacture to monitor streaming media content are disclosed herein. An example method disclosed herein to monitor streaming media content includes decoding a transport stream carrying media content being streamed to a content presentation device to obtain the media content. The example method also includes extracting metering data having a first format from the media content, the metering data identifying at least one of the media content or a source of the media content. The example method further includes transcoding the extracted metering data to form metering data (e.g., metering metadata) having a second format decodable by a meter executed by the content presentation device.

In some examples, the method additionally includes combining extracted metering data or otherwise collected metering data that is dependent on (e.g., that accompanies) the streaming media content (e.g., metering data from a provider of the media content) with metering data to be associated with the streaming media content, but provided independently of the streaming media content (e.g. metering data from an independent metering data source). In some such examples, the extracted metering data is combined with metering data from an independent metering data source, which is then transcoded to form the metering metadata. In some examples, the independent metering data source determines a timestamp from a clock source and determines an identifier for the streaming media content from a data source communicatively coupled to the independent metering data source (e.g., a configuration file). In some examples, the metering data from the independent metering data source and the extracted metering data are redundant, are identical, or are similar. In some examples, the method includes inserting, by the independent metering data source, a tag or other identifying mark within the extracted metering data to identify the independently provided metering data. In some examples, a delimiter (e.g., a text character, such as a "1" character, or some other sign or indicator) is inserted between the extracted metering data and the metering data from the independent metering data source.

In some examples, the method additionally includes encoding the transcoded metering data (e.g., the extracted metering data or the combined metering data after transcoding) into a metadata channel associated with (e.g., that accompanies or flows with) the transport stream, and sending the transport stream and the metadata channel to the content presentation device. In some examples, the method then includes receiving the transport stream and the metadata channel at the content presentation device, detecting the metering data in the metadata channel using the meter executed by the content presentation device, and reporting the metering data to a media monitoring facility.

In some examples, the metadata channel corresponds to at least one of an external metadata channel external to the transport stream carrying the media content, or an internal metadata channel comprising one or more data fields of the transport stream carrying the media content. An example of an external metadata channel includes an M3U file or other data file encoded to contain the metering metadata, and which is associated with the transport stream that is to be sent to the content presentation device.

In some examples, the transport stream corresponds to a Moving Picture Experts Group (MPEG) 2 transport stream sent according to a hypertext transfer protocol (HTTP) live streaming protocol. In some examples, the metering data having the first format (which is extracted from the media content decoded from the transport stream) can include an audio watermark that is embedded in an audio portion of the media content. Additionally or alternatively, the metering data having the first format (which is extracted from the media content decoded from the transport stream) can include a video (e.g., image) watermark that is embedded in a video portion of the media content. In some examples, the metering metadata having the second format into which the extracted metering data is transcoded corresponds to metadata represented in a text format, such as a text format for inclusion in an M3U file.

Another example method disclosed herein to monitor streaming media content includes decoding a transport stream carrying media content being streamed to a content presentation device to obtain the media content. The example method also includes extracting metering data from the media content and/or receiving metering data from an independent metering data source, the metering data identifying at least one of the media content or a source of the media content. Additionally, the example method further includes decoding content identifying metadata (e.g., such as electronic guide data, playlist data, etc.) already accompanying the transport stream carrying the media content. The example method further includes verifying the content identifying metadata using the metering data extracted from the media content.

In some examples, the method additionally includes reporting the results of verifying the content identifying metadata using the metering data extracted from the media content to a media monitoring facility to enable validation of content identifying metadata reported separately by a meter executed by the content presentation device. For example, the meter executed by the content presentation device can also detect the content identifying metadata accompanying the transport stream providing the streaming media content to the content presentation device. The meter can then report this content identifying metadata to the media monitoring facility, which validates the accuracy of the content identifying metadata based on the reported results of previously verifying the content identifying metadata using the metering data extracted from the media content. As noted above, in some examples, the metering data that is extracted from the media content decoded from the transport stream can include an audio watermark that is embedded in an audio portion of the media content. Additionally or alternatively, the metering data that is extracted from the media content decoded from the transport stream can include a video (e.g., image) watermark that is embedded in a video portion of the media content. Additionally or alternatively, the method can include reporting metering data received from an independent metering data source.

Yet another example method disclosed herein to monitor streaming media content includes storing media content (which is to be streamed to a content presentation device) in a temporary storage prior to streaming the media content to the content presentation device. The example method also includes retrieving the media content from the temporary storage, and extracting metering data from the media content (e.g., such as audio/video watermark(s) embedded in the media content), the metering data identifying at least one of the media content or a source of the media content. The method can also include combining the extracted metering data with metering data from an independent metering data source. The example method further includes reporting the metering data to a media monitoring facility.

Prior techniques for monitoring broadcast media content can involve extracting metering data, such as audio and/or video watermarks, from a monitored media content presentation. In the context of streaming media content, digital rights management may prevent access to the streamed media content by applications, such as a device meter, other than the media content player(s) employed by the content presentation device. Monitoring of streaming media content in accordance with examples described herein enables a device meter executed by the content presentation device to detect metering metadata identifying the streaming media content that was transcoded from a first format not decodable by the device meter (e.g., such as a first format corresponding to an audio watermark or a video watermark embedded in the media content, which is inaccessible to the device meter due to digital rights management) to a second format that is decodable by the device meter (e.g., such as a second format corresponding to a text format included in an file sent via a metadata channel accompanying the streaming media content.) Additionally or alternatively, monitoring of streaming media content in accordance with examples described herein enables content identifying metadata already accompanying the streaming media content, and decodable by the device meter without transcoding, to be validated using metering data (e.g., such as audio and/or video watermarks) extracted from the media content. While examples disclosed herein are described in the context of monitoring streaming media content, example methods and apparatus disclosed herein may be applied to monitoring non-streaming media content.

Turning to the figures, a block diagram of a first example system 100 for monitoring streaming media content is illustrated in FIG. 1. The example system 100 includes a first example server meter 105, a first example device meter 110 and a first example media monitoring facility 115 to monitor media content that is streamed to an example content presentation device 120. In the illustrated example, the system 100 includes example compression gear 130, an example segmenter and packager 135, an example digital rights manager 140 and an example content streamer 145 to provide the streaming media content, which is provided by example content provider(s) 125, to the content presentation device 120. The example system 100 further includes an example network 150 via which media content can be streamed by the content streamer 145 to the content presentation device 120, and via which the device meter 110 can report metering data to the media monitoring facility 115.

The content provider(s) 125 of the illustrated example correspond to any one or more content providers capable of providing media content for streaming to the content presentation device 120. The media content provided by the content provider(s) 125 can be any type of media content, such as audio content, video content, multimedia content, etc. Additionally, the media content can correspond to live (e.g., broadcast) media content, stored media content (e.g., on-demand content), etc.

The compression gear 130 employs any appropriate technique(s) to compress and/or otherwise process the received media content into a form suitable for streaming. For example, the compression gear 130 may compress the media content in accordance with MPEG 4 audio/video compression. The segmenter and packager 135 employs any appropriate technique(s) to segment and package the compressed media content into a form suitable for streaming. For example, the segmenter and packager 135 can segment and package the compressed media content into one or more MPEG 2 transport streams for streaming to the content presentation device 120 via the network 150 using HTTP live streaming (HLS) or any other past, present and/or future, streaming protocol. The digital rights manager 140 encrypts and/or otherwise protects, in accordance with any appropriate digital rights management technique and/or protocol, the media content to be streamed. The content streamer 145 employs any appropriate technique(s) to select and stream the media content to a requesting device, such as the content presentation device 120. For example, the content streamer 145 can select media content that has been MPEG 4 compressed, segmented and packaged into one or more MPEG 2 transport streams, and encrypted for digital rights management, and then stream the content to the content presentation device 120 via the network 150 using HLS or any other streaming protocol.

In some examples, the compression gear 130, the segmenter and packager 135 and/or the digital rights manager 140 prepare content for streaming regardless of whether (e.g., prior to) a request is received from the content presentation device 120. In such an example, the content streamer 145 prepares a transport stream for streaming the already-prepared content to the content presentation device 120 when a request is received from the content presentation device 120. In other examples, the compression gear 130, the segmenter and packager 135 and/or the digital rights manager 140 prepare the content for streaming in response to a request received from the content presentation device 120.

The content presentation device 120 of the illustrated example is a computing device that is capable of presenting streaming media content provided by the content streamer 145 via the network 150. The content presentation device 120 may be, for example, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc. In some examples, the content presentation device 120 includes one or more executable media players to present the streaming media content provided by the content streamer 145. For examples, the media player(s) available to the content presentation device 120 may be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. While a single content presentation device 120 is illustrated, any number and/or type(s) of content presentation devices may be included in the system 100.

The network 150 of the illustrated example is the Internet. Additionally or alternatively, any other network(s) linking the content streamer 145, the content presentation device 120, the device meter 110 and/or the media monitoring facility 115 may be used. The network 150 may comprise any number of public and/or private networks using any type(s) of networking protocol(s).

As noted above, media content provided by the content provider(s) 125 may include metering data, such as embedded audio and/or video watermarks, that identifies and/or is otherwise associated with the media content. However, such metering data may not be accessible by and, thus, may not be decodable by a device meter at the content presentation device 120. For example, the media content and, by extension, the audio and/or video watermarks embedded therein may be accessible only to an appropriate media player, and not a device meter or other application, due to the digital rights management techniques employed by the digital rights manager 140. To enable the device meter 120 to have access to and be able to decode metering data identifying and/or otherwise associated with streaming media content provided to the content presentation device 120, the system 100 of the illustrated example includes the server meter 105. In some examples, the server meter 105 is implemented as a plug-in or other application/device associated with or executed by one or more of the compression gear 130, the segmenter and packager 135, the digital rights manager 140 and/or the content streamer 145. In some examples, the server meter 105 is implemented by an apparatus separate from the compression gear 130, the segmenter and packager 135, the digital rights manager 140 and the content streamer 145.

In the illustrated example, the server meter 105 obtains, from the media content, metering data that is in a first format. In some examples the server meter 105 may also collect metering data from one or more independent metering data sources. The metering data from the independent metering data sources may be in the first format or any other format(s). The server meter 105 then transcodes the obtained metering data (e.g., the extracted metering data and/or the metering data from the independent metering data source) to form metering metadata that is in a second format accessible and decodable by the device meter 110. The metering data identifies the media content, identifies a source of the media content, and/or otherwise describes and/or is associated with the media content. For example, the server meter 105 can obtain embedded audio/video watermarks that correspond to metering data having a first format and/or the server meter 105 can obtain metering data from an independent metering data source. Then, the server meter 105 transcodes this metering data into text data, binary data, etc., that corresponds to metering metadata in a second format. The server meter 105 then encodes the transcoded metering metadata (which is in the second format that is decodable by the device meter 110 executed by or otherwise associated with the content presentation device 120) into a metadata channel associated with the transport stream(s) that is(are) to carry the streaming media content to the presentation device 120. In some examples, the server meter 105 is implemented as a plug-in based on a software development kit (SDK) provided by the entity that embedded the audio/video watermarks in the media content. In such examples, the server meter 105 can employ functionality provided by the SDK to extract and decode audio/video watermark(s) embedded in the media content to obtain the payload data carried by the watermark(s). In some examples, in accordance with one or more versions of the ID3 tagging standards, the server meter 105 then inserts the payload data obtained from the watermark(s) as ID3 tag metadata and/or other metadata in the transport stream(s) that is (are) to stream the media content in accordance with the HLS or other appropriate streaming protocol. Another example implementation of the server meter 105 is illustrated in FIG. 2, which is described in greater detail below.

The server meter 105 can also employ functionality provided by the SDK to collect metering data from an independent metering data source (e.g. such as by receiving data from an internal clock, receiving content identification information from a user input, receiving content identification information from a file, or another source that is independent of the provider of the media content). An example implementation of the server meter 105 that includes an independent metering data source is described in conjunction with FIG. 24.

The system 100 also includes the device meter 110 to monitor streaming media content provided to and/or presented by the content presentation device 120. In the illustrated example, the device meter 110 is executed by the content presentation device 120. In some examples, the device meter 110 may be implemented as a plug-in that is connected to a plug-in interface of a media player executed by the content presentation device 120. In some examples, the device meter 110 may be implemented as one or more instructions that are incorporated in a media player executed by the content presentation device 120. In some examples, the device meter 110 may be implemented as an executable application that is downloaded to the content presentation device 120 (e.g., downloaded as an App from the Apple® App Store.) In some examples, the device meter 110 is implemented by an apparatus separate from the content presentation device 120, but that is able to access metadata (e.g., via one or more digital interfaces, data ports, etc., of the content presentation device 120) associated with streaming media content received by the content presentation device 120.

The device meter 110 of the illustrated example decodes metering metadata included in a metadata channel (or channels) associated with (e.g., provided prior to or accompanying and flowing with) the transport channel(s) providing the streaming media content to the content presentation device 120. For example, a metadata channel decoded by the device meter 110 can correspond to an external metadata channel external to the transport stream carrying the media content, or an internal metadata channel comprising one or more data fields of the transport stream carrying the media content. An example external metadata channel includes an M3U file or other text file associated with a transport stream carrying the streaming media content and containing metering metadata transcoded by the server meter 105 into a text or other appropriate data format. In some examples, such as an example employing the HLS protocol, the device meter 110 extracts and decodes ID3 tag(s) that contain the metering metadata. The device meter 110 of the illustrated example stores the decoded metering metadata (as well as any other metering information captured by the device meter, timestamps added by the device meter 110 to the decoded metering metadata and/or the other metering information, etc.) for reporting to the media monitoring facility 115. In the illustrated example, the device meter 110 reports its stored metering metadata (as well as any other metering information, timestamps, etc.) using an HTTP request sent to an HTTP interface of the media monitoring facility 115. An example implementation of the device meter 110 is illustrated in FIG. 3, which is described in greater detail below.

The media monitoring facility 115 includes an interface to receive reported metering information (e.g., metering metadata) received from the device meter 110 via the network 150. In the illustrated example, the media monitoring facility 115 includes an HTTP interface to receive HTTP requests that include metering information. Alternatively, any other method(s) to receive metering information may be used. In the illustrated example, the media monitoring facility 115 stores and analyzes metering information received from a plurality of different content presentation devices 120. For example, the media monitoring facility 115 may group metering information by content provider 125 (e.g., group all metering data associated with a particular content provider 125). The media monitoring facility 115 may also analyze the metering information to eliminate erroneous information. For example, the media monitoring facility 115 may compare two types of identifying information received for the same media content (e.g., by comparing content identifying metadata already accompanying the streaming media content with metering data and/or metadata determined by the device meter 110 and/or server meter 105) to identify discrepancies, may eliminate metering information containing discrepancies, and/or may mark certain identifying information as erroneous to be excluded from metering information received at a later time. Any other processing of metering information may additionally or alternatively be performed.

In some examples, the reported metering information includes metering data that was obtained by a dependent metering data source and an independent metering data source. Dependent metering data sources include, for example, sources of metering data obtained from, associated with or otherwise dependent on the media content and/or transport stream(s) providing the media content. For example, a dependent metering data source can include metering data extracted from a watermark payload of the streaming media content. In contrast, independent metering data sources include, for example, sources of metering data obtained independently from the media content and/or transport stream(s) providing the media content, but which can nevertheless be descriptive of the media content. For example, an independent metering data source can include redundant metering data, such as metering data that is the same as the metering data obtained from the dependent metering data source, metering data that is similar to the metering data obtained from the dependent metering data source, etc., but that was obtained by an independent metering data source (e.g., such as a source identifier that is stored in a configuration file at the server meter 105). In such examples, the media monitoring facility 115 may utilize the redundant metering data to verify the metering data from the dependent metering data source. Example metadata with redundant metering data obtained from an independent metering data source is described in conjunction with FIG. 26. In some examples, the media monitoring facility 115 may store and analyze both the redundant metering data and the metering data from the dependent metering data source. In some examples, the media monitoring facility 115 can store and/or analyze the redundant metering data when the metering data from the dependent metering data source is unreadable by the media monitoring facility 115. For example, the metering data from the dependent metering data source may fail an error check, be blank, or be null when an audio/video watermark is not able to be extracted from the streaming media content by the server meter 105 (e.g., an audio watermark may be unavailable during a silent portion of the streaming media content). Example metadata with unreadable metering data from a dependent metering data source is described in conjunction with FIG. 27.

The media monitoring facility 115 of the illustrated example also analyzes the received metering information reported by the content presentation device(s) 120 to generate reports concerning the presentation of media content. For example, the media monitoring facility 115 may generate reports indicating the number of times that media content was accessed, demographics for users that accessed the media content, interactions of users with the media content (e.g., fast-forwarding, pausing, etc.), the duration of accesses of the media content, etc. The media monitoring facility 115 may, for example, provide a webpage interface through which interested parties can generate custom reports or otherwise access the metering information (e.g., for a fee or part of a subscription service). For example, the media monitoring facility 115 may generate reports for a particular content provider 125, for advertisers that distribute advertisements via the content provider(s) 125, for competitors of the content provider(s) 125, etc. An example implementation of the media monitoring facility 115 is illustrated in FIG. 4, which is described in greater detail below.

A block diagram of an example implementation of the example server meter 105 of FIG. 1 is illustrated in FIG. 2. The example server meter 105 of FIG. 2 includes an example transport stream decoder 205 to decode transport stream(s) carrying streaming media content to obtain the media content being streamed to the content presentation device 120. For example, the transport stream decoder 205 can decode an MPEG 2 transport 2 encapsulating MPEG 4 compressed media content to obtain the encapsulated MPEG 4 content, and then perform MPEG 4 decompression to obtain the uncompressed audio/video content.

The example server meter 105 of FIG. 2 also includes an example metering data extractor 210 to extract metering data having a first format from the uncompressed media content obtained from the transport stream decoder 205. For example, the metering data extractor 210 can implement functionality provided by an SDK to extract one or more audio watermarks, one or more video (e.g., image) watermarks, etc., embedded in the uncompressed audio/video content obtained from the transport stream decoder 205. (For example, the uncompressed audio/video content may correspond to uncompressed pulse code modulation (PCM) audio data or other types of audio data, uncompressed video/image data, etc.) To transcode the metering data in the first format obtained from the metering data extractor 210 to a second format decodable by the device meter 110, the example server meter 105 of FIG. 2 further includes an example metering data transcoder 215. For example, the metering data transcoder 215 can determine (e.g., decode) the metering information (e.g., the watermark payload data, such as content identifying information, source identifying information, etc.) carried by a watermark extracted by the metering data extractor 210 and convert this metering information (also referred to as watermark payload data) into a text or binary format for inclusion in an M3U8 file or other data (e.g., text, binary, etc.) file for transmission as metadata (e.g., such as with a playlist or electronic program guide) accompanying the streaming media content. Additionally or alternatively, the metering data transcoder 215 can convert the extracted metering information (i.e., watermark payload data) into a binary or other appropriate format for inclusion in one or more data fields capable of carrying metadata in the transport stream(s) providing the streaming media content to the content presentation device 120. For example, the metering data transcoder 215 can convert watermark payload data corresponding to the metering information to ID3 tag metadata for insertion in the transport stream(s) that is (are) to stream the media content in accordance with the HLS or other appropriate streaming protocol. Other additional or alternative examples of transcoding that can be employed by the metering data transcoder 215 to transcode metering data into a format decodable by the device meter 110 are described in, for example, U.S. Pat. No. 7,827,312 ("METHODS AND APPARATUS FOR TRANSCODING META- DATA" to Ramaswamy et al.), which issued on Nov. 2, 2010, and U.S. Provisional Application Ser. No. 61/442,758 ("METHODS AND APPARATUS TO MONITOR MEDIA CONTENT AT A CONTENT DISPLAY SITE" to Deliyannis et al.), which was filed on Feb. 14, 2011. U.S. Pat. No. 7,827,312 and U.S. Provisional Application Ser. No. 61/442,758 are hereby incorporated by reference in their respective entireties. In some examples, the metering data extractor 210 may be replaced by or include one or more of the elements of FIG. 24, which enables the server meter 505 to operate in accordance with the system described in conjunction with FIG. 23.

Additionally, in some examples, the server meter 105 of FIG. 2 includes an example metering metadata encryptor 220 that employs any appropriate encryption to encrypt the metering metadata determined by the metering data transcoder 215. For example, the metering metadata encryptor 220 can encrypt the metering metadata using public or private key encryption such that the decryption key(s) are known and protected by the media monitoring facility 115. Inclusion of the metering metadata encryptor 220 can prevent unauthorized eavesdroppers from accessing the transcoded metering metadata identifying or otherwise associated with the streaming media content, thereby securing the privacy of users consuming the streaming media content.

In the illustrated example of FIG. 2, the server meter 105 includes an example transport stream encoder 225 to re-encode the transport stream(s) carrying the streaming media content to include the metering metadata determined by the metering data transcoder 215 (and encrypted by the metering metadata encryptor 220, as appropriate). For example, the transport stream encoder 225 can encode the metering metadata into an external metadata channel, such as by encoding an M3U8 or other data file to contain the metering metadata and to be associated with (e.g., included in, appended to, sent prior to, etc.) the transport stream(s) that are to provide the streaming media content to the content presentation device 120. Additionally or alternatively, the transport stream encoder 225 can encode the metering metadata into an internal metadata channel, such as by encoding metering metadata that is in a binary or other appropriate data format into one or more data fields of the transport stream(s) that is(are) capable of carrying metadata. For example, the transport stream encoder 225 can insert ID3 tag metadata corresponding to the metering metadata into the transport stream(s) that is (are) to stream the media content in accordance with the HLS or other appropriate streaming protocol.

A block diagram of an example implementation of the example device meter 110 of FIG. 1 is illustrated in FIG. 3. The example device meter 110 of FIG. 3 includes an example metering metadata extractor 305 to extract metering metadata from external and/or internal metadata channels associated with transport stream(s) providing streaming media content to the content presentation device 120. For example, the metering metadata extractor 305 can extract metering metadata from an external metadata channel (or more than one external metadata channel), such as by decoding an M3U8 or other data file that contains metering metadata and that is associated with (e.g., included in, appended to, sent prior to, etc.) the transport stream(s) providing the streaming media content to the content presentation device 120. Additionally or alternatively, the metering metadata extractor 305 can extract metering metadata from an internal metadata channel (or more than one internal metadata channel), such as by decoding metering metadata from one or more data fields of the transport stream(s) that is(are) capable of carrying metadata. In some examples, such as an example employing the HLS protocol, the metering metadata extractor 305 extracts and decodes ID3 tag(s) that contain the metering metadata.

The example device meter 110 of FIG. 3 also includes an example metering metadata reporter 310 to report the metering metadata obtained by the metering metadata extractor 305 to the media monitoring facility 115. For example, the metering metadata reporter 310 may generate a GET or POST request including the metering metadata as a parameter of the request. Alternatively, any other method of transmitting the metering metadata to the media monitoring facility 115 may be used. The metering metadata may be transmitted at any interval. For example, the metering metadata may be transmitted as it is collected (e.g., streamed), may be transmitted when a certain amount of metering metadata is collected, when an available memory space is filled or reaches a threshold capacity (e.g., 90% or some other percentage being full), when a particular event is detected (e.g., when presentation of the media content ends, when new media content is presented, etc.), whenever new metering metadata is obtained, etc. The metadata reporter 310 may transmit metering metadata once for each media content or may transmit metering metadata multiple times (e.g., every time an event occurs, every time identifying information changes (e.g., when the media content includes metering data that change throughout the media content, etc.).

In some examples, the device meter 110 may determine metering information in addition to the metering metadata extracted by the metering metadata extractor 305. For example, the device meter 110 may collect other metadata (e.g., such as other content identifying metadata) already accompanying the transport stream(s) providing the streaming media content. Additionally or alternatively, in some examples, the device meter 110 may collect information describing usage of the media player presenting the media content, other usage of the content presentation device 120 while the media content is being presented, etc., or any combination thereof. In such examples, the metering metadata reporter 310 can use one or more of the example mechanisms described above to report this additional metering information to the media monitoring facility 115 along with, or separate from, the metering metadata extracted by the metering metadata extractor 305.

A block diagram of an example implementation of the example media monitoring facility 115 of FIG. 1 is illustrated in FIG. 4. The example media monitoring facility 115 of FIG. 2 includes an example metering metadata collector 405 to collect the metering metadata (and other metering information) reported by the device meter 110. As described above, the metering metadata collector 405 of the illustrated example includes an HTTP interface to receive HTTP requests that include metering information. Additionally or alternatively, any other method(s) to receive metering information may be used. The metering metadata collector 405 also stores (e.g., collects) and analyzes the received metering information, as described above in connection with FIG. 1. The example media monitoring facility 115 of FIG. 2 also includes an example report generator 410 to generate reports based on the reported metering information, as described above in connection with FIG. 1.

Figure 5:
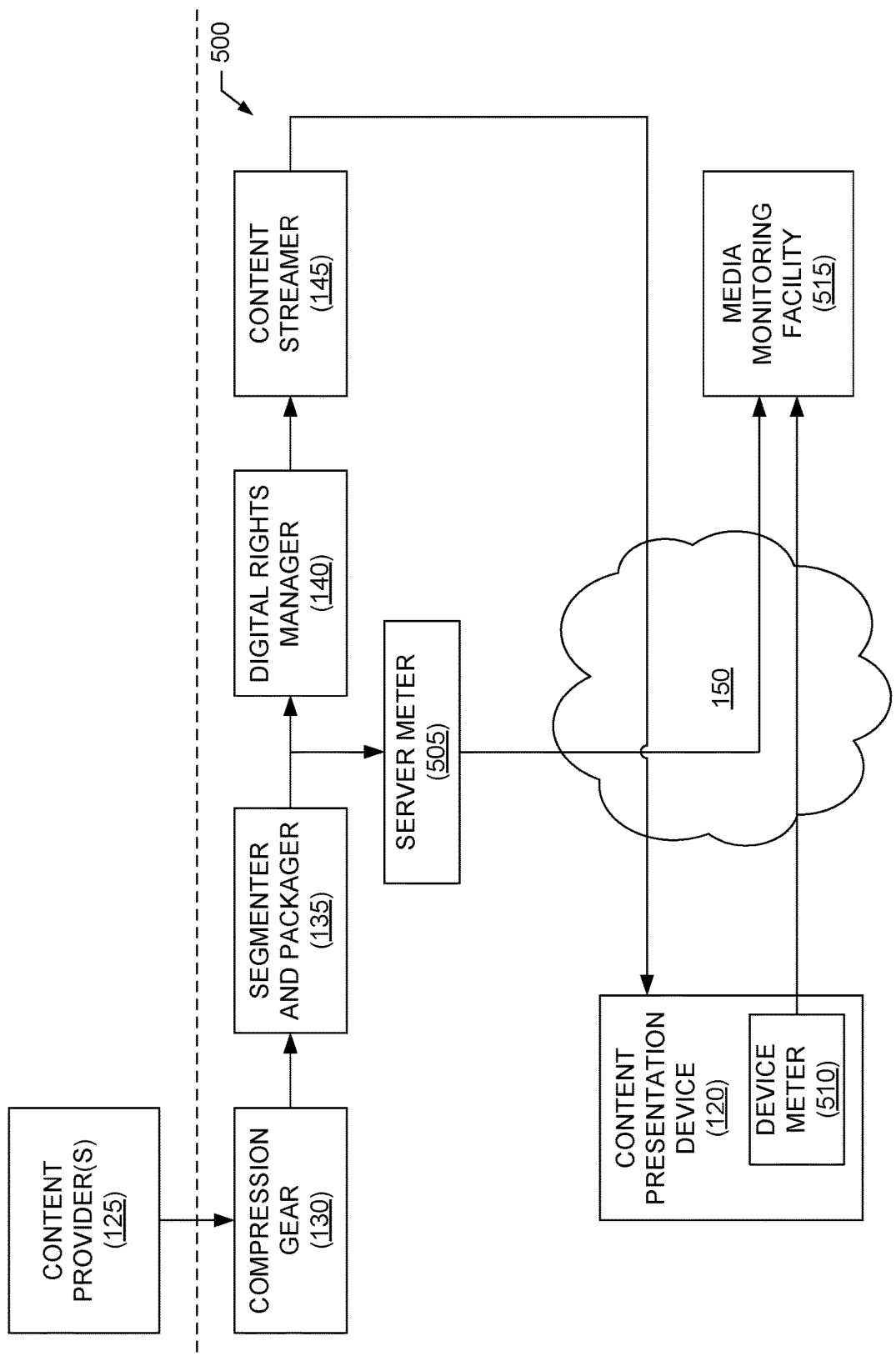
FIG. 5 is block diagram of a second example system for monitoring streaming media content.

A block diagram of a second example system 500 for monitoring streaming media content is illustrated in FIG. 5. The second example system 500 includes many elements in common with the first example system 100 of FIG. 1. As such, like elements in FIGS. 1 and 5 are labeled with the same reference numerals. The detailed descriptions of these like elements are provided above in connection with the discussion of FIG. 1 and, in the interest of brevity, are not repeated in the discussion of FIG. 5.

Turning to FIG. 5, the illustrated example system 500 includes the compression gear 130, the segmenter and packager 135, the digital rights manager 140 and the content streamer 145 to provide streaming media content to the content presentation device 120 via the network 150. To provide media content to the system 500, the illustrated example of FIG. 5 includes the content provider(s) 125. To monitor media content that is streamed to the content presentation device 120, the system 500 of the illustrated examples also includes a second example server meter 505, a second example device meter 510 and a second example media monitoring facility 515. In some examples, the server meter 505 may be implemented as a plug-in or other application/device associated with or executed by one or more of the compression gear 130, the segmenter and packager 135, the digital rights manager 140 and/or the content streamer 145. In some examples, the server meter 505 may be implemented by an apparatus separate from the compression gear 130, the segmenter and packager 135, the digital rights manager 140 and the content streamer 145. In some examples, the device meter 510 may be implemented as a plug-in that is connected to a plug-in interface of a media player executed by the content presentation device 120. In some examples, the device meter 510 may be implemented as one or more instructions provided that are incorporated in a media player executed by the content presentation device 120. In some examples, the device meter 510 may be implemented as an executable application that is downloaded to the content presentation device 120 (e.g., downloaded as an App from the Apple® App Store.) In some examples, the device meter 510 is implemented by an apparatus separate from the content presentation device 120, but that is able to access metadata (e.g., via one or more digital interfaces, data ports, etc., of the content presentation device 120) associated with streaming media content received by the content presentation device 120.

The server meter 505 of the illustrated example decodes transport stream(s) carrying media content to be streamed to the content presentation device 120, and extracts metering data from the decoded media content. The metering data identifies the media content, identifies a source of the media content, and/or otherwise describes and/or is associated with the media content. For example, the server meter 505 can extract audio and/or video watermarks embedded in the media content. Additionally, the server meter 505 decodes content identifying metadata (e.g., such as electronic guide data, playlist data, etc.) already accompanying the transport stream(s) carrying the media content to be streamed to the content presentation device 120. In some examples, the server meter 505 uses the metering data extracted from the media content to verify the content identifying metadata already accompanying the transport stream(s) carrying the media content. For example, electronic guide data, playlist data, etc., can have errors or be out-of-date. Using the metering data extracted from the media content to verify this content identifying metadata enables the media monitoring facility 515 to know whether the content identifying metadata already accompanying the transport stream(s) carrying the media content is accurate and, thus, can be used for media monitoring purposes. An example implementation of the server meter 505 is illustrated in FIG. 6, which is described in greater detail below.

The system 500 includes the device meter 510 to monitor streaming media content presented by the content presentation device 120. The device meter 510 of the illustrated example decodes content identifying metadata (e.g., such as electronic guide data, playlist data, etc.) already accompanying the transport stream(s) carrying the media content being streamed to the content presentation device 120. The device meter 510 stores the content identifying metadata (as well as any other metering information captured by the device meter) for reporting to the media monitoring facility 515. In the illustrated example, the device meter 510 reports its stored content identifying metadata (as well as any other metering information) using an HTTP request sent to an HTTP interface of the media monitoring facility 515. An example implementation of the device meter 510 is illustrated in FIG. 7, which is described in greater detail below.

The media monitoring facility 515 includes an interface to receive reported content identifying metadata received from the device meter 510 via the network 150. The media monitoring facility 515 also includes an interface to receive verification results from the server meter 505 indicating whether the content identifying metadata reported by the device meter 510 is valid (e.g., whether this content identifying metadata is accurate). Assuming the content identifying metadata is valid, the media monitoring facility 515 can store, analyze and generate reports based on the reported content identifying metadata using techniques similar to those employed by the media monitoring facility 115 to process the reported metering metadata. An example implementation of the media monitoring facility 515 is illustrated in FIG. 8, which is described in greater detail below.

A block diagram of an example implementation of the example server meter 505 of FIG. 5 is illustrated in FIG. 6. Like the example server meter 105 of FIG. 2, the example server meter 505 of FIG. 6 includes the transport stream decoder 205 to decode transport stream(s) carrying streaming media content to obtain the media content being streamed to the content presentation device 120. Like the example server meter 105 of FIG. 2, the example server meter 505 of FIG. 6 also includes the metering data extractor 210 to extract metering data, such as one or more audio watermarks, one or more video (e.g., image) watermarks, etc., embedded in the media content obtained from the transport stream decoder 205. Further descriptions of these elements are provided above in connection with the discussion of FIG. 2 and, in the interest of brevity, are not repeated in the discussion of FIG. 6.

The example server meter 505 of FIG. 5 further includes an example content metadata extractor 605 to extract content identifying metadata (and/or other content descriptive information) already accompanying the transport stream(s) that carry the streaming media content. For example, the content metadata extractor 605 can extract content identifying metadata from a playlist, an electronic program guide, a data file, etc., already accompanying (e.g., already included in, appended to, sent prior to, etc.) the transport stream(s) that are to provide the streaming media content to the content presentation device 120. The example server meter 505 of FIG. 5 additionally includes an example metadata verifier 610 to compare the content identifying metadata obtained by the content metadata extractor 605 with the metering data obtained from the metering data extractor 210 to determine whether the content identifying metadata is valid (e.g., is correct, accurate, up-to-date, etc.). The metadata verifier 610 also reports the verification results to the media monitoring facility 515 via the network 150 (e.g., using one or more HTTP requests).

A block diagram of an example implementation of the example device meter 510 of FIG. 5 is illustrated in FIG. 7. The example device meter 510 of FIG. 7 includes an example content metadata extractor 705 to extract content identifying metadata (and/or other content descriptive information) already accompanying the transport stream(s) providing the streaming media content to the content presentation device 130. For example, the content metadata extractor 705, like the content metadata extractor 605 of FIG. 6, can extract content identifying metadata from a playlist, an electronic program guide, a data file, etc., already accompanying (e.g., already included in, appended to, sent prior to, etc.) the transport stream(s) providing the streaming media content to the content presentation device 120.

The example device meter 510 of FIG. 7 also includes an example content metadata reporter 710 to report the content identifying metadata obtained by the content metadata extractor 705 to the media monitoring facility 515. For example, the content metadata reporter 710 may generate a GET or POST request including the content identifying metadata as a parameter of the request. Alternatively, any other method of transmitting the content identifying metadata to the media monitoring facility 515 may be used. The content identifying metadata may be transmitted at any interval. For example, the content identifying metadata may be transmitted as it is collected (e.g., streamed), may be transmitted when a certain amount of content identifying metadata is collected, when an available memory space is filled or reaches a threshold capacity (e.g., 90% or some other percentage being full), when a particular event is detected (e.g., when presentation of the media content ends, when new media content is presented, etc.), whenever new content identifying metadata is obtained, etc. The content metadata reporter 710 may transmit content identifying metadata once for each media content or may transmit content identifying metadata multiple times (e.g., every time an event occurs, every time identifying information changes, etc.).

In some examples, the device meter 510 may determine metering information in addition to the content identifying metadata extracted by the content metadata extractor 705. For example, the device meter 510 may collect information describing usage of the media player presenting the media content, other usage of the content presentation device 120 while the media content is being presented, etc., or any combination thereof. In such examples, the content metadata reporter 710 can use one or more of the example mechanisms described above to report this additional metering information to the media monitoring facility 515 along with, or separate from, the content identifying metadata extracted by the content metadata extractor 705.

A block diagram of an example implementation of the example media monitoring facility 515 of FIG. 5 is illustrated in FIG. 8. The example media monitoring facility 515 of FIG. 8 includes an example content metadata collector 805 to collect the content identifying metadata (and other metering information) reported by the device meter 510. As described above, the content metadata collector 805 of the illustrated example includes an HTTP interface to receive HTTP requests that include metering information. Additionally or alternatively, any other method(s) to receive metering information may be used. The content metadata collector 805 also stores (e.g., collects) and analyzes the received metering information (e.g., based on verification results received from a content metadata validator 810), as described above in connection with FIG. 5.

The example media monitoring facility 515 of FIG. 8 also includes an example content metadata validator 810 to receive verification results concerning the validity of the content identifying information that is to be received by the content metadata collector 805. For example, the content metadata validator 810 includes an HTTP interface to receive HTTP requests that include verification results reported by the server meter 505. The content metadata collector 805 can use the verification results received by the content metadata validator 810 to determine whether the content identifying metadata is valid (e.g., is correct, accurate, up-to-date, etc.). The example media monitoring facility 515 of FIG. 8 further includes an example report generator 815 to generate reports based on the reported metering information, as described above in connection with FIG. 5.

Figure 9:
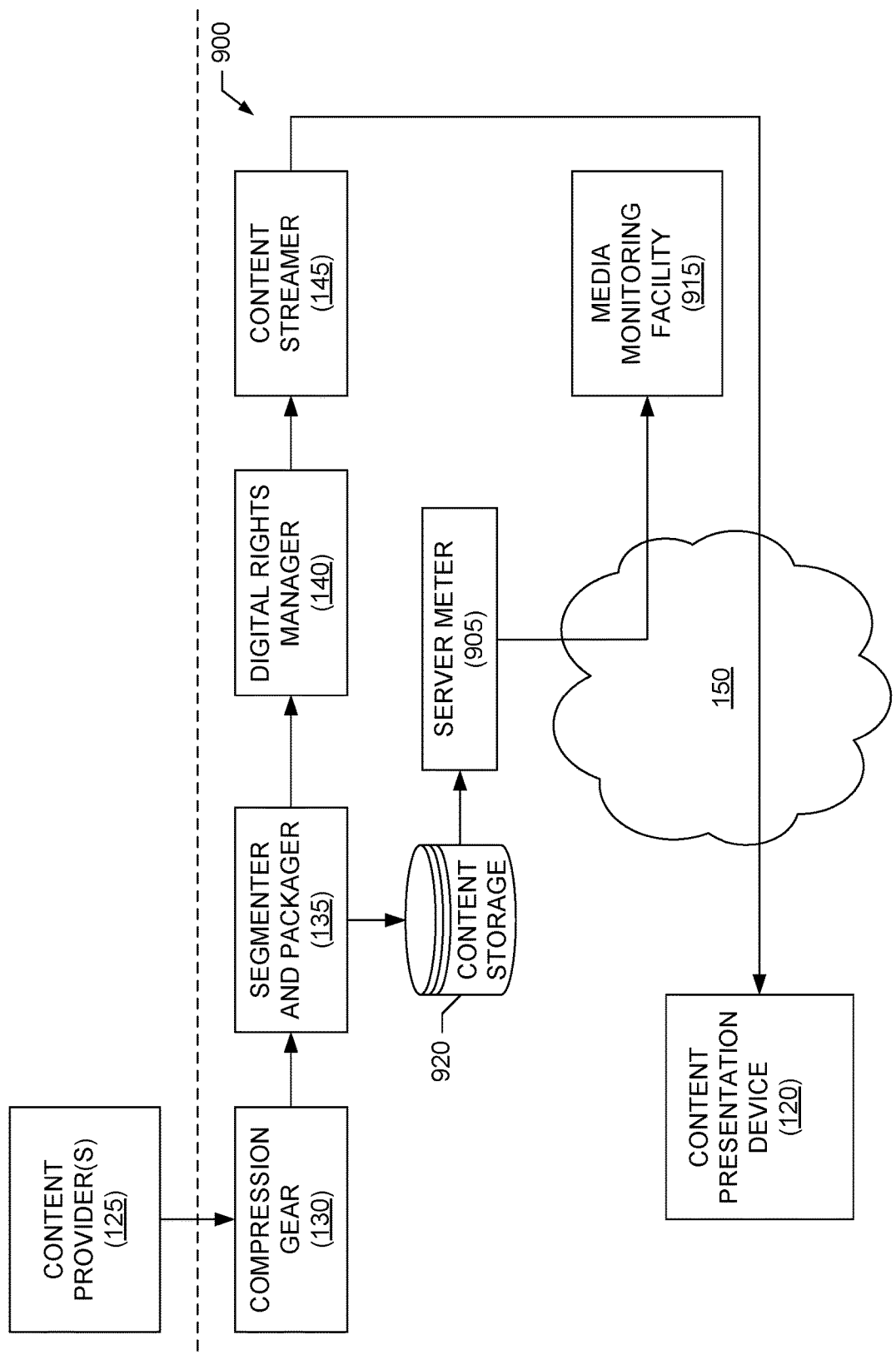
FIG. 9 is block diagram of a third example system for monitoring streaming media content.

A block diagram of a third example system 900 for monitoring streaming media content is illustrated in FIG. 9. The third example system 900 includes elements in common with the first example system 100 of FIG. 1. As such, like elements in FIGS. 1 and 9 are labeled with the same reference numerals. The detailed descriptions of these like elements are provided above in connection with the discussion of FIG. 1 and, in the interest of brevity, are not repeated in the discussion of FIG. 9.

Turning to FIG. 9, the illustrated example system 900 includes the compression gear 130, the segmenter and packager 135, the digital rights manager 140 and the content streamer 145 to provide streaming media content to the content presentation device 120 via the network 150. To provide media content to the system 900, the illustrated example of FIG. 9 includes the content provider(s) 125. To monitor media content that is streamed to the content presentation device 120, the system 900 of the illustrated examples also includes a third example server meter 905 and a third example media monitoring facility 915. In some examples, the server meter 905 may be implemented as a plug-in or other application/device associated with or executed by one or more of the compression gear 130, the segmenter and packager 135, the digital rights manager 140 and/or the content streamer 145. In some examples, the server meter 905 may be implemented by an apparatus separate from the compression gear 130, the segmenter and packager 135, the digital rights manager 140 and the content streamer 145.

In the system 900 of the illustrated example, a copy of media content being streamed to the content presentation device 120 is stored in a temporary content storage 920 for subsequent processing. The temporary content storage 920 can be implemented by any memory or storage device or devices, such as one or more of the mass storage device 3130 and/or the volatile memory 3118 illustrated in FIG. 31, which is described in greater detail below. The media content can be stored in the temporary content storage 920 in any appropriate data format.

The server meter 905 of the illustrated example extracts metering data from the media content stored in the temporary content storage 920. The metering data identifies the media content, identifies a source of the media content, and/or otherwise describes and/or is associated with the media content. For example, the server meter 905 can extract audio and/or video watermarks embedded in the media content. In the illustrated example, the server meter 905 reports the extracted metering data (as well as any other metering information) using an HTTP request sent to an HTTP interface of the media monitoring facility 915. An example implementation of the server meter 905 is illustrated in FIG. 10, which is described in greater detail below.

The media monitoring facility 915 includes an interface to receive reported metering metadata received from the server meter 905 via the network 150. The media monitoring facility 515 can store, analyze and generate reports based on the reported metering data using techniques similar to those employed by the media monitoring facility 115 to process the reported metering metadata. An example implementation of the media monitoring facility 915 is illustrated in FIG. 11, which is described in greater detail below.

Figure 10:
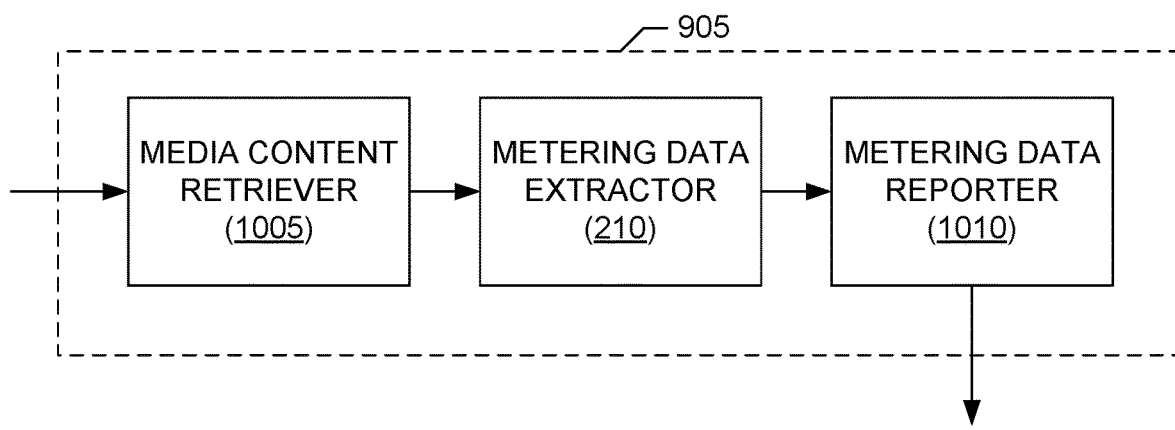
FIG. 10 is a block diagram of a third example server meter, which may be used to implement the example system of FIG. 9.

A block diagram of an example implementation of the example server meter 905 of FIG. 9 is illustrated in FIG. 10. The example server meter 905 of FIG. 10 includes a media content retriever 1005 to retrieve from the temporary content storage 920 a copy of media content that is to be streamed to the content presentation device 120. Like the example server meter 105 of FIG. 2, the example server meter 905 of FIG. 10 also includes the metering data extractor 210 to extract metering data, such as one or more audio watermarks, one or more video (e.g., image) watermarks, etc., embedded in the media content obtained from the media content retriever 1005. Further description of the metering data extractor 210 is provided above in connection with the discussion of FIG. 2 and, in the interest of brevity, is not repeated in the discussion of FIG. 6. In some examples, the metering data extractor 210 may be replaced by or include one or more of the elements of FIG. 24, which enables the server meter 905 to operate in accordance with the system described in conjunction with FIG. 23.

The example server meter 905 of FIG. 10 further includes an example metering data reporter 1010 to report the metering data obtained by the metering data extractor 210 to the media monitoring facility 915. For example, the metering data reporter 1010 may generate a GET or POST request including the metering data as a parameter of the request. Alternatively, any other method of transmitting the metering data to the media monitoring facility 915 may be used. The metering data may be transmitted at any interval. For example, the metering data may be transmitted as it is collected (e.g., streamed), may be transmitted when a certain amount of metering data is collected, when an available memory space is filled or reaches a threshold capacity (e.g., 90% or some other percentage being full), when a particular event is detected (e.g., when presentation of the media content ends, when new media content is presented, etc.), whenever new metering data is obtained, etc. The metering data reporter 1010 may transmit metering data once for each media content or may transmit metering data multiple times (e.g., every time an event occurs, every time identifying information changes, etc.).

Figure 11:
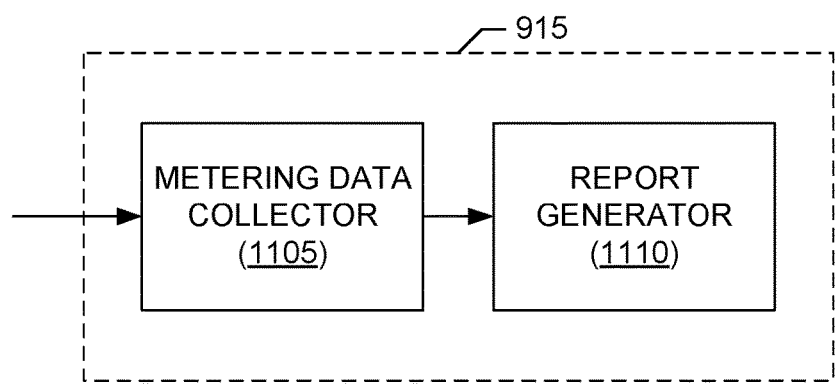
FIG. 11 is a block diagram of a third example media monitoring facility, which may be used to implement the example system of FIG. 5.

A block diagram of an example implementation of the example media monitoring facility 915 of FIG. 9 is illustrated in FIG. 11. The example media monitoring facility 915 of FIG. 9 includes an example metering data collector 1105 to collect the metering data reported by the server meter 905. As described above, the metering data collector 1105 of the illustrated example includes an HTTP interface to receive HTTP requests that include metering information. Additionally or alternatively, any other method(s) to receive metering information may be used. The metering data collector 1105 also stores (e.g., collects) and analyzes the received metering information, as described above in connection with FIG. 9. The example media monitoring facility 915 of FIG. 11 also includes an example report generator 1110 to generate reports based on the reported metering information, as described above in connection with FIG. 9.

While example manners of implementing the server meters 105, 505 and 905, the device meters 110 and 510, and the media monitoring facilities 115, 515 and 915 of FIGS. 1, 5 and 9 have been illustrated in FIGS. 2-4, 6-8 and 10-11, one or more of the elements, processes and/or devices illustrated in FIGS. 2-4, 6-8 and 10-11 may be combined, divided, re-arranged, omitted, eliminated and/or implemented in any other way. Further, the example transport stream decoder 205, the metering data extractor 210, the example metering data transcoder 215, the example metering metadata encryptor 220, the example transport stream encoder 225, the example metering metadata extractor 305, the example metering metadata reporter 310, the example metering metadata collector 405, the example report generator 410, the example content metadata extractor 605, the example metadata verifier 610, the example content metadata extractor 705, the example content metadata reporter 710, the example content metadata collector 805, the example content metadata validator 810, the example report generator 815, the example media content retriever 1005, the example metering data reporter 1010, the example metering data collector 1105, the example report generator 1110 and/or, more generally, one or more of the example server meters 105, 505 and/or 905, one or more of the example device meters 110 and/or 510, and/or one or more of the example media monitoring facilities 115, 515 and/or 915 of FIGS. 2-4, 6-8 and 10-11 may be implemented by hardware, software, firmware and/or any combination of hardware, software and/or firmware. Thus, for example, any of the example transport stream decoder 205, the metering data extractor 210, the example metering data transcoder 215, the example metering metadata encryptor 220, the example transport stream encoder 225, the example metering metadata extractor 305, the example metering metadata reporter 310, the example metering metadata collector 405, the example report generator 410, the example content metadata extractor 605, the example metadata verifier 610, the example content metadata extractor 705, the example content metadata reporter 710, the example content metadata collector 805, the example content metadata validator 810, the example report generator 815, the example media content retriever 1005, the example metering data reporter 1010, the example metering data collector 1105, the example report generator 1110 and/or, more generally, one or more of the example server meters 105, 505 and/or 905, one or more of the example device meters 110 and/or 510, and/or one or more of the example media monitoring facilities 115, 515 and/or 915 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example server meters 105, 505 and/or 905, the example device meters 110 and/or 510, the example media monitoring facilities 115, 515 and/or 915, the example transport stream decoder 205, the metering data extractor 210, the example metering data transcoder 215, the example metering metadata encryptor 220, the example transport stream encoder 225, the example metering metadata extractor 305, the example metering metadata reporter 310, the example metering metadata collector 405, the example report generator 410, the example content metadata extractor 605, the example metadata verifier 610, the example content metadata extractor 705, the example content metadata reporter 710, the example content metadata collector 805, the example content metadata validator 810, the example report generator 815, the example media content retriever 1005, the example metering data reporter 1010, the example metering data collector 1105 and/or the example report generator 1110 are hereby expressly defined to include a tangible computer readable medium such as a memory, digital versatile disk (DVD), compact disk (CD), etc., storing such software and/or firmware. Further still, the example server meters 105, 505 and/or 905, the example device meters 110 and/or 510, the example media monitoring facilities 115, 515 and/or 915 of FIGS. 2-4, 6-8 and 10-11 may include one or more elements, processes and/or devices in addition to, or instead of, those illustrated in FIGS. 2-4, 6-8 and 10-11, and/or may include more than one of any or all of the illustrated elements, processes and devices.

Figure 12:
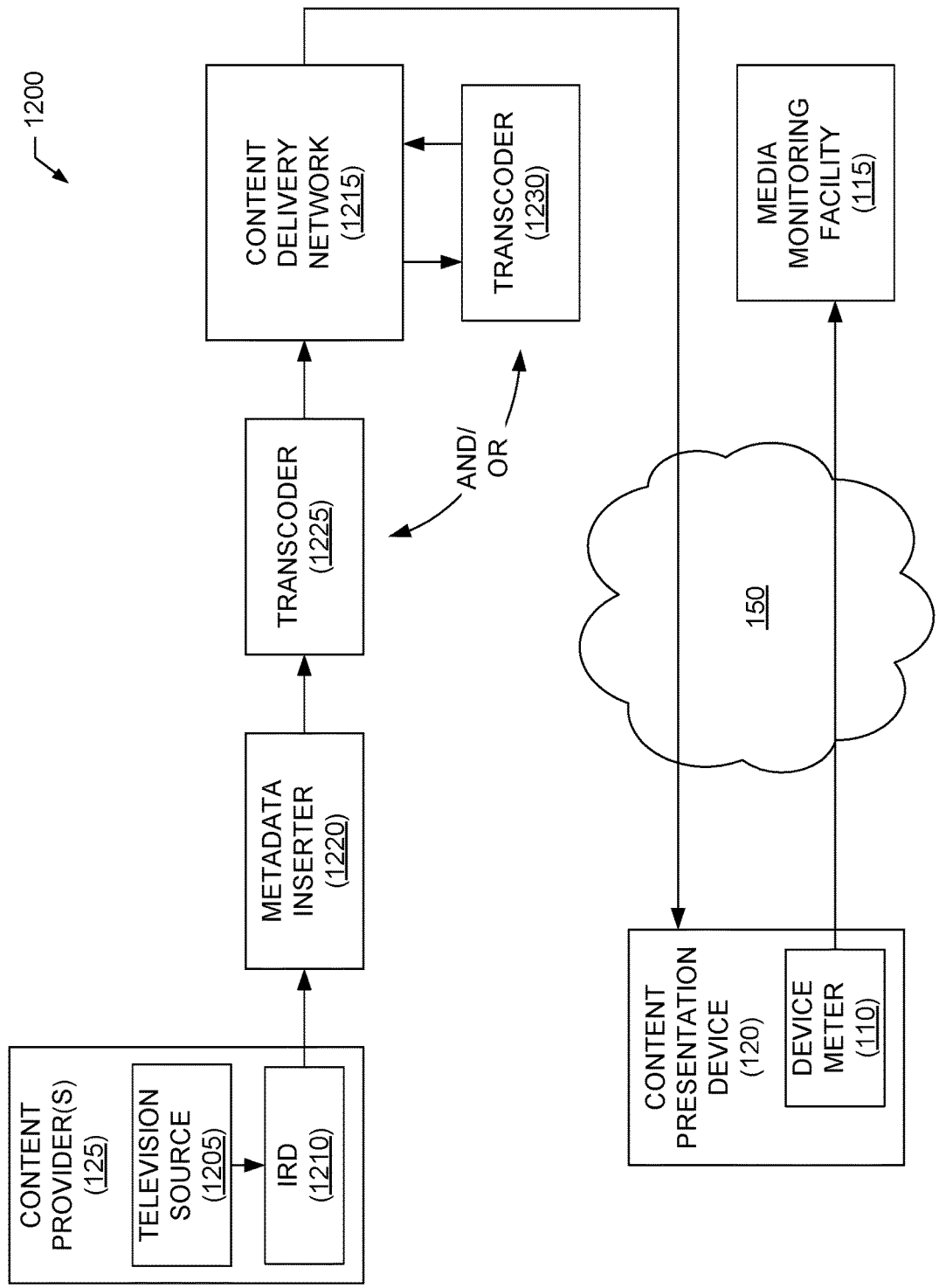
FIG. 12 is block diagram of a fourth example system for monitoring streaming media content.

A block diagram of a fourth example system 1200 for monitoring streaming media content is illustrated in FIG. 12. The fourth example system 1200 includes many elements in common with the first example system 100 of FIG. 1. As such, like elements in FIGS. 1 and 12 are labeled with the same reference numerals. The detailed descriptions of these like elements are provided above in connection with the discussion of FIG. 1 and, in the interest of brevity, are not repeated in the discussion of FIG. 12.

Turning to FIG. 12, the system 1200 includes the content provider(s) 125 and an example content delivery network 1215 to provide streaming media content to the content presentation device 120 via the network 150. In the illustrated example, the content provider(s) 125 include an example television source 1205, which may correspond to, for example, any terrestrial, cable, satellite, Internet protocol, etc., broadcast and/or on-demand television source. The content provider(s) 125 of the illustrated example also include an example integrated receiver/decoder (IRD) 1210 to receive and decode a television signal provided by the television source 1205 to thereby obtain, for example, a television transport stream capable of being processed by the content delivery network 1215. Any type of IRD 1210 may be employed in the example system 1200. In the illustrated example, the content delivery network 1215 may include, for example, the compression gear 130, the segmenter and packager 135, the digital rights manager 140 and the content streamer 145 described above.

To enable monitoring of media content that is streamed to the content presentation device 120, the system 1200 of the illustrated examples also includes an example metadata inserter 1220 and one or more example transcoders 1225 and/or 1230, in addition to the previously described device meter 110 and media monitoring facility 115. The metadata inserter 1220 may be implemented, for example, as a separate device, or as a plug-in or other application/device associated with or executed by the IRD 210. The transcoders 1225 and/or 1230 may each be implemented, for example, as a separate device, or as a plug-in or other application/device associated with or executed by one or more elements of the content delivery network 1215 (e.g., such as one or more of the compression gear 130, the segmenter and packager 135, the digital rights manager 140 and/or the content streamer 145). In some examples, the metadata inserter 1220 and one or more of the transcoders 1225 and/or 1230 may be integrated into a single device or plug-in, whereas in other examples the metadata inserter 1220 is separate from the transcoders 1225 and 1230.

In the illustrated example, the metadata inserter 1220 is coupled to an interface of the IRD 1210 (e.g., such as a serial digital interface (SDI) or Internet protocol (IP) interface) and decodes of the television transport stream provided by the IRD 1210. The metadata inserter 1220 then extracts audio watermark(s) from the audio portion(s) of the television transport stream and decodes the audio watermark(s) to obtain audio watermark payload data, which in the illustrated example provides the metering information. Additionally or alternatively, in some examples the metadata inserter 1220 extracts video (e.g., image) watermark(s) from the video portion(s) of the television transport stream and decodes the video (e.g., image) watermark(s) to obtain video watermark payload data corresponding to the metering information. In some examples the metadata inserter 1220 may additionally or alternatively obtain metering data from an independent metering data source, such as the independent metering data source described in conjunction with FIGS. 23 and 24. The metadata inserter 1220 then inserts the watermark payload data corresponding to the metering information into one or more existing portions of the television transport stream capable of carrying metadata. For example, the metadata inserter 1220 can insert the watermark payload data corresponding to the metering information (and/or metering data obtained from an independent source) as vertical blanking interval (VBI) data in accordance with Society of Cable Telecommunications Engineers (SCTE) American National Standard ANSI/SCTE 127, or as one or more Advanced Television Systems Committee (ATSC) private information descriptors of the transport stream, etc. In some examples, operation of the metadata inserter 1220 results in little to no change in the program clock reference and/or audio/video timing of the television transport stream.

In the illustrated example, the system 1200 includes one or more of the transcoder 1225 or the transcoder 1230. The transcoders 1225 and 1230 each can take metering metadata inserted by the metadata inserter 1220 into the television transport stream and convert this metadata into a format compatible with streaming by the content delivery network 1215. The transcoders 1225 and 1230 each can then insert this reformatted metadata into certain portion(s) of the streaming content transport stream(s) that are capable of carrying metadata. For example, the transcoders 1225/1230 can decode metering metadata inserted as VBI payload data or as ATSC private information descriptor(s) and convert this metering metadata into ID3 tag metadata for insertion in the transport stream(s) that is (are) to stream the media content in accordance with the HLS or other appropriate streaming protocol. In some examples, the transcoders 1225/1230 encrypt the transcoded metering metadata prior to insertion in the transport stream(s) that is (are) to stream the media content (e.g., to protect privacy). Such encryption can prevent the metering metadata from being observable by applications at the content presentation device 120 other than the device meter 110. Additionally or alternatively, such encryption can be used to prevent the device meter 110 from extracting and/or decoding the metering metadata unless the device meter 110 has been provisioned (e.g., enabled) by the media monitoring facility 115.

In the illustrated example, the difference between the transcoder 1225 and the transcoder 1230 concerns the location and integration into the system 1200. For example, the transcoder 1225 performs its transcoding functions on the input to the content delivery network 1215 and, thus, may be implemented as a device separate from the CDN 1215 and/or may be integrated with or separate from the metadata inserter 1220. In contrast, the transcoder 1230 operates on transport stream(s) within the CDN 1215 (e.g., similar to the server meter 105) and, thus, may be implemented as a plug-in and/or application/device associated with or executed by one or more of the elements included in the CDN 1215.

A potential advantage of the example system 1200 is that different vendors can provide metadata inserters 1220 and transcoders 1225/1230, with their interfaces being specified by established industry standards (e.g., such as established SCTE or ATSC standards).

While an example manner of implementing the system 1200 has been illustrated in FIG. 12, one or more of the elements, processes and/or devices illustrated in FIG. 12 may be combined, divided, re-arranged, omitted, eliminated and/or implemented in any other way. Further, the example television source 1205, the example IRD 1210, the example content delivery network 1215, the example metadata inserter 1220, the example transcoders 1225 and/or 1230 and/or, more generally, the example system 1200 of FIG. 12 may be implemented by hardware, software, firmware and/or any combination of hardware, software and/or firmware. Thus, for example, any of the example television source 1205, the example IRD 1210, the example content delivery network 1215, the example metadata inserter 1220, the example transcoders 1225 and/or 1230 and/or, more generally, the example system 1200 could be implemented by one or more circuit(s), programmable processor(s), ASIC(s), PLD(s) and/or FPLD(s), etc. When any of the apparatus or system claims of this patent are read to cover a purely software and/or firmware implementation at least one of the example system 1200, the example television source 1205, the example IRD 1210, the example content delivery network 1215, the example metadata inserter 1220 and/or the example transcoders 1225 and/or 1230 are hereby expressly defined to include a tangible computer readable medium such as a memory, DVD, CD, etc., storing such software and/or firmware. Further still, the example system 1200 of FIG. 12 may include one or more elements, processes and/or devices in addition to, or instead of, those illustrated in FIG. 12, and/or may include more than one of any or all of the illustrated elements, processes and devices.

Flowcharts representative of example machine readable instructions that may be executed to implement the example systems 100, 500, 900, 1200, 2300 and/or 2800, the example server meters 105, 505 and/or 905, the example device meters 110 and/or 510, the example media monitoring facilities 115, 515, 915 and/or 2815, the example transport stream decoder 205, the metering data extractor 210, the example metering data transcoder 215, the example metering metadata encryptor 220, the example transport stream encoder 225, the example metering metadata extractor 305, the example metering metadata reporter 310, the example metering metadata collector 405, the example report generator 410, the example content metadata extractor 605, the example metadata verifier 610, the example content metadata extractor 705, the example content metadata reporter 710, the example content metadata collector 805, the example content metadata validator 810, the example report generator 815, the example media content retriever 1005, the example metering data reporter 1010, the example metering data collector 1105 the example report generator 1110, the example metadata inserter 1220, the example transcoders 1225 and/1230, the example independent metering data source 2320, the example combiner 2330, the example clock 2410, the example data source(s) 2420, and/or the secondary content presenter 2825 are shown in FIGS. 13-22, 25, 29, and/or 30. In these examples, the machine readable instructions represented by each flowchart may comprise one or more programs for execution by a processor, such as the processor 3112 shown in the example processing system 3100 discussed below in connection with FIG. 31. Alternatively, the entire program or programs and/or portions thereof implementing one or more of the processes represented by the flowcharts of FIGS. 13-22, 25, 29, and/or 30 could be executed by a device other than the processor 3112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 13-22, 25, 29, and/or 30 may be implemented manually. Further, although the example machine readable instructions are described with reference to the flowcharts illustrated in FIGS. 13-22, 25, 29, and/or 30, many other techniques for implementing the example methods and apparatus described herein may alternatively be used. For example, with reference to the flowcharts illustrated in FIGS. 13-22, 25, 29, and/or 30, the order of execution of the blocks may be changed, and/or some of the blocks described may be changed, eliminated, combined and/or subdivided into multiple blocks.

As mentioned above, the example processes of FIGS. 13-22, 25, 29, and/or 30 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 13-22, 25, 29, and/or 30 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 13:
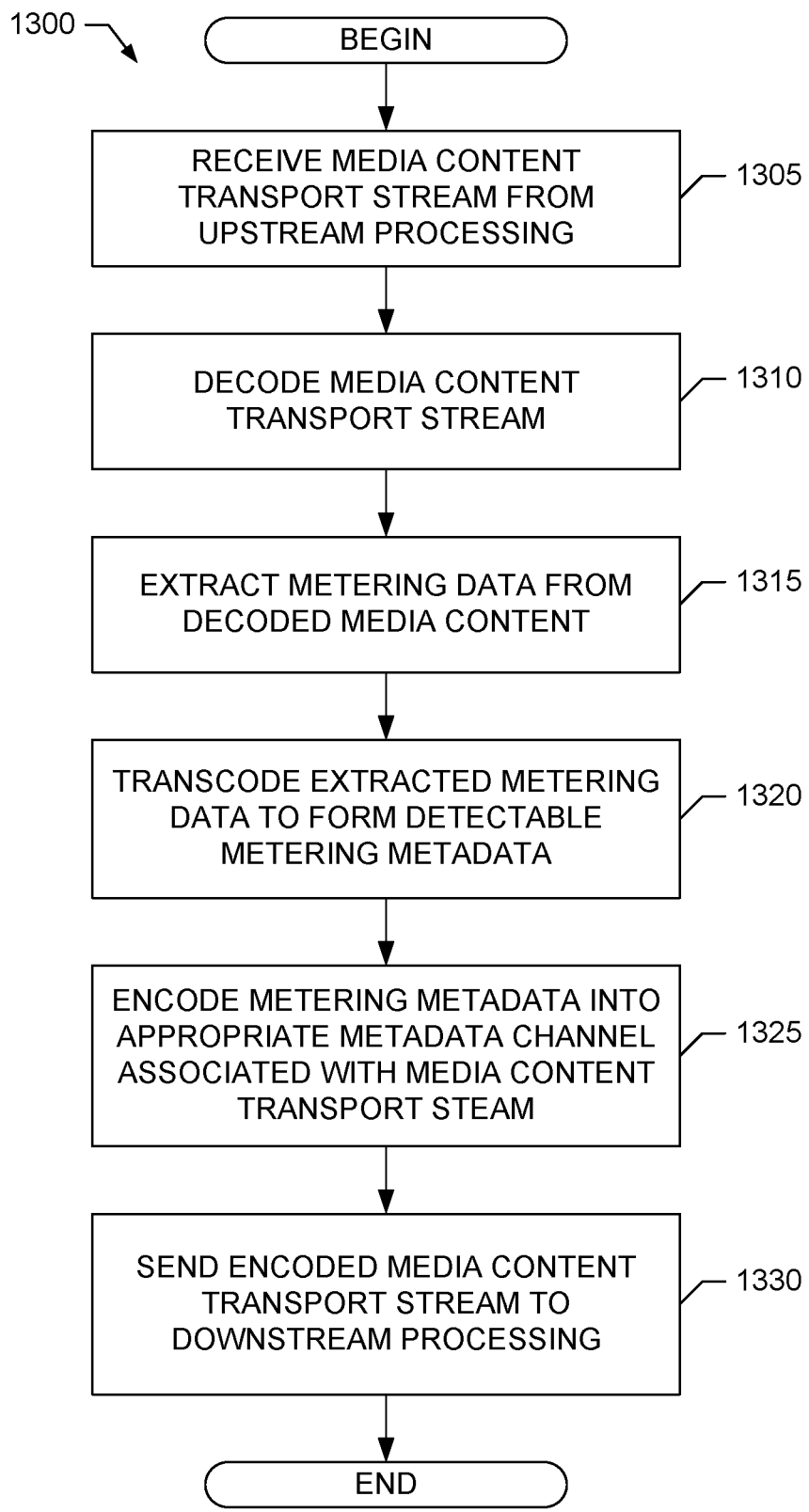
FIG. 13 is a flowchart representative of example machine readable instructions that may be executed to implement the first example server meter of FIG. 2.

Example machine readable instructions 1300 that may be executed to implement the first example server meter 105 of FIGS. 1-2 are illustrated in FIG. 13. With reference to the preceding figures, the example machine readable instructions 1300 of FIG. 13 begin execution at block 1305 at which the server meter 105 receives a transport stream carrying media content to be streamed to the content presentation device 120. At block 1310, the transport stream decoder 205 of the server meter 105 decodes the transport stream to obtain the (e.g., uncompressed) media content being streamed to the content presentation device 120. At block 1315, the metering data extractor 210 of the server meter 105 extracts metering data having a first format (e.g., such as one or more embedded audio/video watermarks) from the decoded (e.g., uncompressed) media content obtained at block 1310. At block 1320, the metering data transcoder 215 of the server meter 105 transcodes the metering data in the first format obtained at block 1315 to form metering metadata having a second format (e.g., a text, binary or other data format) that is decodable by the device meter 110. At block 1325, the transport stream encoder 225 of the server meter 105 re-encodes the transport stream that is to carry the streaming media content to include the metering metadata in a metadata channel to be associated with the transport stream. At block 1330, the server meter 105 sends the re-encoded transport stream (and the metadata channel carrying the transcoded metering metadata) to any other downstream processing elements for streaming to the content presentation device 120. Execution of the example machine readable instructions 1300 then ends.

In some examples, block 1315 may be modified and/or replaced with one or more blocks to utilize metering data from an independent metering data source, as described below in conjunction with FIG. 25.

Figure 14:
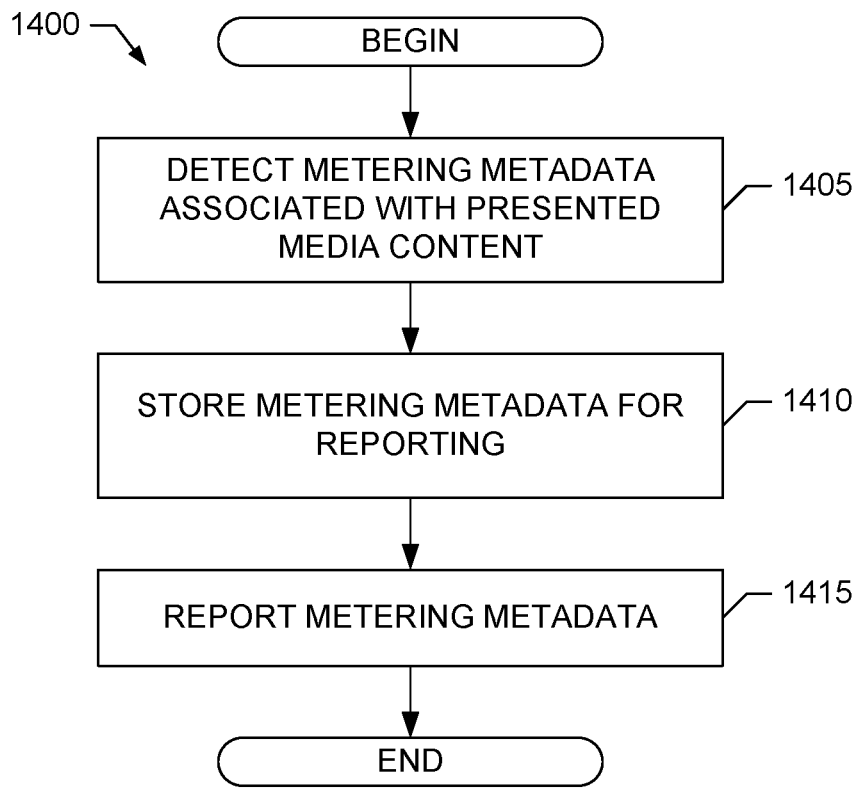
FIG. 14 is a flowchart representative of example machine readable instructions that may be executed to implement the first example device meter of FIG. 3.

Example machine readable instructions 1400 that may be executed to implement the first example device meter 110 of FIGS. 1 and 3 are illustrated in FIG. 14. With reference to the preceding figures, the example machine readable instructions 1400 of FIG. 14 begin execution at block 1405 at which the metering metadata extractor 305 of the device meter 110 detects metering metadata (e.g., metadata derived from metering data included in an audio/video watermark, metadata derived from metering data obtained from an independent metering data source, etc.) included in a metadata channel accompanying a transport stream providing streaming media content to the content presentation device 120. At block 1410, the metering metadata extractor 305 stores the metering metadata for subsequent reporting. At block 1415, the metering metadata reporter 310 of the device meter 110 reports the metering metadata to the media monitoring facility 115. Execution of the example machine readable instructions 1400 then ends.

Figure 15:
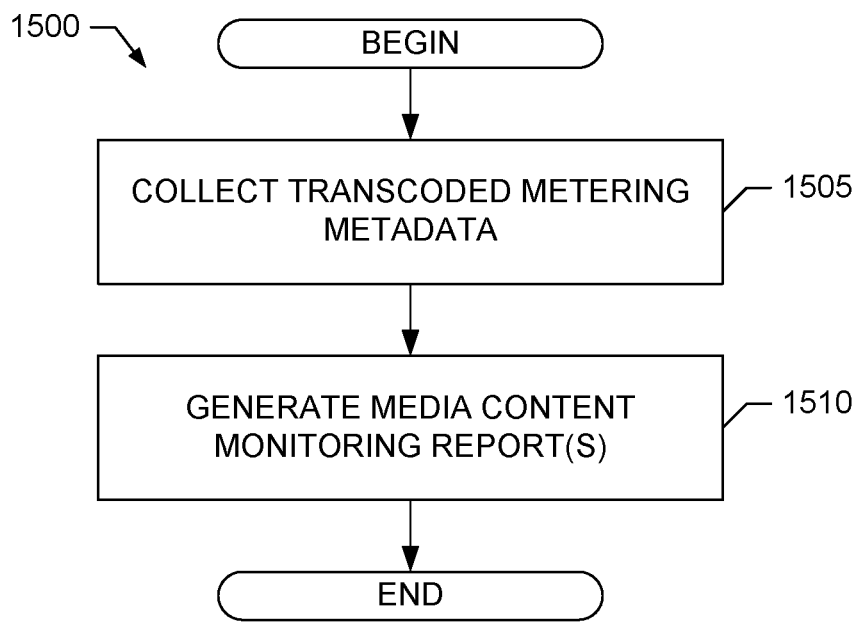
FIG. 15 is a flowchart representative of example machine readable instructions that may be executed to implement the first example media monitoring facility of FIG. 4.

Example machine readable instructions 1500 that may be executed to implement the first example media monitoring facility 115 of FIGS. 1 and 4 are illustrated in FIG. 15. With reference to the preceding figures, the example machine readable instructions 1500 of FIG. 15 begin execution at block 1505 at which the metering metadata collector 405 of the media monitoring facility 115 collects metering metadata (e.g., metadata derived from metering data included in an audio/video watermark, metadata derived from metering data obtained from an independent metering data source, etc.) and other metering information reported by the device meter 110. At block 1510, the report generator 410 of the media monitoring facility 115 generates one or more reports based on the reported metering information. Execution of the example machine readable instructions 1500 then ends.

Figure 16:
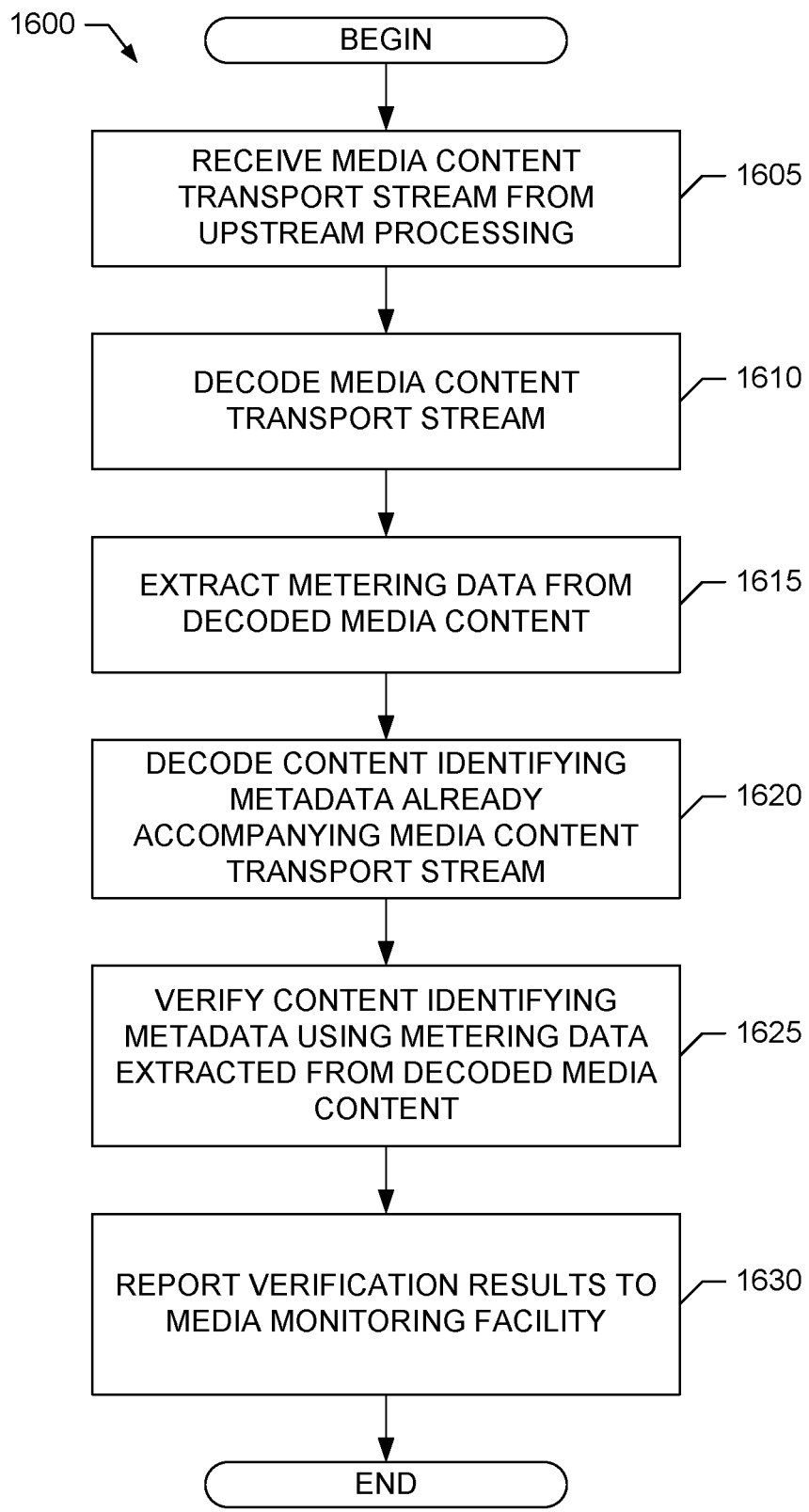
FIG. 16 is a flowchart representative of example machine readable instructions that may be executed to implement the second example server meter of FIG. 6.

Example machine readable instructions 1600 that may be executed to implement the second example server meter 505 of FIGS. 5-6 are illustrated in FIG. 16. With reference to the preceding figures, the example machine readable instructions 1600 of FIG. 16 begin execution at block 1605 at which the server meter 505 receives a transport stream carrying media content to be streamed to the content presentation device 120. At block 1610, the transport stream decoder 205 of the server meter 505 decodes the transport stream to obtain the (e.g., uncompressed) media content being streamed to the content presentation device 120. At block 1615, the metering data extractor 210 of the server meter 505 extracts metering data (e.g., such as one or more embedded audio/video watermarks) from the decoded (e.g., uncompressed) media content obtained at block 1610. At block 1620, the content metadata extractor 605 extracts content identifying metadata (such as playlist data, electronic programming guide data, etc.) already accompanying the transport stream that is carrying the streaming media content. At block 1625, the metadata verifier 610 of the server meter 505 compares the metering data extracted at block 1615 and the content identifying metadata extracted at block 1620 to verify the content identifying metadata. At block 1630, the metadata verifier 610 reports the verification results to the media monitoring facility 515. Execution of the example machine readable instructions 1600 then ends.

In some examples, block 1615 may be modified and/or replaced with one or more blocks to utilize metering data from an independent metering data source, as described below in conjunction with FIG. 25.

Figure 17:
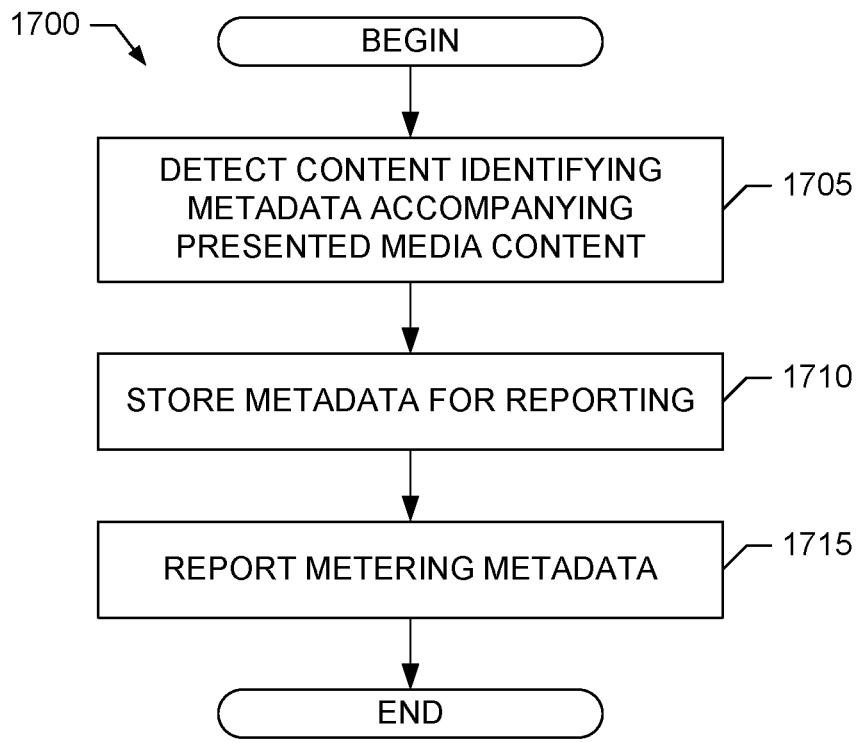
FIG. 17 is a flowchart representative of example machine readable instructions that may be executed to implement the second example device meter of FIG. 7.

Example machine readable instructions 1700 that may be executed to implement the second example device meter 510 of FIGS. 5 and 7 are illustrated in FIG. 17. With reference to the preceding figures, the example machine readable instructions 1700 of FIG. 17 begin execution at block 1705 at which the content metadata extractor 705 of the device meter 510 extracts content identifying metadata (such as playlist data, electronic programming guide data, etc.) already accompanying the transport stream providing the streaming media content to the content presentation device 120. At block 1710, the content metadata extractor 705 stores the content identifying metadata for subsequent reporting. At block 1715, the content metadata reporter 710 of the device meter 510 reports the metering metadata to the media monitoring facility 515. Execution of the example machine readable instructions 1700 then ends.

Figure 18:
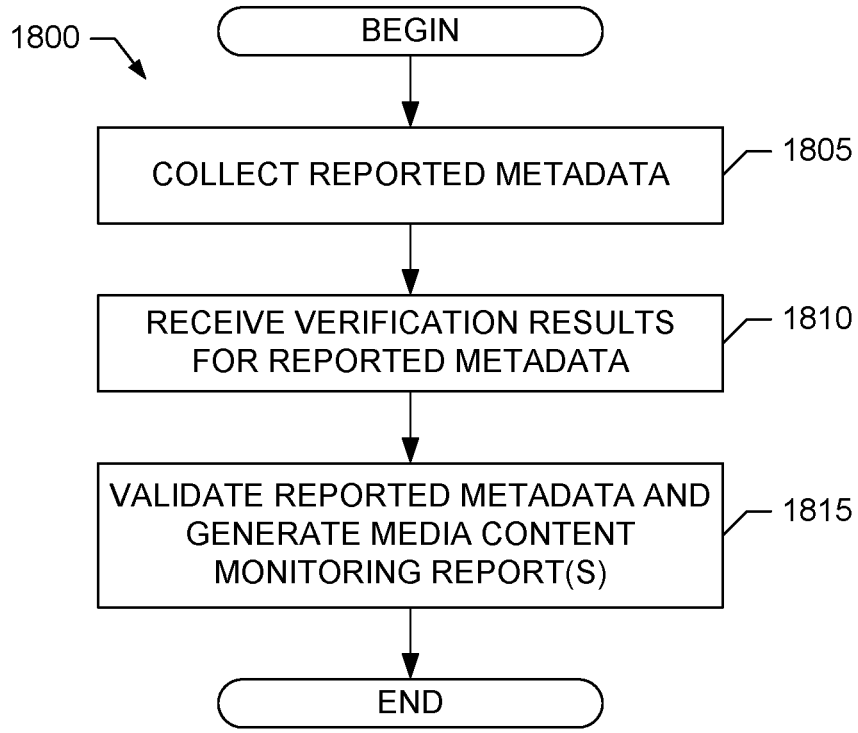
FIG. 18 is a flowchart representative of example machine readable instructions that may be executed to implement the second example media monitoring facility of FIG. 8.

Example machine readable instructions 1800 that may be executed to implement the second example media monitoring facility 515 of FIGS. 5 and 8 are illustrated in FIG. 18. With reference to the preceding figures, the example machine readable instructions 1800 of FIG. 18 begin execution at block 1805 at which the content metadata collector 805 of the media monitoring facility 515 collects content identifying metadata (e.g., metadata accompanying the transport stream, metadata derived from metering data included in an audio/video watermark, metadata derived from metering data obtained from an independent metering data source, etc.) and/or other metering information reported by the device meter 510. At block 1810, the content metadata validator 810 of the media monitoring facility 515 receives verification results concerning the validity of the content identifying information received at block 1805. At block 1815, the content metadata collector 805 validates the collected content identifying metadata using the verification results received at block 1810. Additionally, at block 1815 the report generator 815 of the media monitoring facility 515 generates one or more reports based on the reported metering information. Execution of the example machine readable instructions 1800 then ends.

Figure 19:
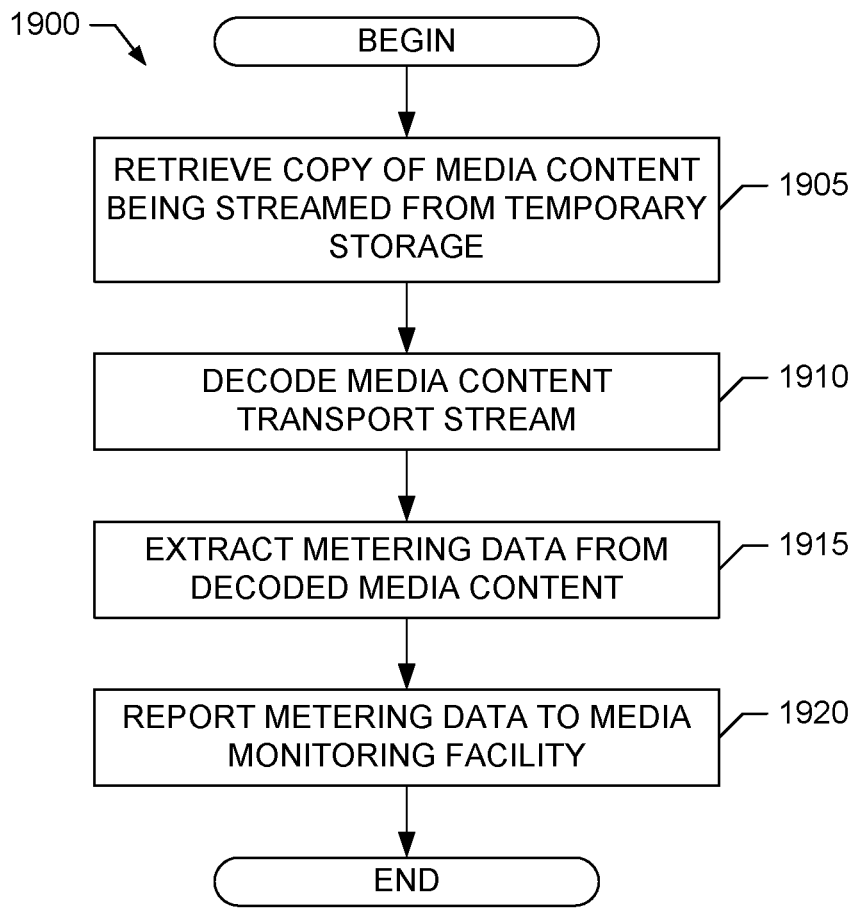
FIG. 19 is a flowchart representative of example machine readable instructions that may be executed to implement the third example server meter of FIG. 10.

Example machine readable instructions 1900 that may be executed to implement the third example server meter 905 of FIGS. 9-10 are illustrated in FIG. 19. With reference to the preceding figures, the example machine readable instructions 1900 of FIG. 19 begin execution at block 1905 at which media content retriever 1005 of the server meter 905 retrieves from the temporary content storage 920 a copy of media content being streamed to the content presentation device 120. At block 1910, the media content retriever 1005 decodes (e.g., unpacks, combines, uncompresses, etc.) the retrieved media content retrieved at block 1905, as appropriate. At block 1915, the metering data extractor 210 of the server meter 905 extracts metering data (e.g., such as one or more embedded audio/video watermarks) from the (e.g., uncompressed) media content obtained at block 1910. At block 1920, the metering data reporter 1010 of the server meter 905 reports the metering data obtained at block 1915 to the media monitoring facility 915. Execution of the example machine readable instructions 1900 then ends.

In some examples, block 1915 may be modified and/or replaced with one or more blocks to utilize metering data from an independent metering data source, as described below in conjunction with FIG. 25.

Figure 20:
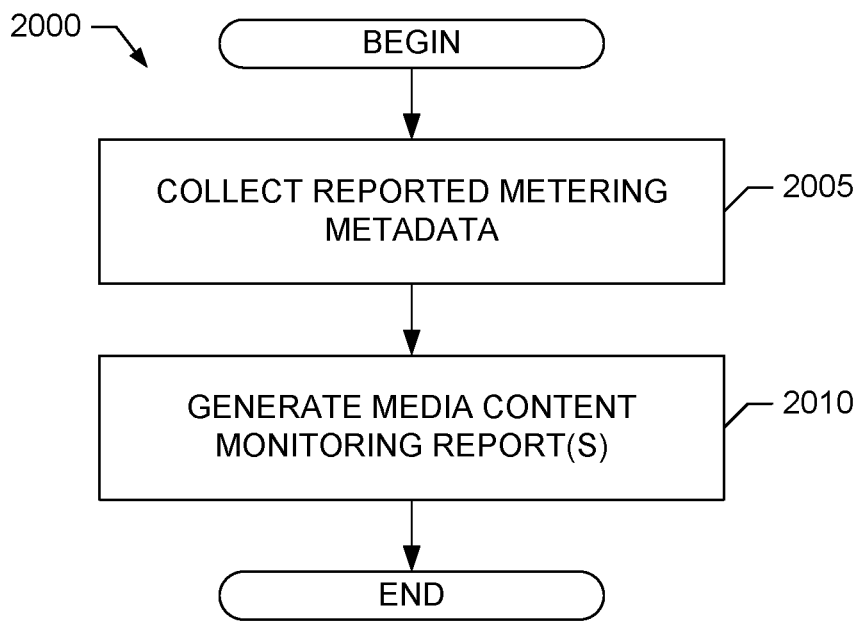
FIG. 20 is a flowchart representative of example machine readable instructions that may be executed to implement the third example media monitoring facility of FIG. 11.
Figure 21:
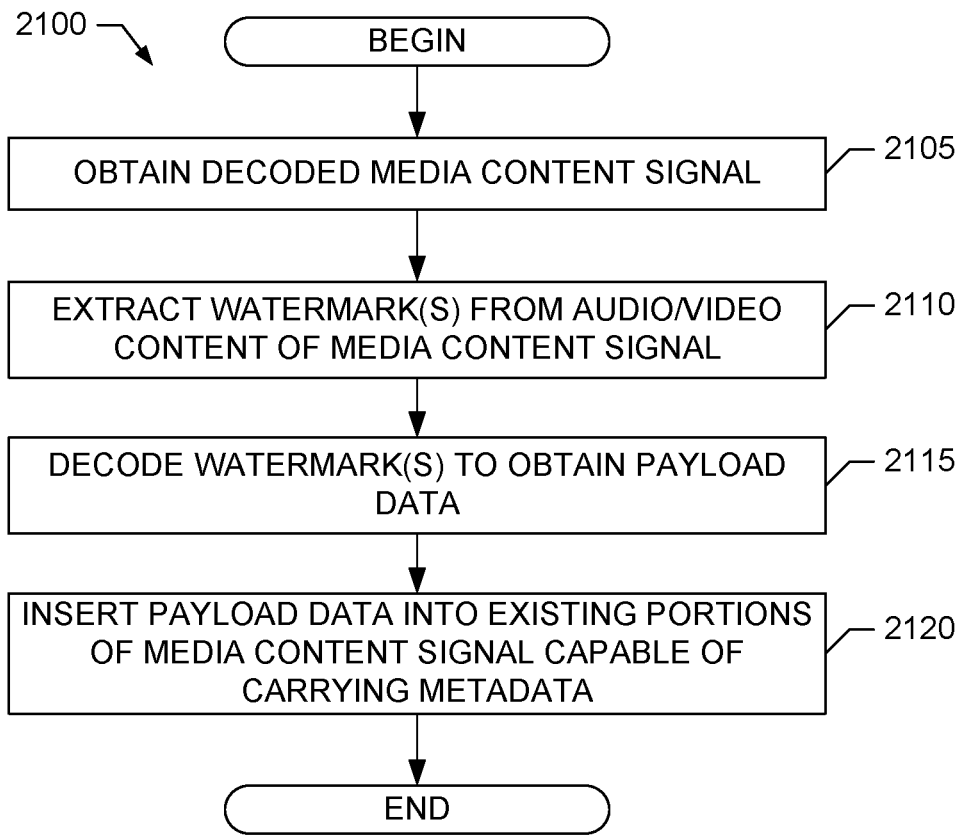
FIG. 21 is a flowchart representative of example machine readable instructions that may be executed to implement the example metadata inserter included in the example system of FIG. 12.

Example machine readable instructions 2000 that may be executed to implement the third example media monitoring facility 915 of FIGS. 9 and 11 are illustrated in FIG. 20. With reference to the preceding figures, the example machine readable instructions 2000 of FIG. 20 begin execution at block 2005 at which the metering data collector 1105 of the media monitoring facility 915 collects metering data (e.g., metadata already accompanying the transport stream, metadata derived from metering data included in an audio/video watermark, metadata derived from metering data obtained from an independent metering data source, etc.) reported by the server meter 905. At block 2010, the report generator 1110 of the media monitoring facility 915 generates one or more reports based on the reported metering information. Execution of the example machine readable instructions 2000 then ends Example machine readable instructions 2100 that may be executed to implement the example metadata inserter 1220 of FIG. 12 are illustrated in FIG. 21. With reference to the preceding figures, the example machine readable instructions 2100 of FIG. 21 begin execution at block 2105 at which the metadata inserter 1220 obtains the decoded media content signal (e.g., the decoded television transport stream) from the IRD 1210. At block 2110, the metadata inserter 1220 extracts watermark(s) (e.g., audio and/or video watermark(s)) from the media content signal). At block 2115, the metadata inserter 1220 decodes the watermark(s) to obtain the watermark payload data and, thus, the metering information provided by the watermark payload data. At block 2120, the metadata inserter 1220 inserts the watermark payload data into existing portions of the media content signal capable of carrying metadata. For example, at block 2120 the metadata inserter 1220 can insert the watermark payload data as VBI data in accordance with the SCTE 127 standard, or as one or more ATSC private information descriptors of the television transport stream, etc. Execution of the example machine readable instructions 2100 then ends.

In some examples, block 2115 may be modified and/or replaced with one or more blocks to utilize metering data from an independent metering data source. Such an example is described in conjunction with FIG. 25.

Figure 22:
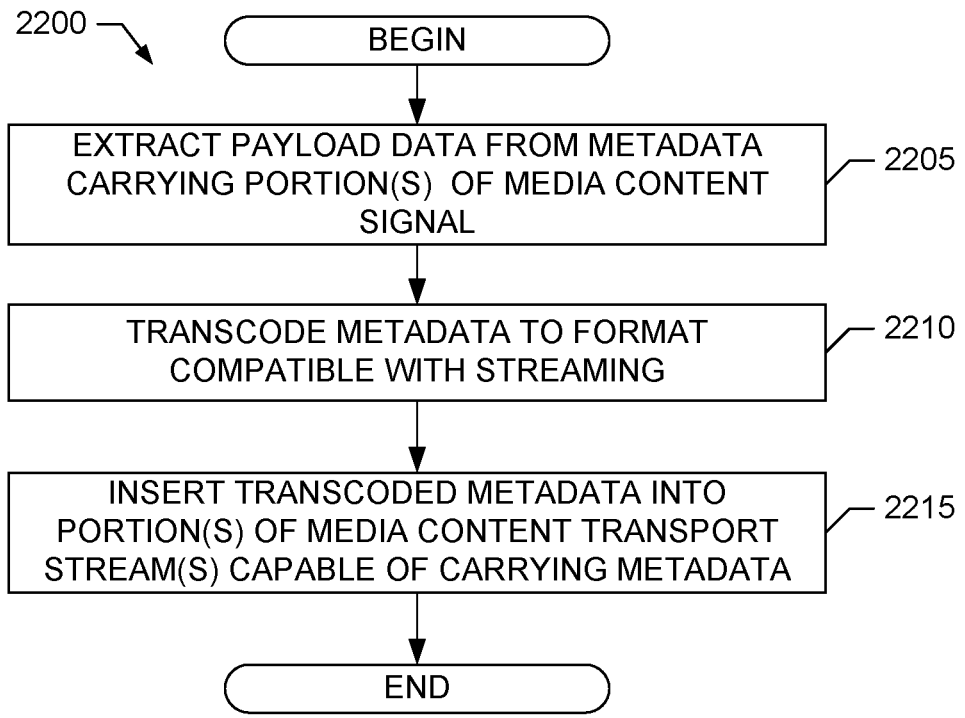
FIG. 22 is a flowchart representative of example machine readable instructions that may be executed to implement the example transcoder included in the example system of FIG. 12.

Example machine readable instructions 2200 that may be executed to implement the example transcoders 1225 and/or 1230 of FIG. 12 are illustrated in FIG. 22. For convenience, and without loss of generality, the machine readable instructions 2200 are described from the perspective of execution by the transcoder 1225. With reference to the preceding figures, the example machine readable instructions 2200 of FIG. 22 begin execution at block 2205 at which the transcoder 1225 extracts payload data inserted in the metadata carrying portion(s) of the media content signal by the metadata inserter 1220. For example, at block 2205 the transcoder 1225 can extract the payload data as VBI data, as one or more ATSC private information descriptors, etc. At block 2210, the transcoder 1225 transcodes the payload metadata obtained at block 2205, and which corresponds to the metering information, to a format compatible with media streaming. For example, at block 2210 the transcoder 1225 can transcode the payload metadata into ID3 tag metadata. At block 2215, the transcoder 1225 inserts the transcoded metadata into portion(s) of the streaming content transport stream(s) that are capable of carrying metadata. For example, at block 2215 the transcoder 1225 can insert the ID3 tag metadata corresponding to the metering metadata into the appropriate portions of the transport stream(s) that is (are) to stream the media content in accordance with the HLS or other appropriate streaming protocol. Execution of the example machine readable instructions 2200 then ends.

Figure 23:
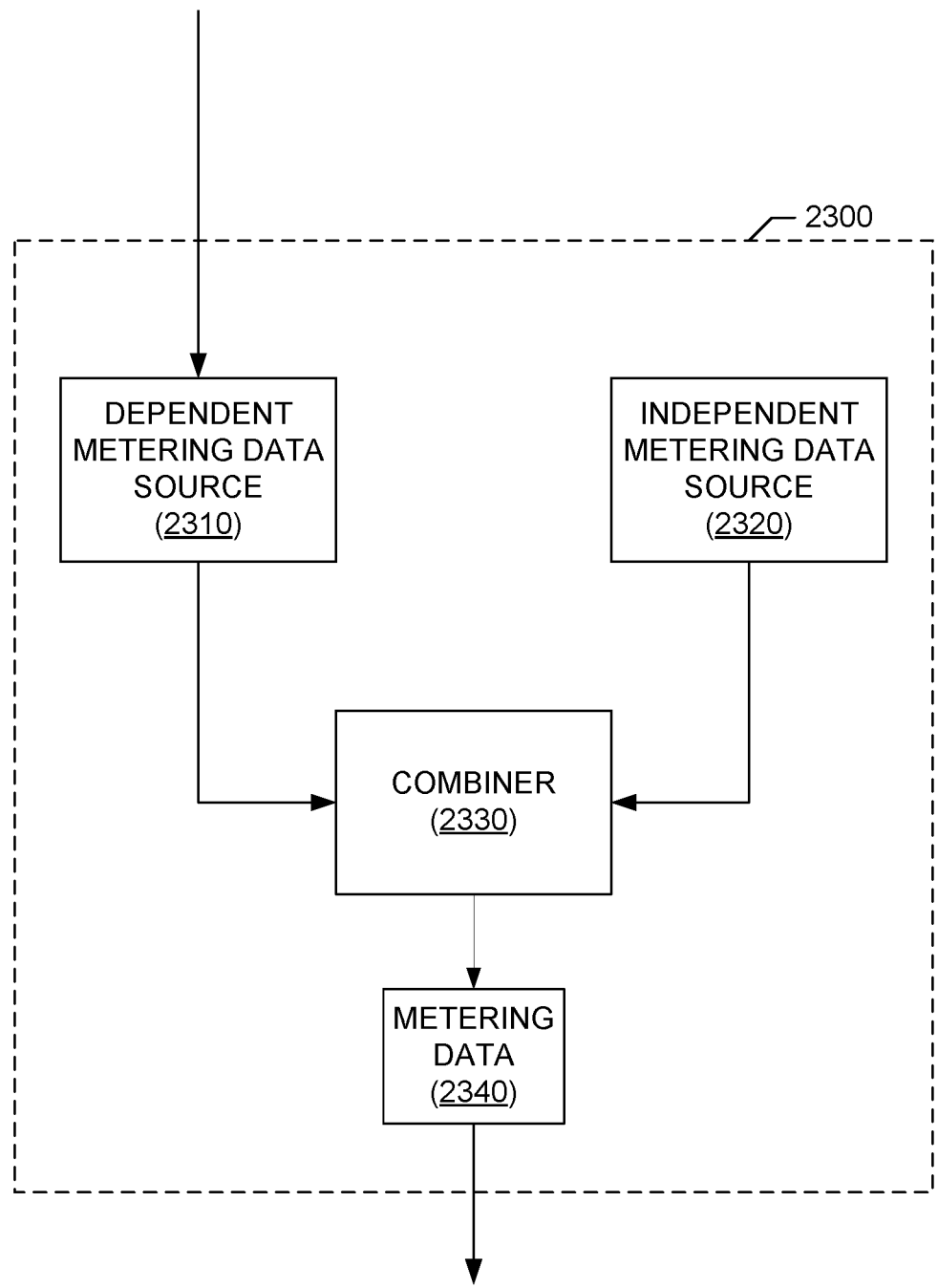
FIG. 23 is a block diagram of an example system to combine metering data descriptive of streaming media content.

FIG. 23 is a block diagram of an example system 2300 that obtains metering data for streaming media content. The example system 2300 includes a dependent metering data source 2310, an independent metering data source 2320, and a combiner 2330 to generate the output metering data 2340.

The dependent metering data source 2310 of the illustrated example receives media content and extracts metering data from the media content. In other words, the metering data collected by the metering data source 2310 is provided by, associated with or otherwise dependent on the media content itself. For example, the dependent metering data source 2310 may extract metering data from an audio and/or video watermark included in the media content, may obtain metering data from a signature generated from the media content, etc.

The example independent metering data source 2320 obtains metering data from sources independent of the content of the media content. For example, the independent metering data source 2320 may obtain a timestamp from a clock, identifying information provided by a user input, identifying information stored in a file, etc. In some examples, the metering data obtained by the independent metering data source 2320 may be redundant, similar or identical in content and/or data type to the data extracted from the dependent metering data source 2310. For example, the metering data from the dependent metering data source 2310 and the metering data from the independent metering data source 2320 may include the same source identifier.

The combiner 2330 of the illustrated example receives first metering data from the dependent metering data source 2310 and second metering data from the independent metering data source 2320 and combines the first and second metering data to generate the combined metering data 2340. In some examples, the combined metering data 2340 contains redundant or partially redundant information as described in conjunction with FIG. 26. In some examples, the metering data extracted by the dependent metering data source 2310 is unavailable and, thus, only the metering data provided by the independent metering data source 2320 is included in the combined metering data 2340 as described in conjunction with FIG. 27.

Figure 24:
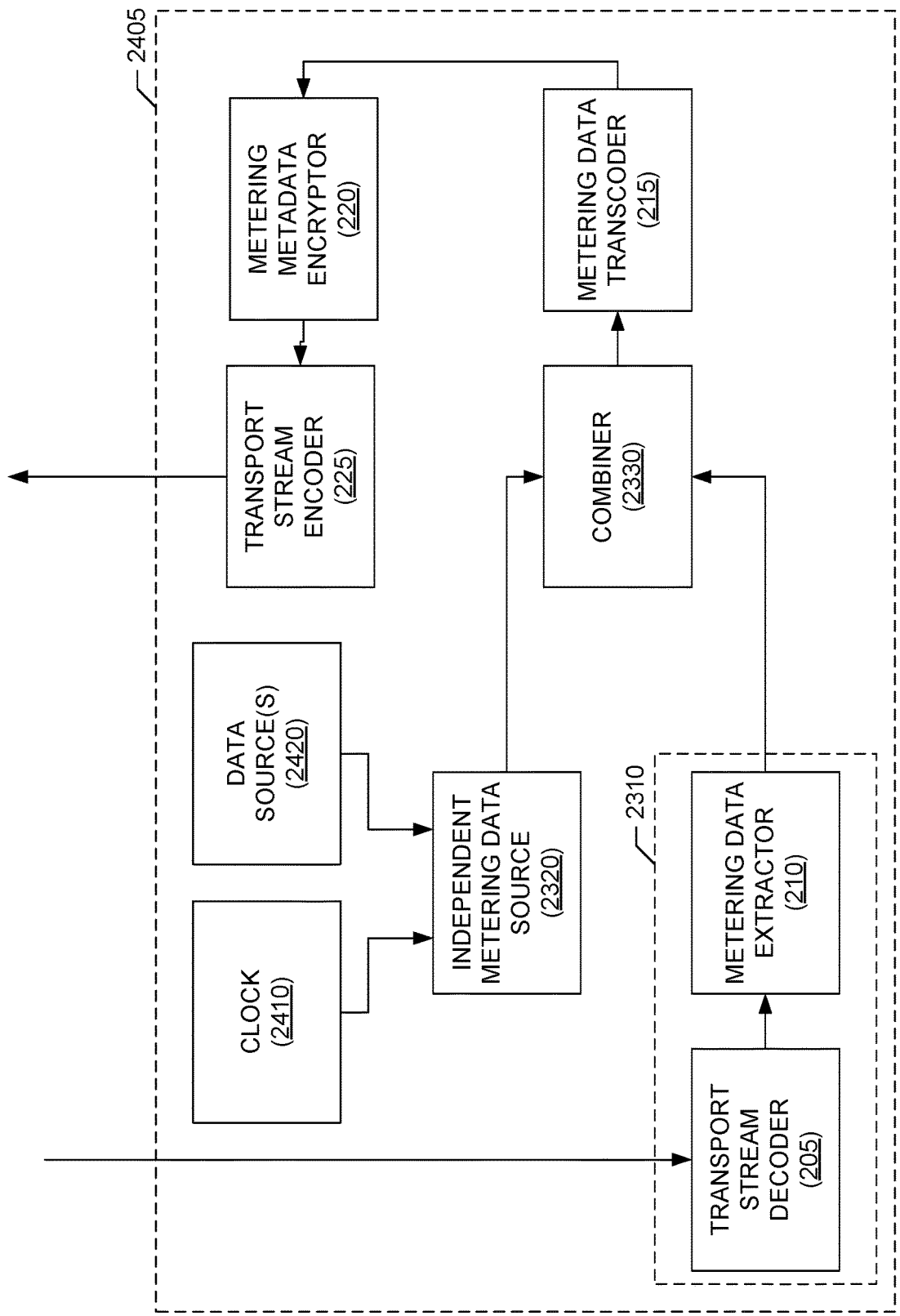
FIG. 24 is a block diagram of a fourth example server meter that may be used to implement the example system of FIG. 23.

A block diagram of an example server meter 2405 that is implemented in accordance with the system 2300 of FIG. 23 is illustrated in FIG. 24. The server meter 2405 of FIG. 24 includes the dependent metering data source 2310, the independent metering data source 2320, a clock 2410, data source(s) 2420, the combiner 2330, the metering data transcoder 215, the metering metadata encryptor 220, and the transport stream encoder 225, which are described in detail above. The server meter 2405 of the illustrated example can be used to implement any of the server meters 105, 505 and/or 905 described above.

The example dependent metering data source 2310 of FIG. 24 is implemented by the transport stream decoder 205 and the metering data extractor 210 described in conjunction with FIG. 2. The metering data extractor 210 of the example dependent metering data source 2310 extracts metering data having a first format from media content obtained from the transport stream decoder 205. Additionally or alternatively, the dependent metering data source 2310 may be implemented by any other components to obtain metering data dependent on the content of the media content in any other manner.

The independent metering data source 2320 of the illustrated example obtains metering data from the clock 2410 and the data source(s) 2420. Additionally or alternatively, the independent metering data source 2320 may obtain metering data from any other internal or external sources of metering data that are independent (e.g., separate from) the media content and/or the transport stream(s) providing the media content.

The clock 2410 of the illustrated example is an internal system clock of the server meter 2405 that provides one or more timestamps to the independent metering data source 2320, when requested. The clock 2410 may alternatively be any type of internal clock, external clock, etc. For example, the clock 2410 may be a clock at a content provider and/or the clock 2410 may be an internal clock that is synchronized with a clock of a content provider.

The data source(s) 2420 of the illustrated example provide metering data to the independent metering data source 2320. The data source(s) 2420 provide metering data that is independent of the media content (e.g., is not extracted from the content of the media content). According to the illustrated example, the data source(s) 2420 include a configuration file storing information identifying the source (e.g., the content provider) of the streaming media content. The configuration file is created during setup of the server meter 2405. Additionally or alternatively, the data source(s) 2420 may include any one or more of locally stored data, externally stored data, data available via a network connection, data input by a user of the server meter 2405, etc.

In some examples, the independent metering data source 2320 inserts a tag or other form of identification into the obtained metering data to signify that the metering data was collected by the independent metering data source 2420. For example, the independent metering data source 2320 of FIG. 24 identifies the collected metering data as "Non-Audio" to signify that the metering data was not extracted from the audio of the streaming media content. Additionally or alternatively, one or more other tags or identification information may be added.

The combiner 2330 of the illustrated example combines the metering data from the dependent metering data source 2310 with the metering data from the independent data provider 2320. For example, the combiner 2330 concatenates the metering data extracted by the dependent metering data source 2310 with the metering data obtained by the independent metering data source 2320 to produce one data string. The combiner inserts a delimiter (e.g. a "1") or any other character or indicator between the metering data extracted by the dependent metering data source 2310 and the metering data obtained by the independent metering data source 2320. Additionally or alternatively, the combiner 2330 may combine the metering data in any other manner.

To transcode the combined metering data obtained from the dependent metering data source 2310 and the independent metering data source 2320 from a first format to a second format decodable by a device meter, the example server meter 2405 of FIG. 24 further includes the metering data transcoder 215. Additionally, the server meter 2405 of FIG. 24 includes the metering metadata encryptor 220 that employs any appropriate encryption to encrypt the transcoded metering metadata determined by the metering data transcoder 215. In the illustrated example of FIG. 24, the server meter 2405 includes the transport stream encoder 225 to re-encode the transport stream(s) carrying the streaming media content to include the transcoded metering metadata determined by the metering data transcoder 215 (and encrypted by the metering metadata encryptor 220, as appropriate). Examples of the resulting metering data output by the server meter 2405, as detailed in FIG. 24, are disclosed in conjunction with FIG. 26 and FIG. 27.

While example manners of implementing the system 2300 are described in conjunction with FIG. 23 and FIG. 24, one or more of the elements, processes and/or devices illustrated in FIG. 23 and FIG. 24 may be combined, divided, re-arranged, omitted, eliminated and/or implemented in any other way. Further, one or more of the dependent metering data source 2310, the independent metering data source 2320, and the combiner 2330 of FIG. 23 and the server meter 2405, the transport stream decoder 205, the metering data extractor 210, the independent metering data extractor 2320, the combiner 2330, the clock 2410, the data sources 2420, the metering data transcoder 215, the metering data encryptor 220, and the transport stream encoder 225 of FIG. 24 may be implemented by hardware, software, firmware and/or any combination of hardware, software and/or firmware. Thus, for example, one or more of the dependent metering data source 2310, the independent metering data source 2320, and the combiner 2330 of FIG. 23 and the server meter 2405, the transport stream decoder 205, the metering data extractor 210, the independent metering data extractor 2320, the combiner 2330, the clock 2410, the data sources 2420, the metering data transcoder 215, the metering data encryptor 220, and the transport stream encoder 225 of FIG. 24 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the dependent metering data source 2310, the independent metering data source 2320, and the combiner 2330 of FIG. 23 and the server meter 2405, the transport stream decoder 205, the metering data extractor 210, the independent metering data extractor 2320, the combiner 2330, the clock 2410, the data sources 2420, the metering data transcoder 215, the metering data encryptor 220, and the transport stream encoder 225 of FIG. 24 are hereby expressly defined to include a tangible computer readable medium such as a memory, digital versatile disk (DVD), compact disk (CD), etc., storing such software and/or firmware. Further still, the system 2300 of FIG. 23 and the server meter 105 of FIG. 24 may include one or more elements, processes and/or devices in addition to, or instead of, those illustrated in FIG. 23 and FIG. 24, and/or may include more than one of any or all of the illustrated elements, processes and devices.

Figure 25:
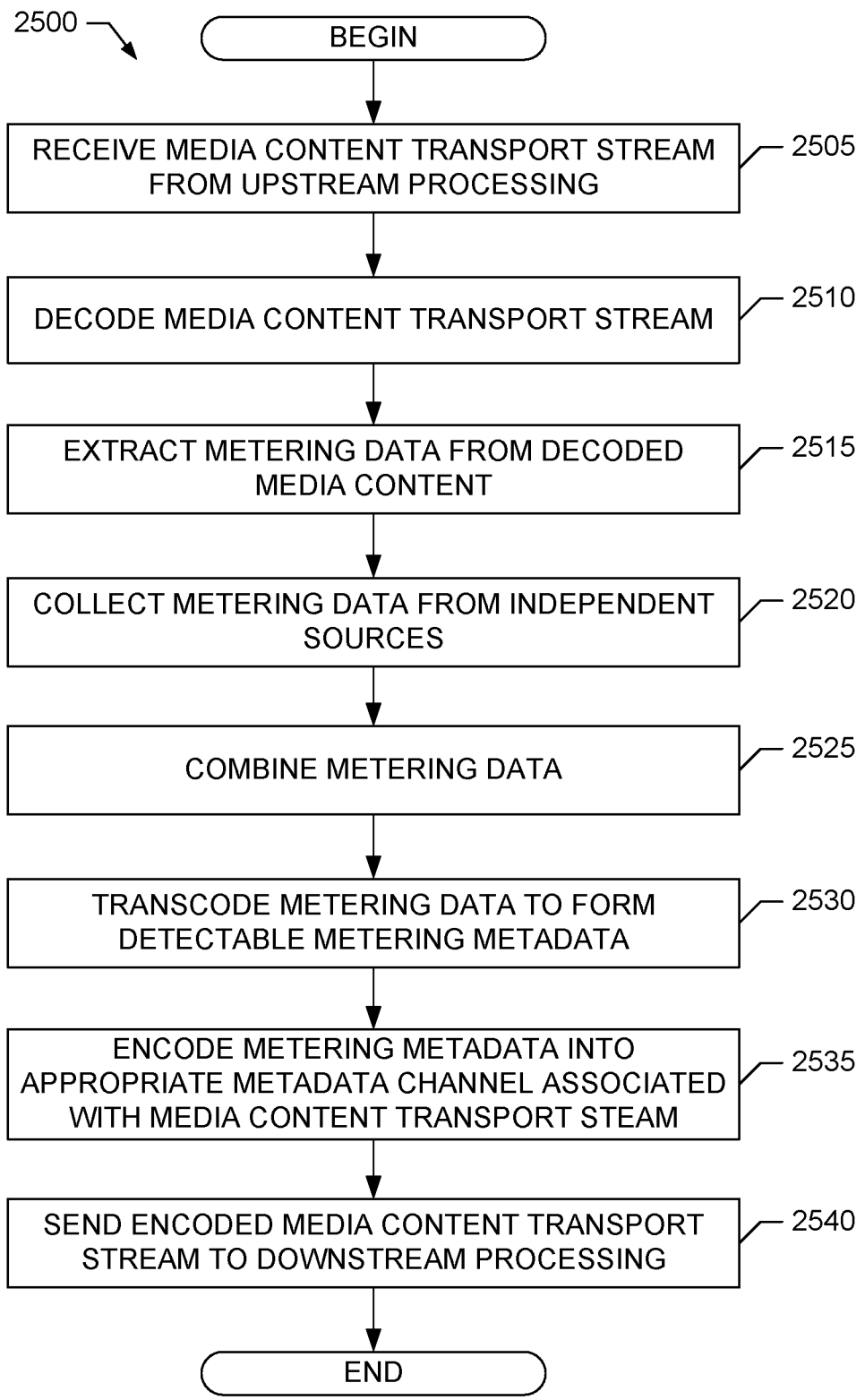
FIG. 25 is a flowchart representative of example machine readable instructions that may be executed to implement the fourth example server meter of FIG. 24.

Example machine readable instructions 2500 that may be executed to implement the example server meter 2405 of FIG. 24 are illustrated in FIG. 25. With reference to FIGS. 23 and 24, the example machine readable instructions 2500 of FIG. 25 begin execution at block 2505 at which the server meter 2405 receives a transport stream carrying media content to be streamed to the content presentation device 120 (block 2505). The transport stream decoder 205 of the dependent metering data source 2310 decodes the transport stream to obtain the media content being streamed to the content presentation device 120 (block 2510). The metering data extractor 210 of the dependent metering data source 2310 extracts metering data having a first format (e.g., such as one or more embedded audio/video watermarks) from the decoded (e.g., uncompressed) media content obtained at block 2510 (block 2515). The independent metering data source 2320 collects metering data, which may have the first format or a second format, from sources independent of the content of the media content (block 2520). The combiner 2330 then combines the metering data collected by the metering data extractor 210 with the metering data collected by the independent metering data source 2320 (block 2525).

The metering data transcoder 215 of the server meter 2405 transcodes the metering data in the first and/or second format(s) obtained at blocks 2515 and 2520 and combined at block 2525 to form transcoded metering metadata having a third format (e.g., a text, binary or other data format) that is decodable by the device meter 110 (block 2530). The transport stream encoder 225 of the server meter 105 re-encodes the transport stream that is to carry the streaming media content to include the transcoded metering metadata in a metadata channel to be associated with the transport stream (block 2535). The server meter 2405 sends the re-encoded transport stream (and the metadata channel carrying the transcoded metering metadata) to any other downstream processing elements for streaming to the content presentation device 120 (block 2540). Execution of the example machine readable instructions 2500 then ends.

Figure 26:
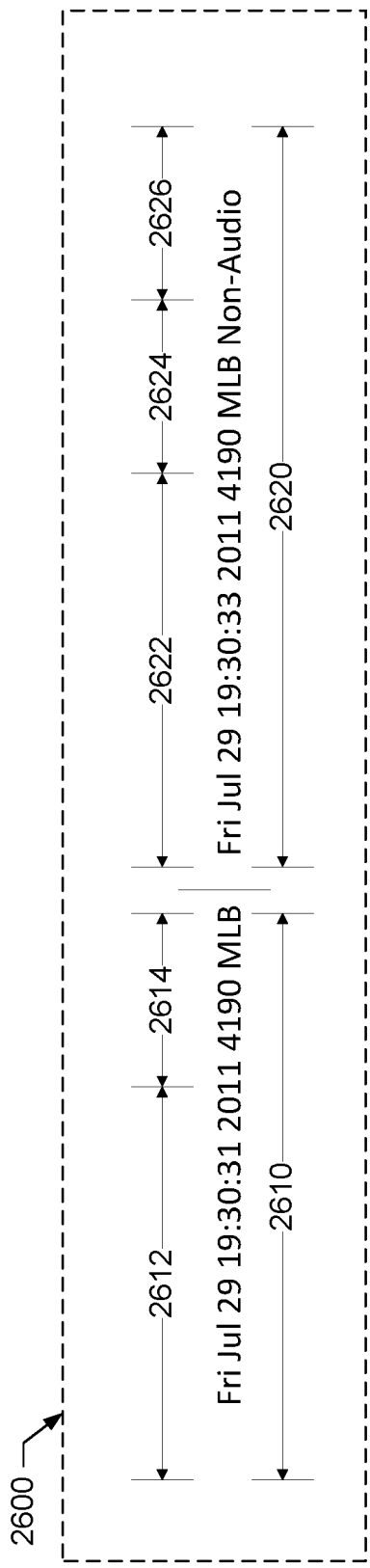
FIG. 26 illustrates example metadata that may be produced by the server meter of FIG. 24.

FIG. 26 illustrates example metadata 2600, derived from the combined metering data 2340, after being extracted, obtained, combined, and transcoded by the server meter 2405 as detailed in FIG. 24. Metadata 2600 includes block 2610, which is the portion of the metadata 2600 that was extracted from the media content by metering data extractor 210. Timestamp 2612 is timestamp data extracted from the media content by the metering data extractor 210. Source identification 2614 is source identification data extracted by the metering data extractor 210 from the media content. Metadata 2600 also includes block 2620, which is the portion of the metadata 2600 collected by the independent metering data source 2320. Timestamp 2622 is timestamp data obtained by the independent metering data source 2320 from the clock 2410. Source identification 2624 is source identification data obtained by the independent metering data source 2320 from the data source(s) 2420. Tag 2626 is a tag on metadata 2620 that identifies metadata 2620 as obtained by the independent metering data source 2320. The metadata 2340, exemplified in FIG. 26, is an example in which the metadata 2610 was readable and the metadata 2620 serves as redundant, or similar, metadata.

Figure 27:
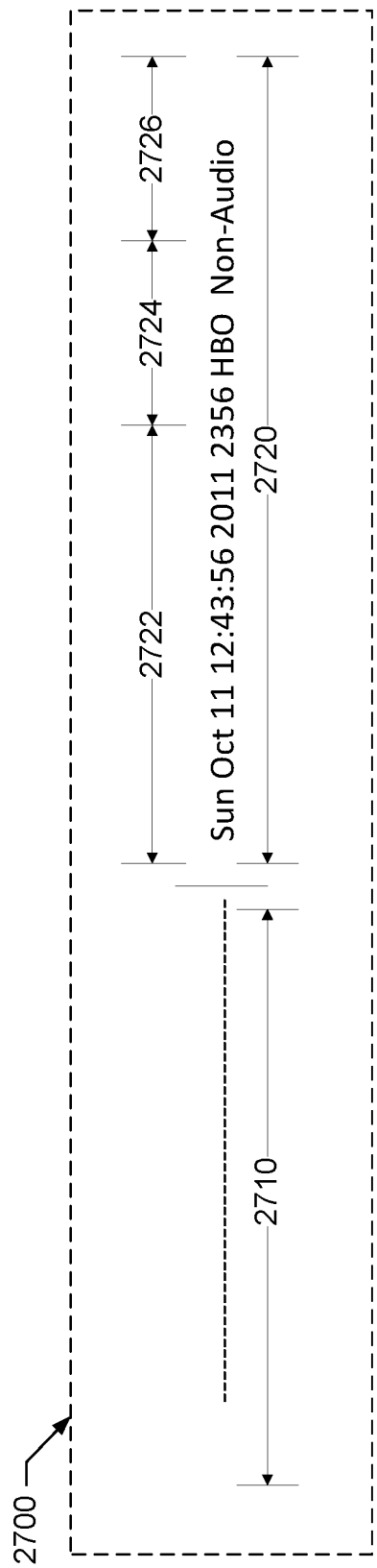
FIG. 27 illustrates second example metadata that may be produced by the server meter of FIG. 24.

FIG. 27 illustrates example metadata 2700, derived from metering data 2340, after being extracted, obtained, combined, and transcoded by the server meter 105 as detailed in FIG. 25. Metadata 2700 illustrates an example where a portion of metadata 2700, block 2710, was unreadable or otherwise unavailable and a portion of the metadata 2700, block 2720, associated with an independent metering data source serves as a backup source of metadata that may be used to replace the unreadable or otherwise unavailable metadata. Block 2710 is the portion of the metadata 2700 that was extracted from the metering data extractor 210. Block 2720 is the portion of metadata 2700 obtained by the independent metering data source 2320. Timestamp 2722 is the timestamp data obtained by the independent metering data source 2320 from the clock 2410. Source identification 2724 is the source identification data obtained by the independent metering data source 2320 from the data source(s) 2420. Tag 2726 is a tag on metadata 2720 that identifies metadata 2720 as obtained by the independent metering data source 2320.

Figure 28:
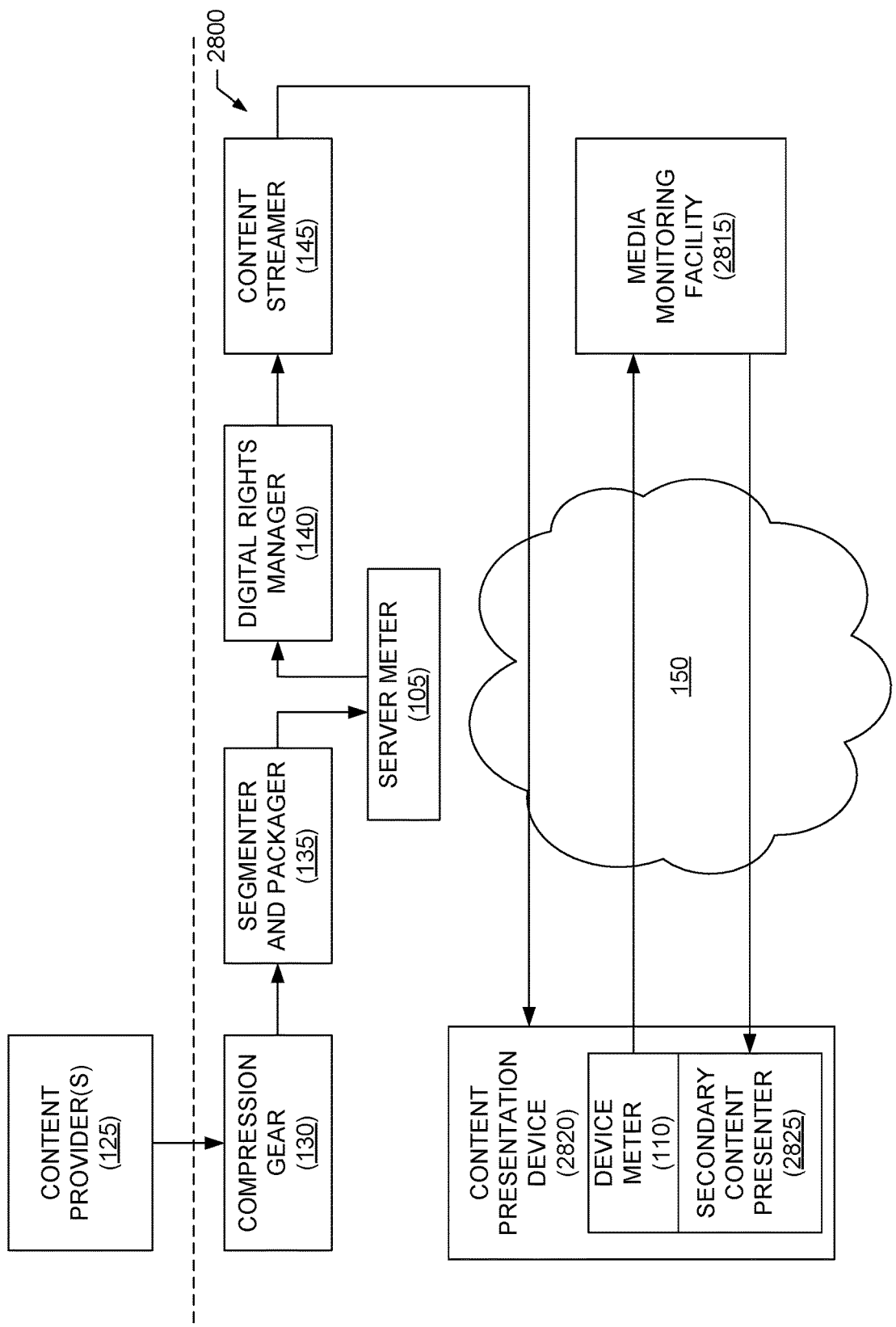
FIG. 28 is block diagram of a fifth example system for monitoring streaming media content.

A block diagram of a fifth example system 2800 for monitoring streaming media content is illustrated in FIG. 28. The fifth example system 2800 includes many elements in common with the first example system 100 of FIG. 1. As such, like elements in FIGS. 1 and 28 are labeled with the same reference numerals. The detailed descriptions of these like elements are provided above in connection with the discussion of FIG. 1 and, in the interest of brevity, are not repeated in the discussion of FIG. 28.

Turning to FIG. 28, the illustrated example system 2800 includes the compression gear 130, the segmenter and packager 135, the digital rights manager 140 and the content streamer 145 to provide streaming media content to a second example content presentation device 2820 via the network 150. To provide media content to the system 2800, the illustrated example of FIG. 28 includes the content provider(s) 125. To monitor media content that is streamed to the content presentation device 2820 and optionally provide secondary content based on the results of the media monitoring, the system 2800 of the illustrated examples also includes the server meter 105, the device meter 110, a fourth example media monitoring facility 2815, and an example secondary content presenter 2825.

The media monitoring facility 2815 includes an interface to receive reported metering information (e.g., metering metadata) received from the device meter 110 via the network 150. In the illustrated example, the media monitoring facility 2815 includes an HTTP interface to receive HTTP requests that include metering information. Additionally or alternatively, any other method(s) to receive metering information may be used. In the illustrated example, the media monitoring facility 2815 receives metering information from the device meter 110, selects secondary content using the received metering information, and sends the selected secondary content to the secondary content presenter 2825. In some examples, the media monitoring facility may select the secondary content from an internal content database. In some examples, the media monitoring facility 2815 may select the secondary content from one/or more external database(s) and/or third party database(s). In such examples, the media monitoring facility 2815 may access the external and/or third party database(s) via a network (e.g. the Internet, a local area network (LAN), a wide area network (WAN), etc.). Other additional or alternative examples of providing secondary media content associated with primary media content that may be employed by the media monitoring facility 2815 are described in, for example, U.S. Patent Application Publication No. 2010/0280641 ("METHODS, APPARATUS AND ARTICLES OF MANUFACTURE TO PROVIDE SECONDARY CONTENT IN ASSOCIATION WITH PRIMARY BROADCAST MEDIA CONTENT" to Harkness et al.), which was filed on Apr. 30, 2010, and is hereby incorporated by reference in its entirety.

The content presentation device 2820 of the illustrated example is a computing device that is capable of presenting streaming media content provided by the content streamer 145 via the network 150. The content presentation device 2820 may be, for example, a desktop computer, a laptop computer, a mobile computing device, a television, a smart phone, a mobile phone, an Apple® iPad®, an Apple® iPhone®, an Apple® iPod®, an Android™ powered computing device, Palm® webOS® computing device, etc. In some examples, the content presentation device 2820 includes one or more executable media players to present the streaming media content provided by the content streamer 145. For examples, the media player(s) available to the content presentation device 120 may be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. While a single content presentation device 120 is illustrated, any number and/or type(s) of content presentation devices may be included in the system 100.

In the illustrated example, the content presentation device 2820 implements the secondary content presenter 2825. The secondary content presenter 2820 may be as an executable media presenter stored on a computing device that is capable of presenting secondary content provided by the media monitoring facility 2815 via the network 150. In some examples, the secondary content presenter 2825 may be implemented as a plug-in that is connected to a plug-in interface of a media player executed by the content presentation device 2820. In some examples, the secondary content presenter 2825 may be implemented as instructions provided that are incorporated in a media player executed by the content presentation device 2820. In some examples, the secondary content presenter 2825 may be implemented as an executable application that is downloaded to the content presentation device 2820 (e.g., downloaded as an App from the Apple® App Store). For example, the secondary content presenter 2825 may be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. While a single secondary content presenter 2825 is illustrated, any number and/or type(s) of secondary content presenters associated with the content presentation device 2820 may be included in the system 2800.

Figure 29:
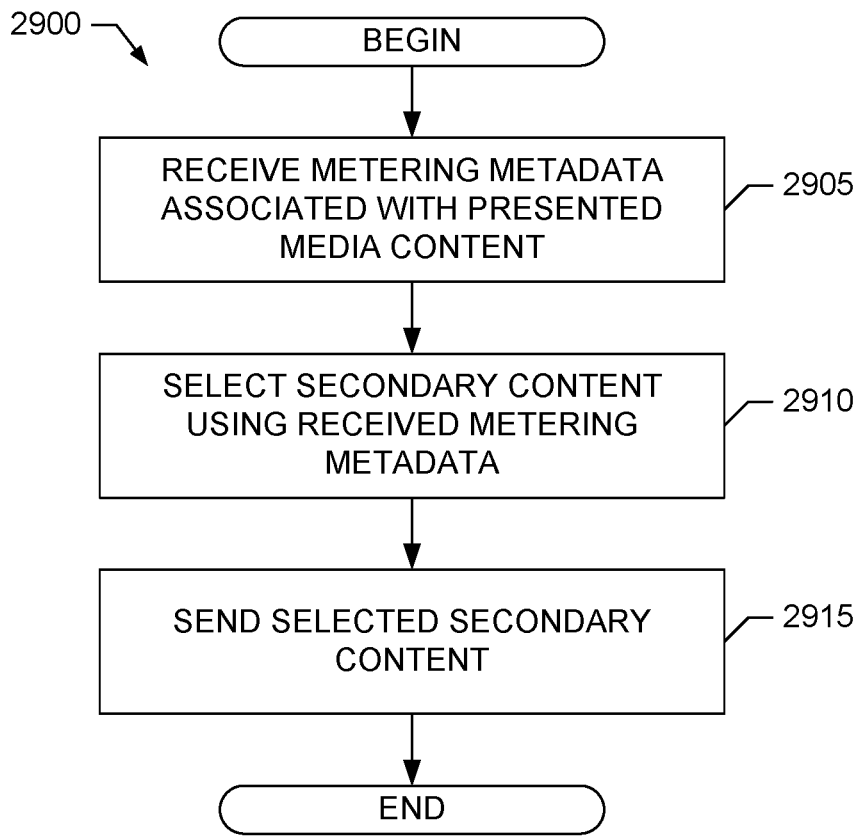
FIG. 29 is a flowchart representative of example machine readable instructions that may be executed to implement the example media monitoring facility included in the example system of FIG. 28.

Example machine readable instructions 2900 that may be executed to implement the second example media monitoring facility 2815 of FIG. 28 are illustrated in FIG. 29. With reference to the preceding figures, the example machine readable instructions 2900 of FIG. 29 begin execution at block 2905 at which the media monitoring facility 2815 collects metering metadata (e.g., metadata derived from metering data included in an audio/video watermark, metadata derived from metering data obtained from an independent metering data source, etc.) and/or other metering information reported by the device meter 110 (block 2905). Then, the media monitoring facility 2915 selects secondary content using the metering metadata received at block 2905 (block 2910). Then, the media monitoring facility 2815 sends the secondary content selected at block 2910 to the secondary content presenter 2825 (block 2915). Execution of the example machine readable instructions 2900 then ends.

Figure 30:
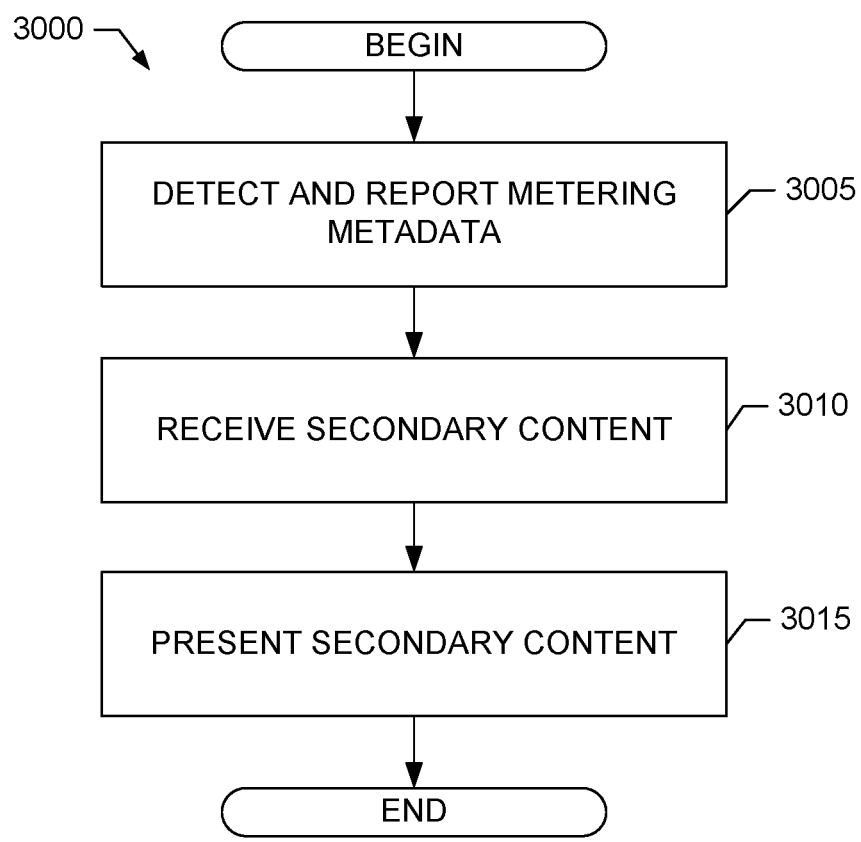
FIG. 30 is a flowchart representative of example machine readable instructions that may be executed to implement the example device meter and secondary content presenter of FIG. 28.

Example machine readable instructions 3000 that may be executed to implement the device meter 110 and secondary content presenter within the content presentation device 2820 of FIG. 28 are illustrated in FIG. 30. With reference to the preceding figures, the example machine readable instructions 3000 of FIG. 30 begin execution at block 3005 at which the device meter 110 detects and reports metering metadata to the media monitoring facility 2815 (block 3005). Then, the secondary content presenter 2825 receives secondary content associated with the metering metadata reported to the media monitoring facility 2815 at block 3005 (block 3010). Then, the secondary content presenter 2825 presents the secondary content received at block 3010 (block 3015). Execution of the example machine readable instructions 3000 then ends.

Figure 31:
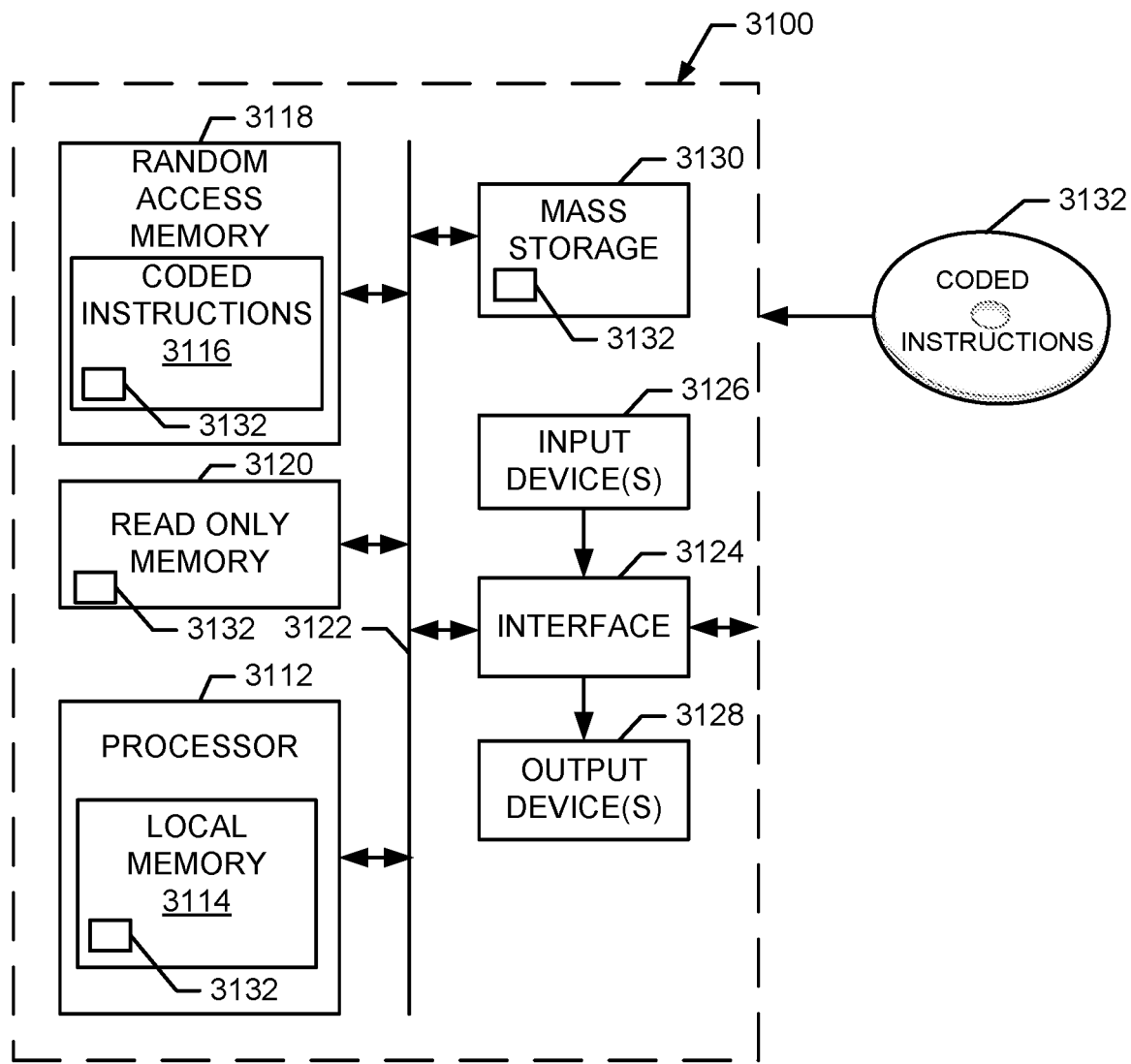
FIG. 31 is a block diagram of an example processing system that may execute the example machine readable instructions of FIGS. 13-22, 25, 29 and/or 30 to implement one or more of the example systems of FIGS. 1, 5, 9, 12, 23 and/or 28, one or more of the example server meters of FIGS. 2, 6, 10 and/or 24, one or more of the example device meters of FIGS. 3 and/or 7, and/or one or more of the example media monitoring facilities of FIGS. 4, 8 and/or 11.

FIG. 31 is a block diagram of an example processing system 3100 capable of implementing the apparatus and methods disclosed herein. The processing system 3100 can be, for example, a tablet computer, a notebook/laptop computer, a personal computer, a personal digital assistant (PDA), a server, an Internet appliance, a DVD player, a CD player, a digital video recorder, a personal video recorder, a set top box, or any other type of computing device.

The system 3100 of the instant example includes a processor 3112 such as a general purpose programmable processor. The processor 3112 includes a local memory 3114, and executes coded instructions 3116 present in the local memory 3114 and/or in another memory device. The processor 3112 may execute, among other things, the machine readable instructions represented in FIGS. 13-22, 25, 29 and/or 30. The processor 3112 may be any type of processing unit, such as one or more Intel® microprocessors from the Pentium® family, the Itanium® family and/or the XScale® family, one or more processing cores, such as one or more of the ARM® families of processing cores, one or more microcontrollers, such as one or more of the PIC® families of microcontrollers, etc. Of course, other processors from other families are also appropriate.

The processor 3112 is in communication with a main memory including a volatile memory 3118 and a non-volatile memory 3120 via a bus 3122. The volatile memory 3118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3120 may be implemented by flash memory and/or any other desired type of memory device. Access to the main memory 3118, 3120 is typically controlled by a memory controller (not shown).

The processing system 3100 also includes an interface circuit 3124. The interface circuit 3124 may be implemented by any type of interface standard, such as an Ethernet interface, a universal serial bus (USB), and/or a third generation input/output (3GIO) interface.

One or more input devices 3126 are connected to the interface circuit 3124. The input device(s) 3126 permit a user to enter data and commands into the processor 3112. The input device(s) can be implemented by, for example, a keyboard, a mouse, a touchscreen, a track-pad, a trackball, an isopoint and/or a voice recognition system.

One or more output devices 3128 are also connected to the interface circuit 3124. The output devices 3128 can be implemented, for example, by display devices (e.g., a liquid crystal display, a cathode ray tube display (CRT)), by a printer and/or by speakers. The interface circuit 3124, thus, typically includes a graphics driver card.

The interface circuit 3124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 3100 also includes one or more mass storage devices 3130 for storing machine readable instructions and data. Examples of such mass storage devices 3130 include floppy disk drives, hard drive disks, compact disk drives and digital versatile disk (DVD) drives. In some examples, the mass storage device 3130 may implement the temporary content storage 920. Additionally or alternatively, in some examples the volatile memory 3118 may implement the temporary content storage 920.

The coded instructions 3132 of FIGS. 13-22, 25, 29 and 30 may be stored in the mass storage device 3130, in the volatile memory 3118, in the non-volatile memory 3120, in the local memory 3114 and/or on a removable storage medium, such as a CD or DVD 3132.

As an alternative to implementing the methods and/or apparatus described herein in a system such as the processing system of FIG. 31, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the disclosure either literally or under the doctrine of equivalents.

What is claimed is:

1. An apparatus to monitor streaming media, the apparatus comprising:
    means for combining first metering data extracted from first media included in a transport stream being sent to a media device with second metering data obtained independently of the first media to form combined metering data, the combined metering data not being decodable by a meter associated with the media device, the first metering data to be extracted from the first media included in the transport stream after a request for the first media is sent by the media device;
    means for transcoding the combined metering data to form transcoded metering data having a format decodable by the meter associated with the media device; and
    means for encoding the transcoded metering data to associate the transcoded metering data with the transport stream, the means for encoding to cause the transcoded metering data to be transmitted to the media device for receipt by the meter after the transcoded metering data is formed based on the first metering data and the second metering data, but prior to the first media being streamed downstream to the media device.

2. The apparatus of claim 1, wherein the means for encoding is further to:
    encode the transcoded metering data as ID3 tag metadata; and
    insert the ID3 tag metadata into the transport stream.

3. The apparatus of claim 1, wherein the means for encoding is to encode the transcoded metering data into a playlist file.

4. The apparatus of claim 3, wherein the means for transcoding is to transcode the combined metering data into text data, and the means for encoding is to insert the text data into the playlist file.

5. The apparatus of claim 1, wherein the first metering data includes watermark data extracted from the first media, and the second metering data includes timestamp data obtained from a clock.

6. An apparatus comprising:
    memory; and
    at least one processor to execute computer readable instructions to:
        combine first metering data extracted from first media included in a transport stream being sent to a media device with second metering data obtained independently of the first media to form combined metering data, the combined metering data not being decodable by a meter associated with the media device, the first metering data to be extracted from the first media included in the transport stream after a request for the first media is sent by the media device;
        transcode the combined metering data to form transcoded metering data having a format decodable by the meter associated with the media device; and
        cause the transcoded metering data to be transmitted to the media device for receipt by the meter after the transcoded metering data is formed based on the first metering data and the second metering data, but prior to the first media being streamed downstream to the media device.

7. The apparatus of claim 6, wherein to encode the transcoded metering data as metadata associated with the transport stream, the processor is further to:
    encode the transcoded metering data as ID3 tag metadata; and
    insert the ID3 tag metadata into the transport stream.

8. The apparatus of claim 6, wherein to encode the transcoded metering data as metadata associated with the transport stream, the processor is to encode the transcoded metering data into a playlist file.

9. The apparatus of claim 8, wherein the processor is to:
    transcode the combined metering data into text data; and
    insert the text data into the playlist file.

10. The apparatus of claim 6, wherein the first metering data includes watermark data extracted from the first media, and the second metering data includes timestamp data obtained from a clock.

11. The apparatus of claim 6, wherein the processor is to transmit secondary media to the media device, the secondary media selected based on the transcoded metering data as monitored by the meter associated with the media device.

12. An apparatus to monitor media, the apparatus comprising:
    means for extracting first metering data from first media to be provided to a media presentation device via a transport stream, the first metering data identifying at least one of the first media or a source of the first media, the first metering data to be extracted from the first media included in the transport stream after a request for the first media is sent by the media presentation device;
    means for combining the first metering data with second metering data obtained independently of the first media to form combined metering data, the combined metering data not being decodable by a meter associated with the media presentation device;

means for transcoding the combined metering data to form transcoded metering data having a format decodable by the meter associated with the media presentation device;

means for encoding the transcoded metering data to associate the transcoded metering data with the transport stream, the means for encoding to cause the transcoded metering data to be transmitted to the media presentation device for receipt by the meter after the transcoded metering data is formed based on the combined metering data, but prior to the first media being streamed downstream to the media presentation device; and means for streaming the transport stream to the media presentation device.

13. The apparatus of claim 12, further including:

means for decoding media identifying metadata associated with the transport stream carrying the first media, the media identifying metadata provided by a provider of the first media; and means for verifying the media identifying metadata using the first metering data extracted from the first media.

14. The apparatus of claim 13, further including means for reporting results of verifying the media identifying metadata to a media monitoring facility to enable validation of metering results reported by the meter associated with the media presentation device.

15. The apparatus of claim 12, wherein the first metering data extracted from the first media includes watermark data embedded in the first media, and the transcoded metering data is represented in a text format.

16. The apparatus of claim 12, wherein the second metering data obtained independently of the first media is redundant to the first metering data extracted from the first media.

17. The apparatus of claim 12, wherein the combined metering data includes a delimiter to identify a portion of the combined metering data corresponding to the second metering data.

* * * * *